United States Patent
Hiraoka et al.

[11] Patent Number: 5,980,623
[45] Date of Patent: Nov. 9, 1999

[54] INK SET FOR INK JET RECORDING AND INK JET RECORDING METHOD

[75] Inventors: Eisuke Hiraoka; Hitoshi Kojima; Akihiko Chujo; Kaoru Watanabe; Hiromi Nagai; Toshiyuki Yano; Ken Hashimoto; Yasuharu Endo, all of Minami-Ashigara, Japan

[73] Assignee: Fuji Xerox Co., Ltd., Tokyo, Japan

[21] Appl. No.: 09/014,095

[22] Filed: Jan. 27, 1998

[30] Foreign Application Priority Data

| Jan. 29, 1997 | [JP] | Japan | 9-015729 |
| Apr. 25, 1997 | [JP] | Japan | 9-109935 |
| Nov. 4, 1997 | [JP] | Japan | 9-301551 |
| Dec. 1, 1997 | [JP] | Japan | 9-330647 |

[51] Int. Cl.$^6$ .................................................. C09D 11/02
[52] U.S. Cl. ........................... 106/31.49; 106/31.48; 106/31.51; 106/31.52; 106/31.58
[58] Field of Search ............... 106/31.49, 31.48, 106/31.51, 31.52, 31.58

[56] References Cited

U.S. PATENT DOCUMENTS

| 4,963,189 | 10/1990 | Hindagolla | 106/31.52 |
| 5,062,893 | 11/1991 | Adamic et al. | 106/31.52 |
| 5,189,154 | 2/1993 | Gregory et al. | 540/126 |
| 5,203,912 | 4/1993 | Greenwood et al. | 106/31.52 |
| 5,262,527 | 11/1993 | Gregory et al. | 106/31.48 |
| 5,268,459 | 12/1993 | Gregory et al. | 106/31.48 |
| 5,269,023 | 12/1993 | Gregory et al. | 106/31.49 |
| 5,370,730 | 12/1994 | Gregory et al. | 106/31.52 |
| 5,374,301 | 12/1994 | Gregory et al. | 106/31.48 |
| 5,451,251 | 9/1995 | Mafune et al | 106/31.49 |
| 5,473,053 | 12/1995 | Kenyon et al. | 106/31.48 |
| 5,616,694 | 4/1997 | Kenyon et al. | 106/31.48 |
| 5,704,969 | 1/1998 | Kanaya et al. | 106/31.48 |
| 5,756,692 | 5/1998 | Gregory et al. | 106/31.48 |
| 5,759,248 | 6/1998 | Gregory et al. | 106/31.48 |
| 5,772,745 | 6/1998 | Gregory et al. | 106/31.48 |
| 5,773,593 | 6/1998 | Gregory et al. | 106/31.48 |

FOREIGN PATENT DOCUMENTS

| A-2-233781 | 9/1990 | Japan . |
| A-3-91577 | 4/1991 | Japan . |
| A-4-226175 | 8/1992 | Japan . |
| A-4-270286 | 9/1992 | Japan . |
| A-4-279671 | 10/1992 | Japan . |
| A-6-228482 | 8/1994 | Japan . |
| A-6-248211 | 9/1994 | Japan . |
| A-6-279717 | 10/1994 | Japan . |
| A-7-102199 | 4/1995 | Japan . |
| A-7-150086 | 6/1995 | Japan . |
| A-8-505889 | 6/1996 | Japan . |

*Primary Examiner*—Helene Klemanski
*Attorney, Agent, or Firm*—Oliff & Berridge, PLC

[57] ABSTRACT

Disclosed is a color ink set for ink-jet recording, which color ink set comprises a set of single-color ink, namely, cyan ink, magenta ink, yellow ink and black ink, each single-color ink containing at least a colorant, a water-soluble organic solvent and water, wherein the colorant in the single-color ink has a specific chemical structure, and which color ink set for ink-jet recording fulfills the characteristics required for ink-jet recording ink, along with the details of single-color ink constituting the ink set and an ink-jet recording method using the color ink set.

30 Claims, 1 Drawing Sheet

INK SET FOR INK JET RECORDING AND INK JET RECORDING METHOD

FIELD OF INVENTION

The present invention relates to ink for ink jet used in an ink jet type recording apparatus and also to a method for ink-jet recording using said ink jet type ink.

DESCRIPTION OF THE RELATED ART

The principle of ink-jet recording comprises ejecting liquid or fused ink from a nozzle, slit, porous film or the like so that recording is performed on paper, cloth, film or the like. As a method for ejecting ink, a variety of methods have been proposed. For example a charge-controlling method wherein ink is ejected by utilizing electrostatic attraction, a drop-on-demand method (pressurized pulse method) wherein ink is ejected by utilizing the vibrating pressure of a piezoelement, and a hot ink jet method wherein ink is ejected by utilizing pressure created by forming and growing bubbles by means of heat. Owing to these methods, it is possible to obtain images of extremely high clarity.

As for the ink to be used in the ink-jet recording, well known are, for example, a water-based dye ink prepared by dissolving a water-soluble dye in a liquid medium comprising water and a water-soluble organic solvent, a water-based pigment ink prepared by dispersing a pigment in a liquid medium comprising water and a water-soluble organic solvent and an oil-based dye ink prepared by dissolving an oil-soluble dye in an organic solvent.

Among these types of ink, water-based ink is in the main stream of inks for ink-jet recording. This is because water-based ink has the advantages of being superior in safety due to the water which is used as a main solvent, of providing high-quality printed images due to excellent color formation achieved by using a dye. It also has excellent storability.

However, water-based ink has the disadvantage of low oriented image water resistance because water-soluble dye is used as the colorant.

Currently, ways of improving the conventional types of ink mentioned above are being examined. With regard to the properties of each single-color ink for use in an ink jet printer, the following requirements (1) to (6) are presented for study.

(1) The image should have a high solid and line density on photocopying paper, bond paper and other such common type.

(2) The image obtained should be excellent in water resistance and light fastness.

(3) The ink should not clog nozzles, and the stability and direction of ejection should be excellent at all times.

(4) The ink should have good stability over a long period of storage.

(5) There should be no kogation on the heater in hot ink-jet recording.

(6) The ink should dry quickly on paper.

Further, with regard to the properties of a color ink set prepared by combining a plurality of single-color inks for the formation of a color image, the following requirements (7) and (8) should be added to the above-mentioned properties of the single-color inks.

(7) The ink should be excellent in color formation such as hue and chroma of secondary RGB colors, and should have a broad range of color reproduction of color printed images.

(8) The ink should not produce color bleeding.

Heretofore, many proposals have been made in order to meet the above-mentioned requirements (1) to (8).

In order to produce a high density of image and to improve the water resistance of image by use of single-color ink on plain paper, many proposals have been made. For example, Japanese Patent Application Laid-Open (JP-A) Nos. 3-91,577; 4-226,175; 4-279,671; 4-270,286 and Japanese Patent Application National Publication(Laid-open) No. 8-505,889 propose a method wherein the water resistance is improved by using a dye having a carboxyl group. This type of ink has a excellent water resistance, but has the a disadvantage that, if the ink is used on plain paper, in particular an acidic paper having a surface pH value on the acidic side, the hue of the printed image becomes dull instead of the vivid hue inherent to the ink and the image obtained has a low density of image. In addition, since the solubility of the dye decreases and clogging of the ink nozzles is liable to occur as water evaporates or as ammonium ions acting as counter ions evaporate from the ink, this problem impairs the reliability, such as storage stability, of the ink.

Further, if a color ink set prepared by combining a plurality of single-color inks is used to obtain a color image, the secondary RGB color formation deteriorates markedly. This has the problem that only color images within a narrow field of color reproduction can be obtained.

In order to improve the above-described problems involved in the printing of a full-color image, JP-A No. 6-228,482 proposes a method wherein a mixture of single-color dyes is used. This ink has a disadvantage. The water resistance of the image obtained is poor, although it improves the hue of single-color ink as well as of a color ink set prepared by combining a number of the single-color ink and also secondary RGB color formation, and although it alleviates the problem of nozzle clogging.

For the improvement of the hue on acidic paper, the addition of a pH buffering agent is effective in the case of an ordinary type of ink. However, in the case of the ink for ink-jet recording, the addition of an inorganic salt such as potassium dihydrogen phosphate or sodium tetraborate causes problems such as nozzle clogging and deterioration in the stability of ink ejection.

JP-A No. 2-233,781 proposes the addition of a carboxylate having a pka value of 4.3 or greater to ink so that the color reproduction is improved on acidic paper.

However, the disadvantages linked with these salts are that these salts in general have a smell and that, if any one of these salts is used together with a dye represented by the general formula I for use in the present invention, the interaction between the salt and the dye decreases the solubility of the dye. This causes deposition of the dye so that the nozzle gets clogged and the ejection stability of the ink becomes inferior. In addition, image breakdown and reduced printing density arise.

Meanwhile, for the improvement of the hue, JP-A No. 6-279,717 proposes to use a dye represented by the general formula I together with a dye having, as a water-solubilizing group, no more than one carboxyl group and more than one sulfonic acid group.

The use of the disclosed dyes makes it possible to improve the hue. However, the disadvantages of this ink are that the clogging is not sufficiently obviated and kogation which is a problem in hot ink-jet recording is not sufficiently obviated. As a result, this ink cannot prevent decreases in the density of images and cannot ensure the reproduction of fine lines when the ink is continuously ejected over a long period of time.

For the enhancement of the stable solubility of a dye represented by the general formula I, JP-A Nos. 6-248,211; 7-102,199 and 7-150,086 propose the use of the dye represented by the general formula I in combination with another specific dye.

The use of these dyes makes it possible to reduce clogging. However, the kogation which is a problem in hot ink-jet recording is not sufficiently obviated. As a result, this ink cannot prevent the decrease in the density of images and cannot ensure the reproduction of fine lines when the ink is continuously ejected over a long period of time.

As stated above, in the field of water-based dye inks for ink-jet recording, prior art is still unable to provide ink which produces an image excellent in water resistance and fulfills a variety of requirements such as coloring capability, stability in ejection, secondary RGB color formation, and a range of color gamut.

SUMMARY OF THE INVENTION

Based on the background stated above, the present invention was made in order to solve the problems and to meet all of the above-mentioned requirements.

Accordingly, an object of the present invention is to provide a highly reliable ink set which is capable of solving the problems associated with prior art and fulfilling the requirements for ink designed for ink-jet recording and which is characterized in that the image obtained has excellent water resistance and hue; the secondary RGB color formation is excellent; the ink produces a full-color image having a broad range of color gamut; the ink has no smell; the image obtained has a high density; the ink does not clog the nozzles and thus provides excellent ejection stability; the ink does not cause kogation; the ink provides a stabilized density of image and reproduction of fine lines even when the ink is continuously ejected over a long period of time; the ink is even excellent in regaining the ejecting capability after a long period of non-use; and the ink does not corrode members, such as recording heads, which come into contact with the ink. Another object of the present invention is to provide a method for ink-jet recording using the ink designed for ink-jet recording.

After studies, the present inventors have achieved the invention based on the discovery that the use of a specific combination of dyes in a color ink set enables the color ink set to exhibit desirable properties, such as excellent color formation by single-color ink itself as well as excellent secondary RGB color formation, a broad range of color gamut and stability in ejection of ink, which properties were incompatible with water resistance.

DETAILED DESCRIPTION OF THE INVENTION

Figure 1:
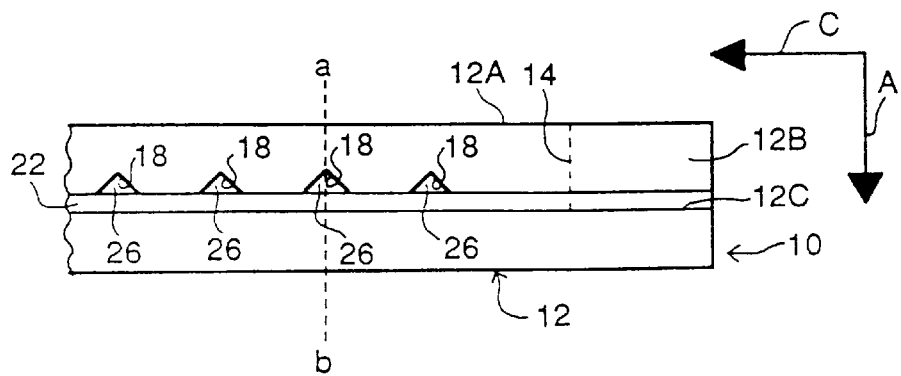
FIG. 1 is a front view illustrating an example of the recording head for use in a recording apparatus based on hot ink-jet recording.

The objects of the invention are achieved by the present invention which is described in detail below. The present invention provides a color ink set for ink-jet recording, the color set comprising a set of single-color ink, namely, cyan-color ink, magenta-color ink, yellow-color ink, and, if necessary, black-color ink, each single-color ink comprising at least a colorant, a water-soluble organic solvent and water, wherein the colorants contained in the foregoing single-color ink have the following compositions (a) to (d), respectively. In addition, the present invention provides a method for ink-jet recording using the ink designed for ink-jet recording.

Ink set for use in ink-jet recording

The compositions of the ink constituting the ink set are given below.

Colorant in each single-color ink (a) colorant in the cyan-color ink

The colorant in the cyan-color ink is a mixture of a colorant represented by the general formulas I and/or II and at least one colorant selected from the group consisting of C.I. Acid Blue 9, C.I. Direct Blue 199 and C.I. Direct Blue 86.

The colorant represented by the general formula I and/or II used in the present invention (hereinafter referred to as "a dye represented by the general formulas I and/or II" on occasion) is a phthalocyanine dye having a carboxyl group. However, the colorant exhibits an excellent water resistance, because the free acid has a relatively low solubility in water and because the solubility in a liquid medium abruptly drops at a pH value of below 7.

The colorant represented by the general formula I has the following structure.

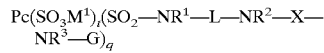

General Formula I where Pc represents a phthalocyanine nucleus containing a metal, $R^1$, $R^2$ and $R^3$ are each independently selected from the group consisting of a hydrogen atom, an alkyl group, a substituted alkyl group, an alkenyl group, a substituted alkenyl group, an aralkyl group and a substituted aralkyl group, L represents a divalent organic linking group, and X represents a carbonyl group or a group represented by any one of the formulas (1) to (3) given below. In the formulas (1) to (3), Z represents $NR^4R^5$, $SR^6$ or $OR^6$, Y represents H, Cl, Z, $SR^7$ or $OR^7$, and E represents Cl or CN. $R^4$, $R^5$, $R^6$ and $R^7$ are each independently selected from the group consisting of a hydrogen atom, an alkyl group, a substituted alkyl group, an aryl group, a substituted aryl group, an aralkyl group and a substituted aralkyl group or $R^4$ and $R^5$ represent a group forming a 5 or 6 membered ring with a bonded nitrogen atom. Examples of the substituents include a hydroxyl group, a carboxyl group and a sulfonic acid group.

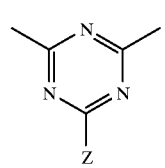

(1)

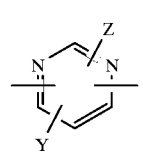

(2)

-continued (3)

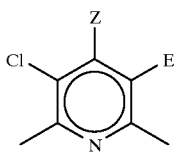

G represents an organic group bearing one or two substituents selected from the group consisting of —COSM$^2$ and —COOM$^2$, (t+q) is 3 to 4, and q is equal to or greater than 1. The colorant represented by the general formula I has at least one —COOM group and at least one —SO$_3$M group such that the sum of the number of the —COSM and —COOM groups is equal to or greater than the number of —SO$_3$M groups. M$^1$ and M$^2$ each represent a counter ion and are each a hydrogen atom or a base selected from the group consisting of an alkali metal, ammonium and an amine.

R$^1$, R$^2$ and R$^3$ are each independently selected from the group consisting of a hydrogen atom, an alkyl group, a substituted alkyl group, an alkenyl group, a substituted alkenyl group, an aralkyl group and a substituted aralkyl group; and R$^4$, R$^5$, R$^6$ and R$^7$ are each independently selected from the group consisting of a hydrogen atom, an alkyl group, a substituted alkyl group, an aryl group, a substituted aryl group, an aralkyl group and a substituted aralkyl group or R$^4$ and R$^5$ represent a group forming a 5 or 6 membered ring with a bonded nitrogen atom. Preferable examples of these groups include a hydrogen atom, an alkyl group having 1 to 5 carbon atoms and a substituted alkyl group which has 1 to 5 carbon atoms and is substituted by an —OH or —COOH group.

The colorant which is used in the present invention and represented by the general formula II has the following structure.

General Formula II

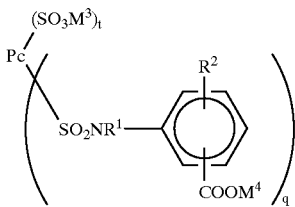

where Pc represents a phthalocyanine nucleus containing a metal, R$^1$ is selected from the group consisting of a hydrogen atom, an alkyl group, a substituted alkyl group, an alkenyl group, a substituted alkenyl group, an aralkyl group and a substituted aralkyl group, R$^2$ is selected from the group consisting of a hydrogen atom, an alkyl group, an alkoxy group, a halogen atom, an amino group and a substituted amino group, (t+q) is 3 to 4, and q is equal to or greater than 1. M$^3$ and M$^4$ each represent a counter ion and are each a hydrogen atom or a base selected from the group consisting of an alkali metal, ammonium and an amine.

Examples of the substituents include a hydroxyl group, a carboxyl group and a sulfonic acid group.

R$^1$ is independently selected from the group consisting of a hydrogen atom, an alkyl group, a substituted alkyl group, an alkenyl group, a substituted alkenyl group, an aralkyl group and a substituted aralkyl group; and R$^2$ is selected from the group consisting of a hydrogen atom, an alkyl group, an alkoxy group, a halogen atom, an amino group and a substituted amino group. Preferable examples of these groups include a hydrogen atom, an alkyl group having 1 to 5 carbon atoms and a substituted alkyl group which has 1 to 5 carbon atoms and is substituted by an —OH or —COOH group.

The —COOM group is present preferably in the second, third, fifth or sixth position in the formula, and more preferably in the second or third position in the formula.

In the general formulas I and II, M$^1$, M$^2$, M$^3$ and M$^4$, which represent a counter ion, are each a hydrogen atom or a base selected from the group consisting of an alkali metal, ammonium and an amine. Illustrative nonlimiting examples of the counter ion include a sodium ion, a lithium ion, a potassium ion, an ammonium ion and an alkanolammonium ion such as a triethanolammonium ion. A particularly preferable example of the counter ion is an ammonium ion, because the ammonium ion evaporates in the form of ammonia from the print produced on a recording medium such as paper to leave the colorant represented by the general formula I and/or II as a free acid on the recording medium, and, as a result, the water resistance of the print increases.

In the general formulas I and II, Pc represents a phthalocyanine nucleus containing a metal, where the metal is preferably nickel, copper, iron, titanium, vanadium or the like, and most preferably copper.

Among the colorants represented by the general formula I or II, the structure represented by the general formula III is particularly preferable.

General Formula III

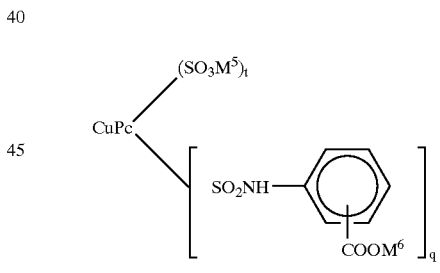

where CuPc represents a phthalocyanine nucleus containing copper, and M$^5$ and M$^6$ each represent a counter ion.

Preferable examples (compounds I-1~I-19) of the colorant represented by the general formula I and preferable examples (compounds II-1~II-11) of the colorant represented by the general formula II are given below. However, it should be noted that the present invention is not limited to these examples.

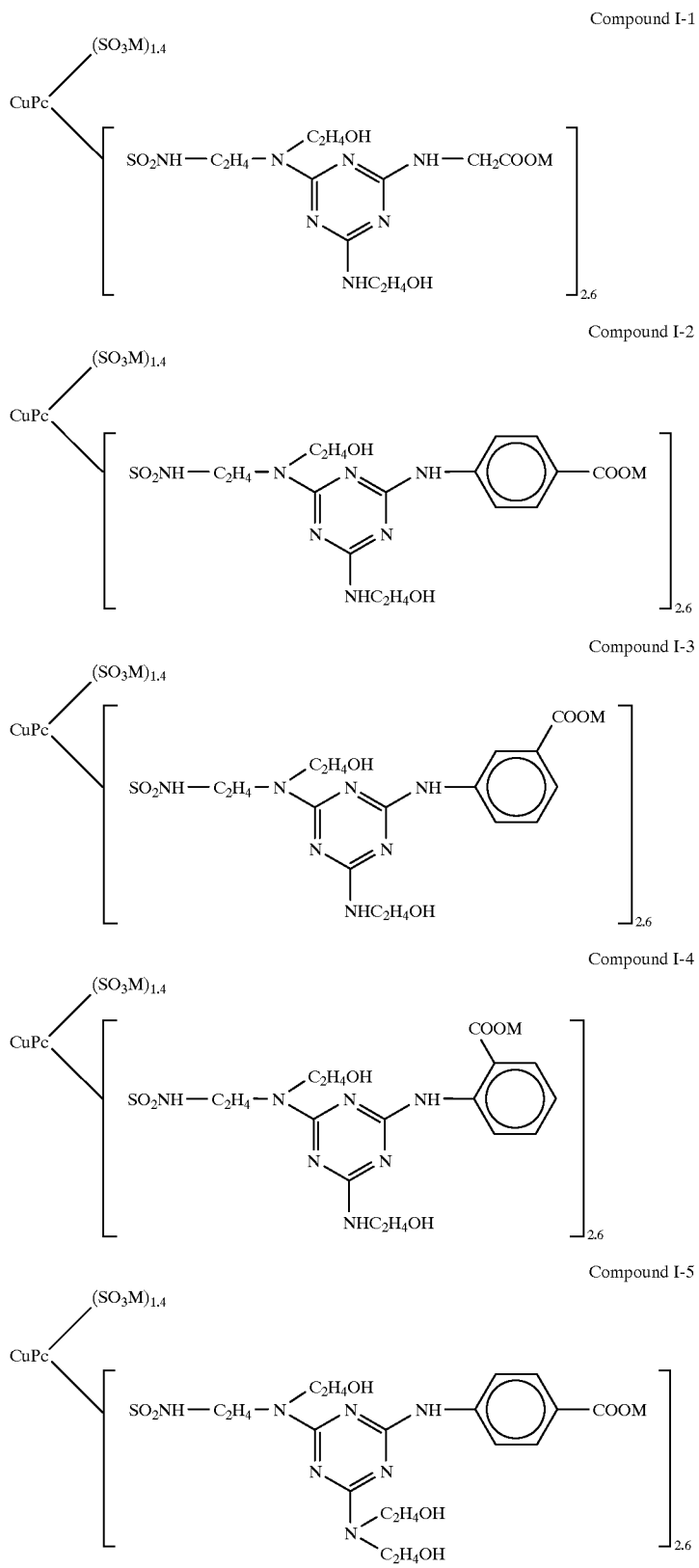

Compound I-6
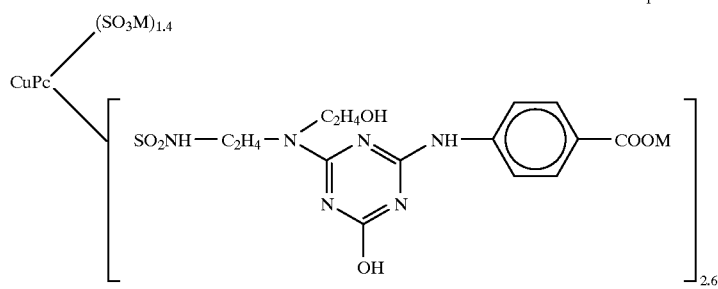
Compound I-7
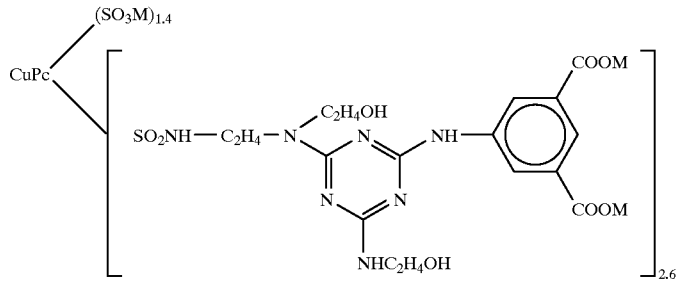
Compound I-8
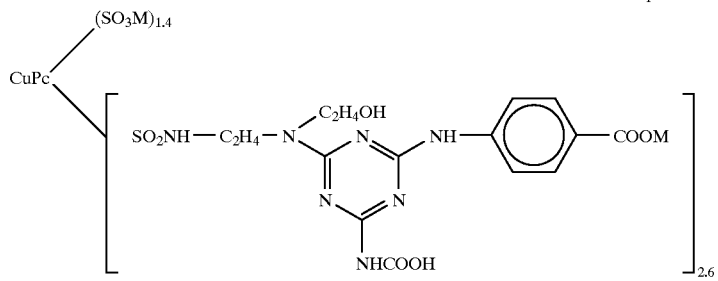
Compound I-9
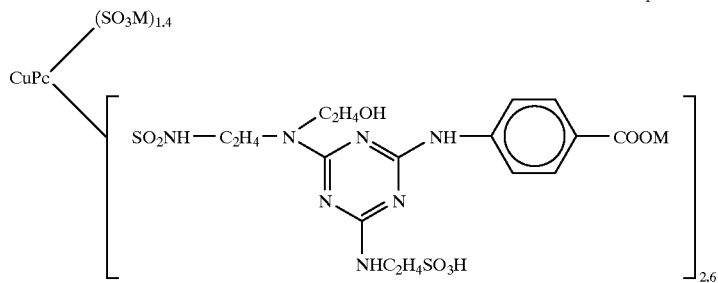
Compound I-10
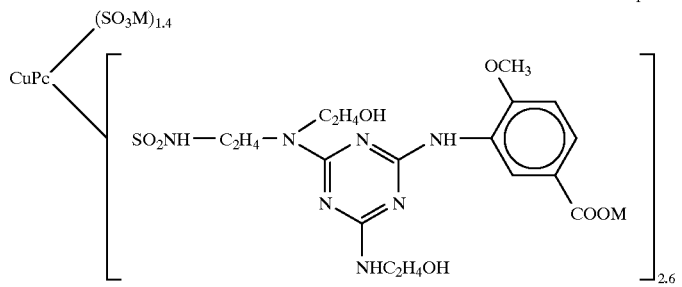

-continued
Compound I-11
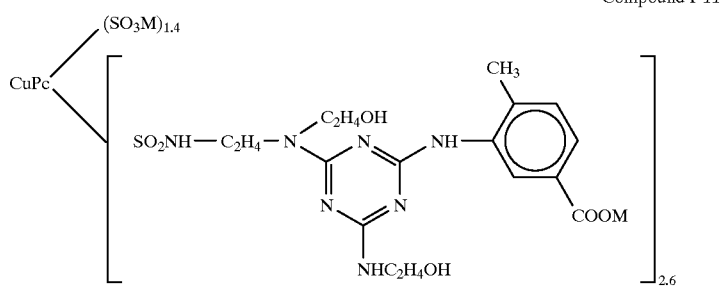
Compound I-12
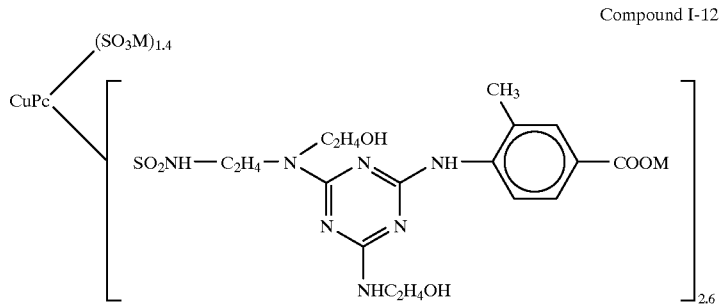
Compound I-13
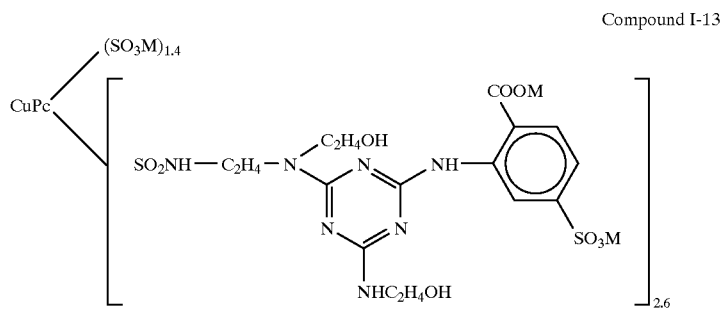
Compound I-14
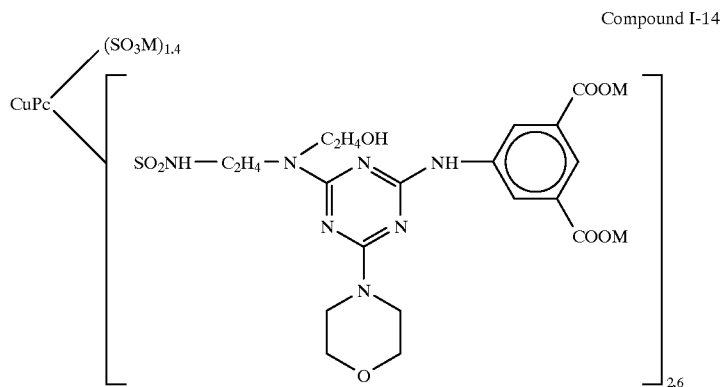

-continued
Compound I-15
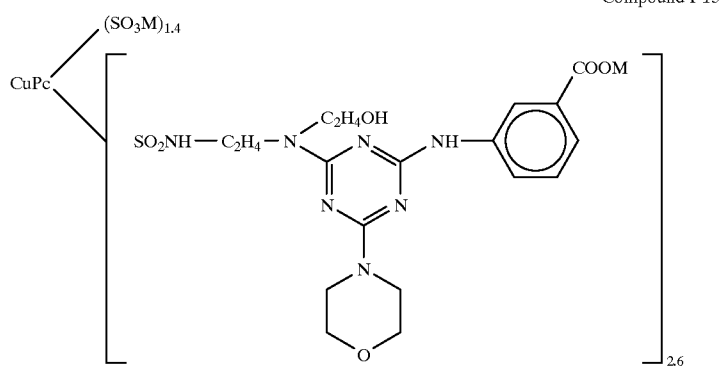
Compound I-16
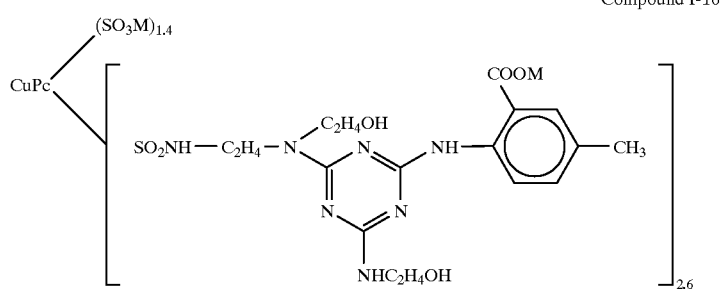
Compound I-17
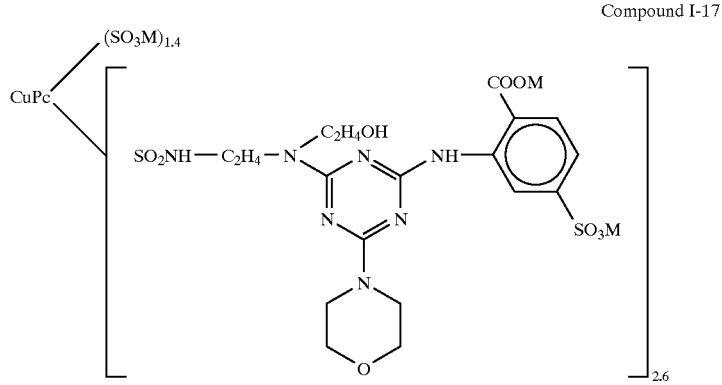
Compound I-18
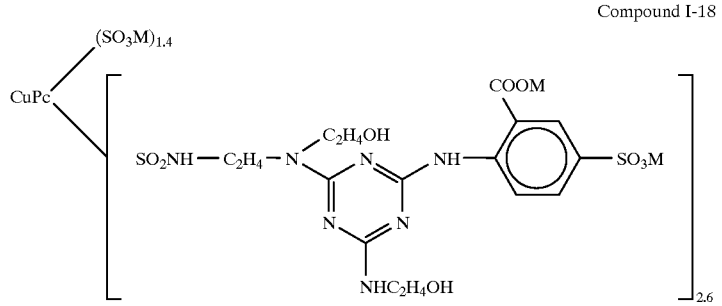

Compound I-19
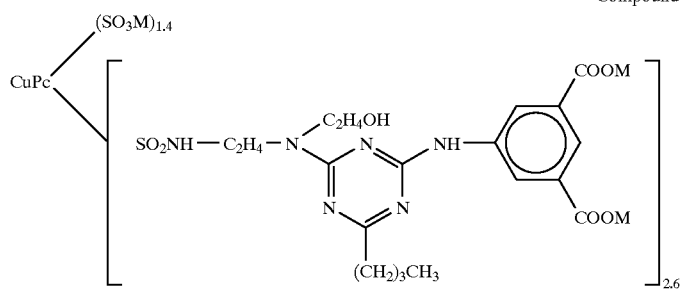
Compound II-1
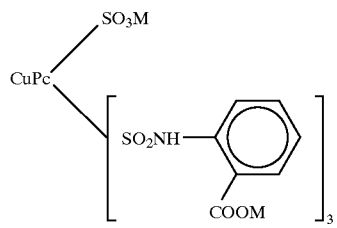
Compound II-2
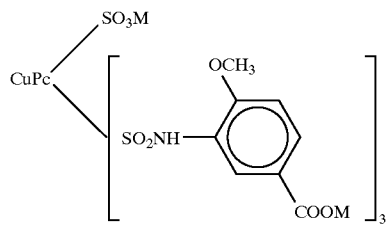
Compound II-3
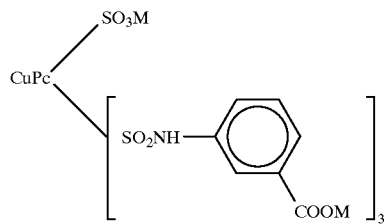
Compound II-4
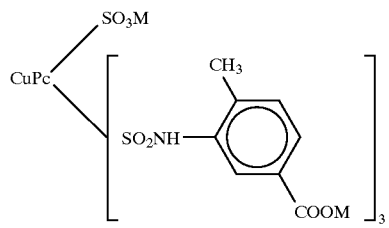
Compound II-5
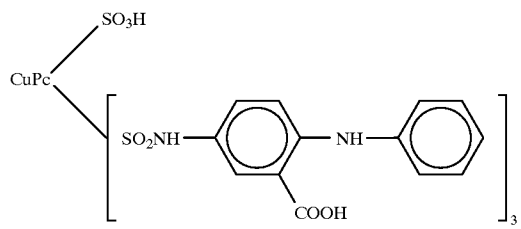

-continued

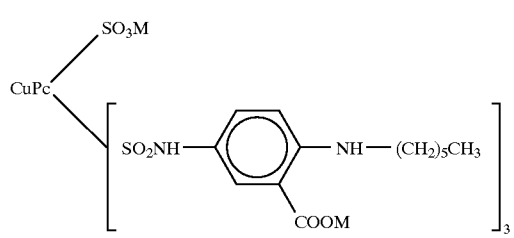

Compound II-6

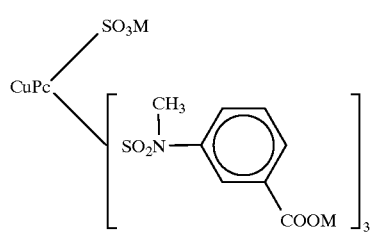

Compound II-7

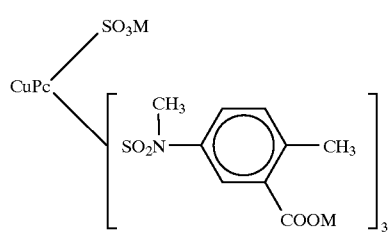

Compound II-8

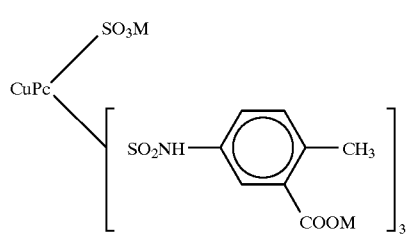

Compound II-9

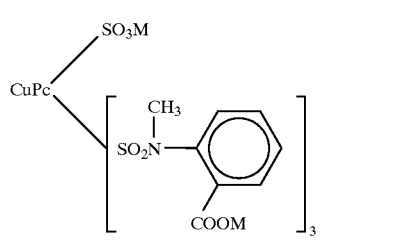

Compound II-10

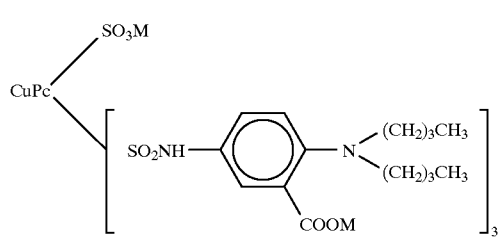

Compound II-11

(b) colorant in the magenta-color ink

The colorant in the magenta-color ink is a mixture of a colorant represented by the general formula IV and at least one colorant selected from the group consisting of a colorant represented by the general formula V, C.I. Acid Red 23, C.I. Acid Red 249 and C.I. Direct Red 227.

$$Ar^1-N=N-J-X-L-X-J-N=N-Ar^2 \quad \text{General Formula IV}$$

In the general formula IV, J represents the group given below. $Ar^1$ and $Ar^2$ are each independently selected from the group consisting of an aryl group and a substituted aryl group. At least one of $Ar^1$ and $Ar^2$ has at least one group selected from the group consisting of —$COSM^7$ and —$COOM^7$. L represents a divalent organic linking group. X represents a carbonyl group or a group represented by any one of the formulas (1) to (3) given below.

The general formula V has at least one —COOM group and at least one —$SO_3M$ group such that the sum of the number of the —COSM and —COOM groups is at least equal to the number of the —$SO_3M$ group. $M^5$, $M^6$ and $M^7$ each represent a counter ion and are each a hydrogen atom or a base selected from the group consisting of an alkali metal, ammonium and an amine.

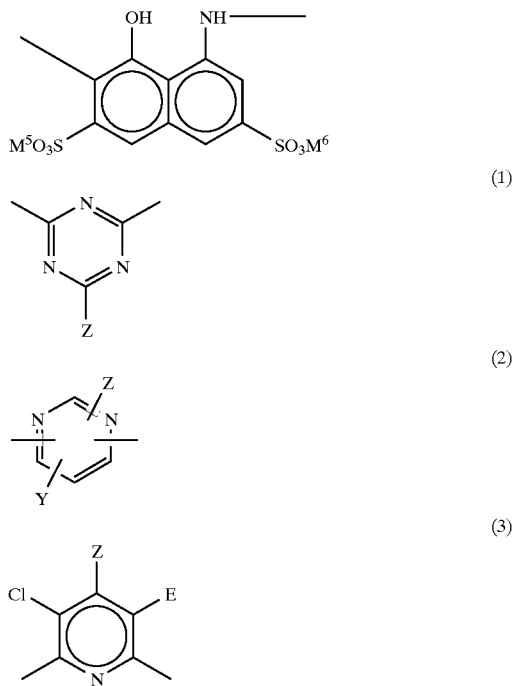

In the formulas (1) to (3), Z represents $NR^1R^2$, $SR^3$ or $OR^3$, Y represents H, Cl, Z, $SR^4$ or $OR^4$, and E represents Cl or CN. $R^1$, $R^2$, $R^3$ and $R^4$ are each independently selected from the group consisting of a hydrogen atom, an alkyl group, a substituted alkyl group, an alkenyl group, a substituted alkenyl group, an aralkyl group and a substituted aralkyl group or $R^1$ and $R^2$ represent a group forming a 5 or 6 membered ring with a bonded nitrogen atom.

General Formula V

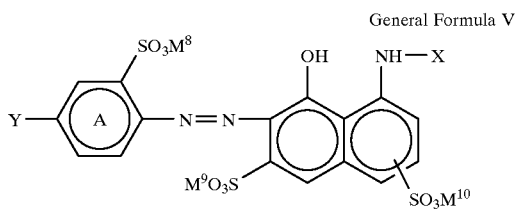

In the general formula V, Y is selected from the group consisting of a hydrogen atom, a methyl group, a methoxy group, an acetylamino group and a nitro group and may form another benzene ring together with a carbon atom present at the third position of the benzene ring A. X represents a group selected from the group consisting of an acetyl group, a benzoyl group, a p-toluenesulfonyl group and 4-chloro-6-hydroxy-1,3,5-triazine-2-il group. $M^8$, $M^9$ and $M^{10}$ each represent a counter ion and are each a hydrogen atom or a base selected from the group consisting of an alkali metal, ammonium and an amine.

In the colorant represented by the general formula IV, $M^5$, $M^6$ and $M^7$, which each represent a counter ion, are each a base selected from the group consisting of an alkali metal, ammonium and an amine. Illustrative nonlimiting examples of the counter ion include a sodium ion, a lithium ion, a potassium ion, an ammonium ion and an alkanolammonium ion such as triethanolammonium ion. A particularly preferable example of the counter ion is an ammonium ion, because the ammonium ion leads to the increase in the water resistance of the print.

In the colorant represented by the general formula IV, $R^1$, $R^2$, $R^3$ and $R^4$ are each independently selected from the group consisting of a hydrogen atom, an alkyl group, a substituted alkyl group, an alkenyl group, a substituted alkenyl group, an aralkyl group and a substituted aralkyl group or $R^1$ and $R^2$ represent a group forming a 5 or 6 membered ring with a bonded nitrogen atom. Preferable examples of these groups include a hydrogen atom, an alkyl group having 1 to 5 carbon atoms and a substituted alkyl group which has 1 to 5 carbon atoms and is substituted by an —OH or —COOH group.

Among the colorants represented by the general formula IV, the structure represented by the general formula VI is particularly preferable.

General Formula VI

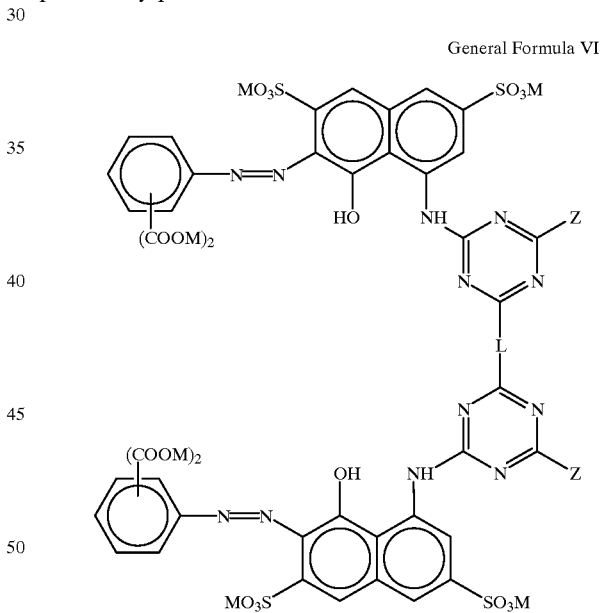

In the formula VI, L represents a divalent organic linking group. Z represents $NR^1R^2$, $SR^3$ or $OR^3$. $R^1$, $R^2$ and $R^3$ are each selected independently from the group consisting of a hydrogen atom, an alkyl group, a substituted alkyl group, an alkenyl group, a substituted alkenyl group, an aralkyl group and a substituted aralkyl group or $R^1$ and $R^2$ represent a group forming a 5 or 6 membered ring with a bonded nitrogen atom.

Preferable examples (compounds IV-1~IV-21) of the colorant represented by the general formula IV are given below. However, it should be noted that the present invention is not limited to these examples.

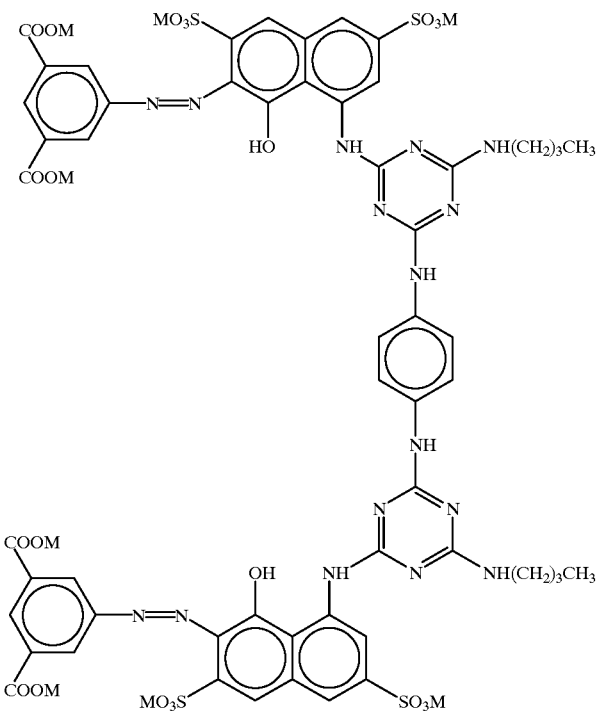
Compound IV-1
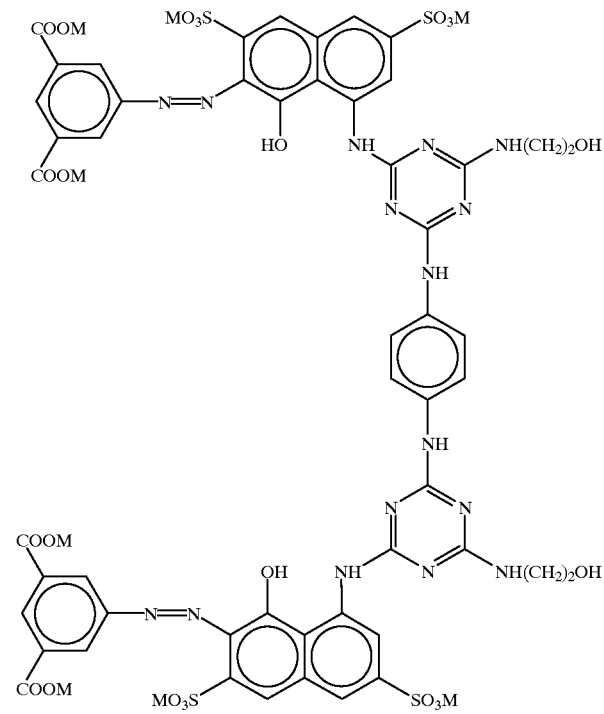
Compound IV-2

-continued
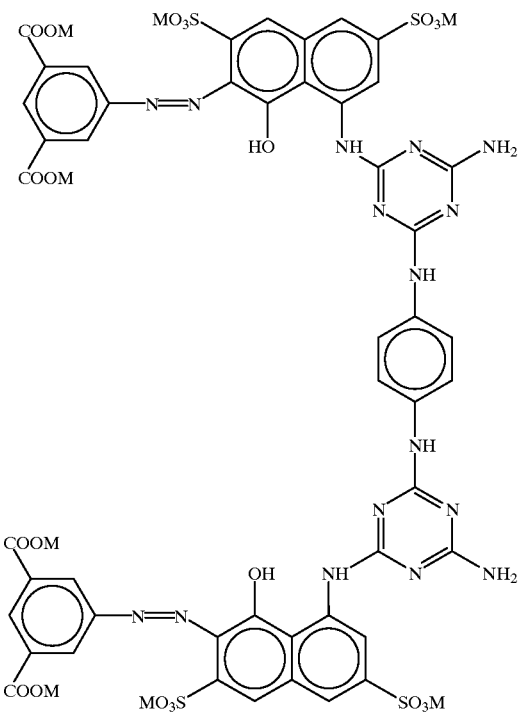
Compound IV-3
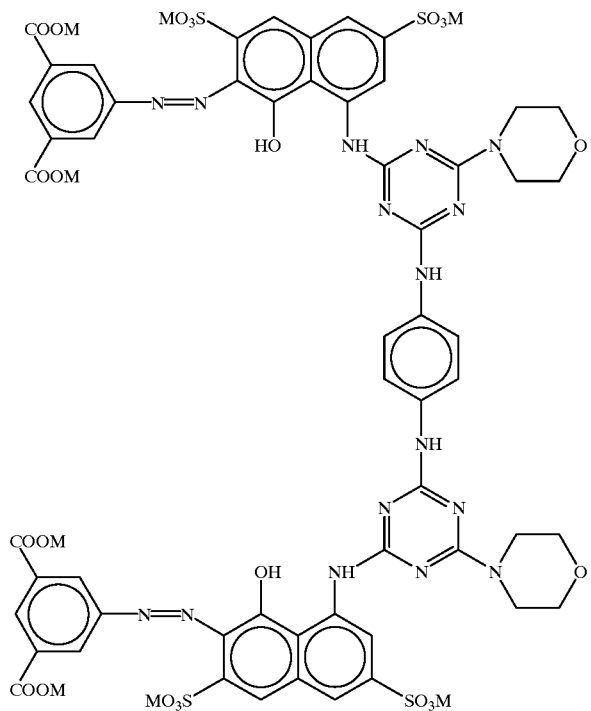
Compound IV-4

Compound IV-5
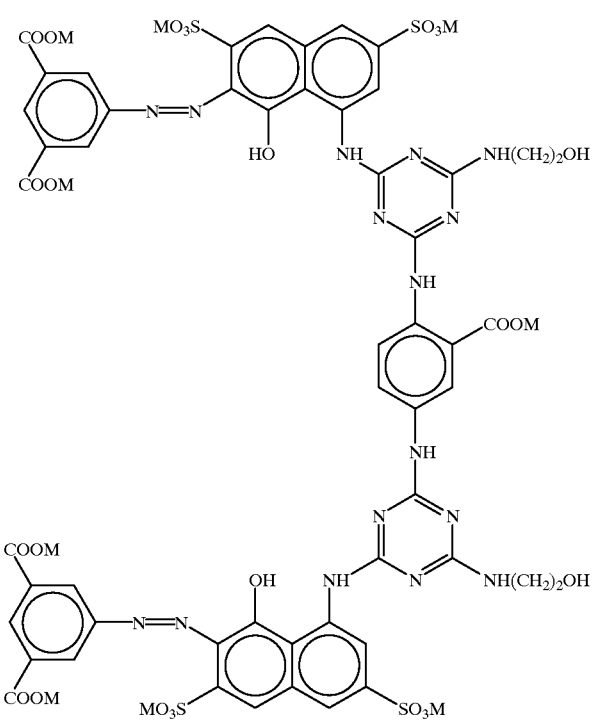
Compound IV-6
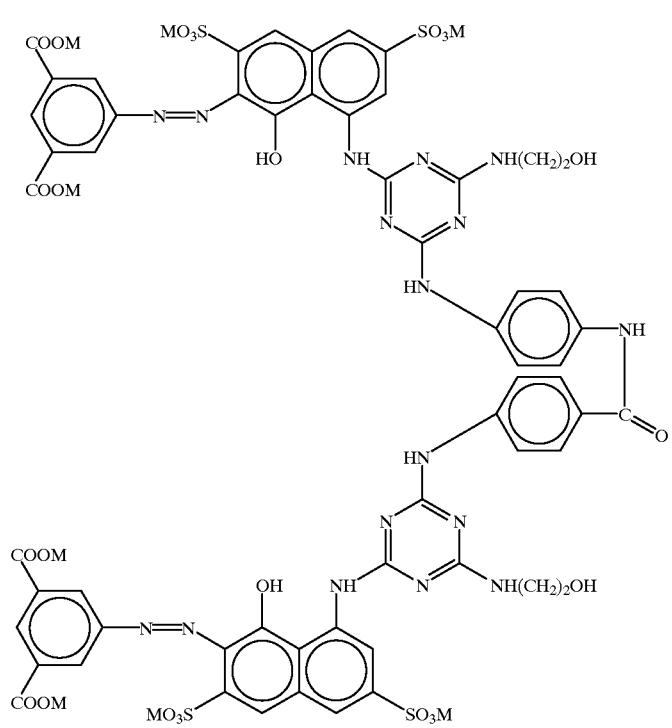

-continued
Compound IV-7
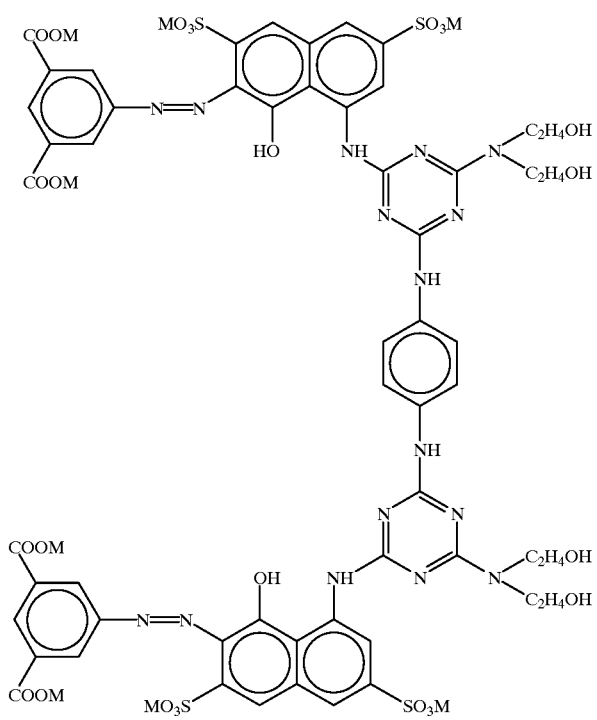
Compound IV-8
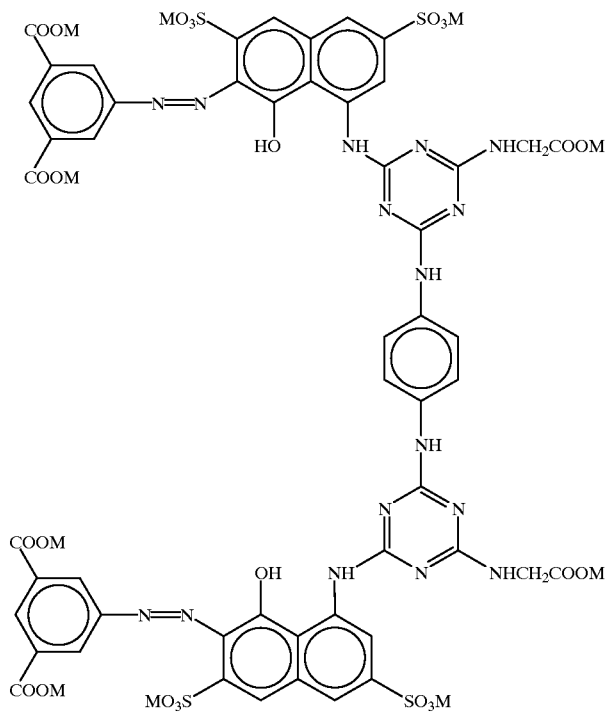

-continued
Compound IV-9
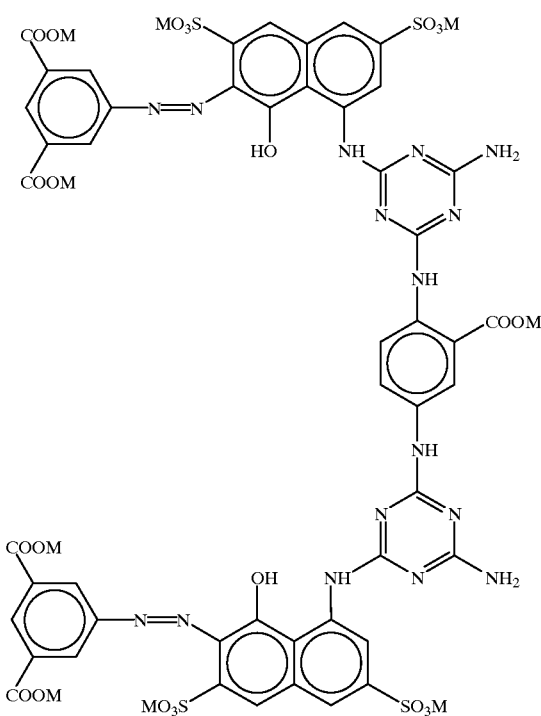
Compound IV-10
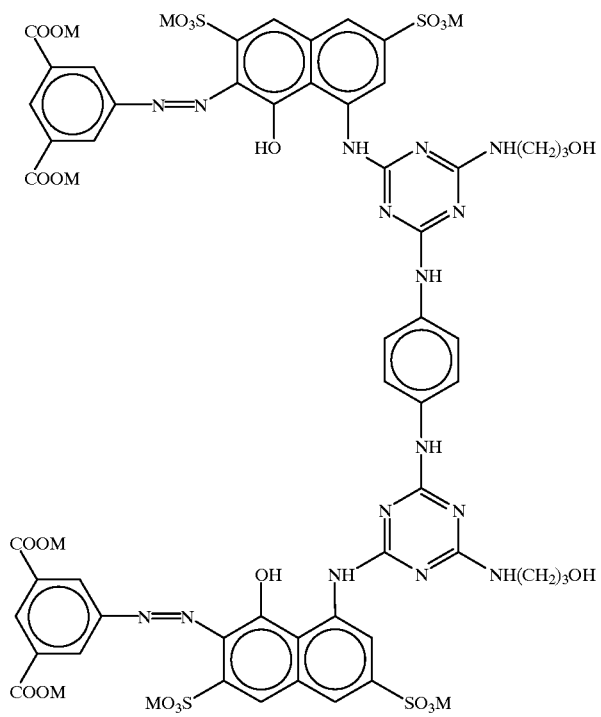

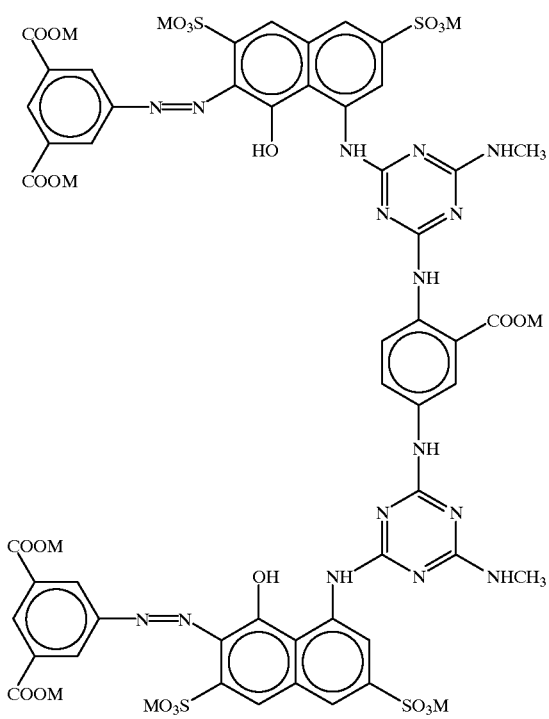
Compound IV-11
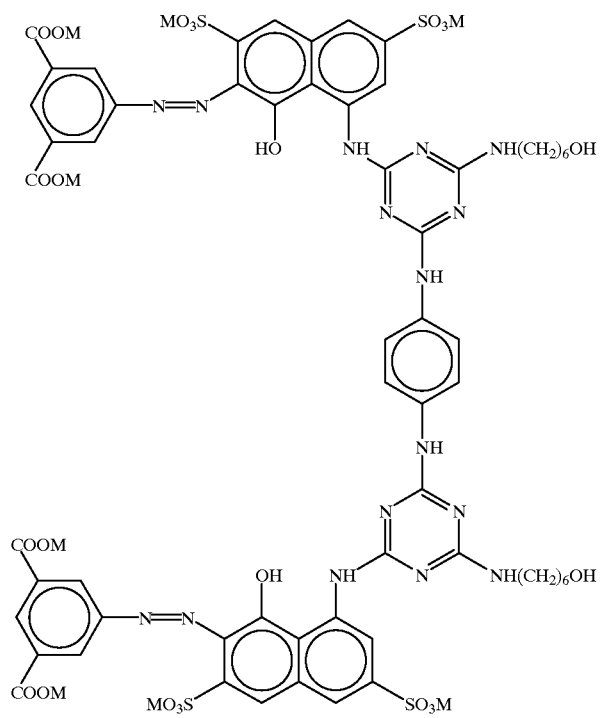
Compound IV-12

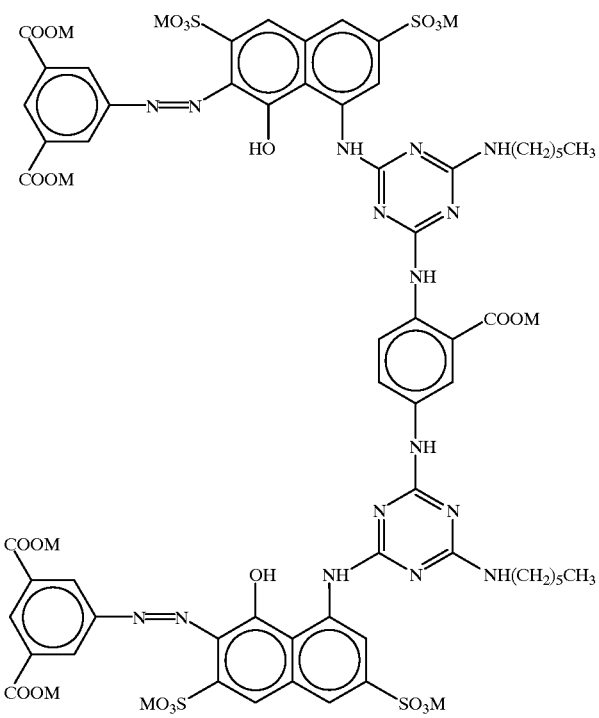
Compound IV-13
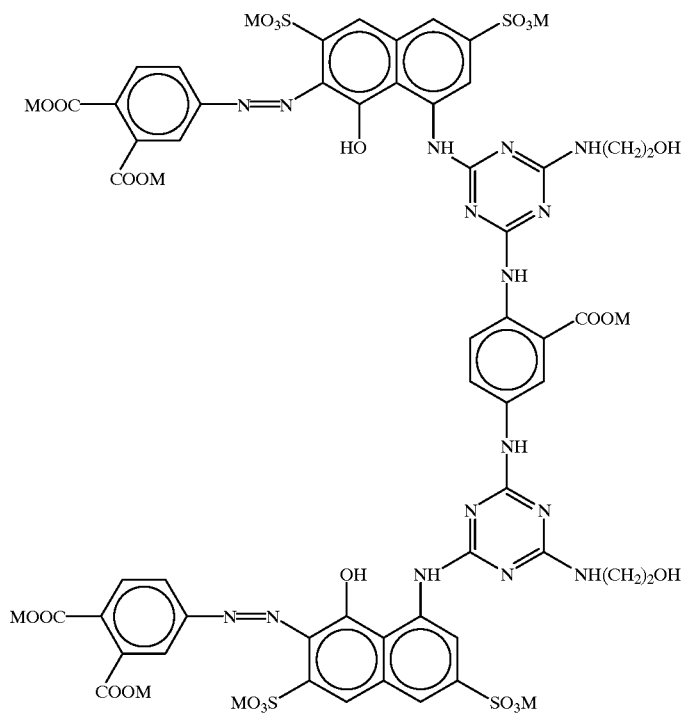
Compound IV-14

Compound IV-15
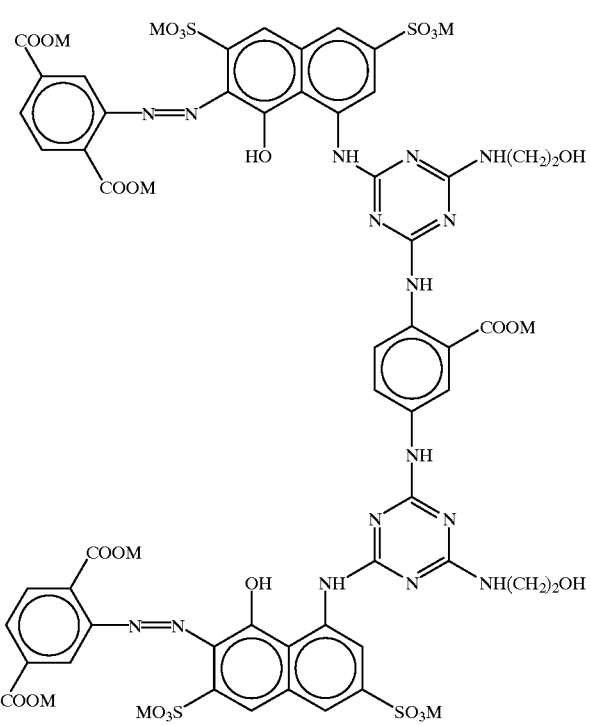
Compound IV-16
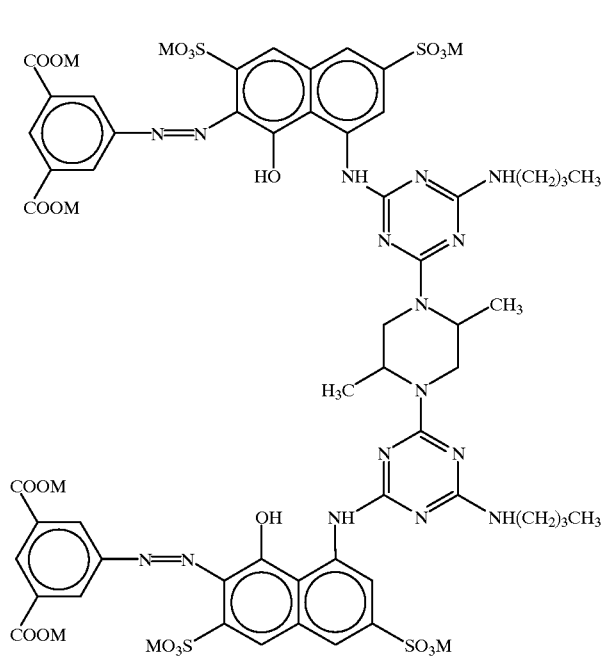

-continued
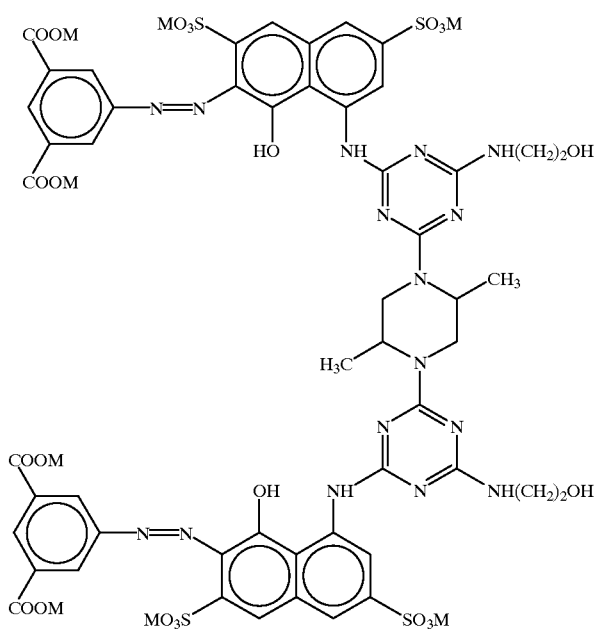
Compound IV-17
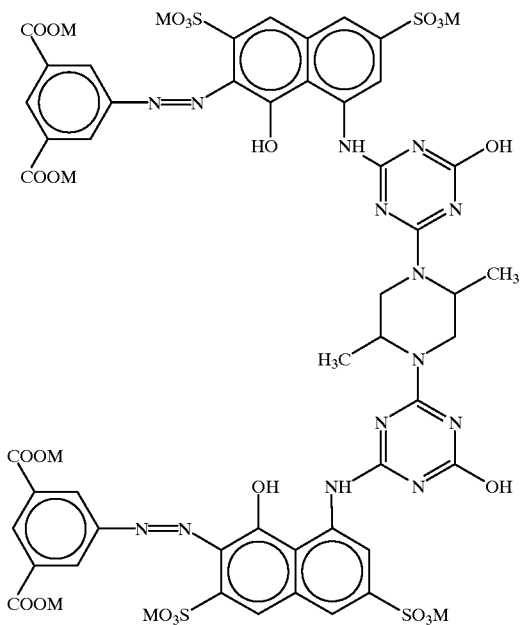
Compound IV-18

-continued
Compound IV-19
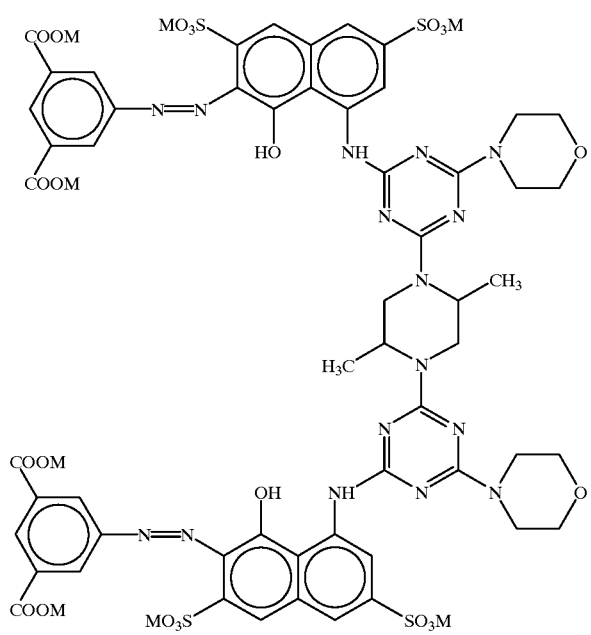
Compound IV-20
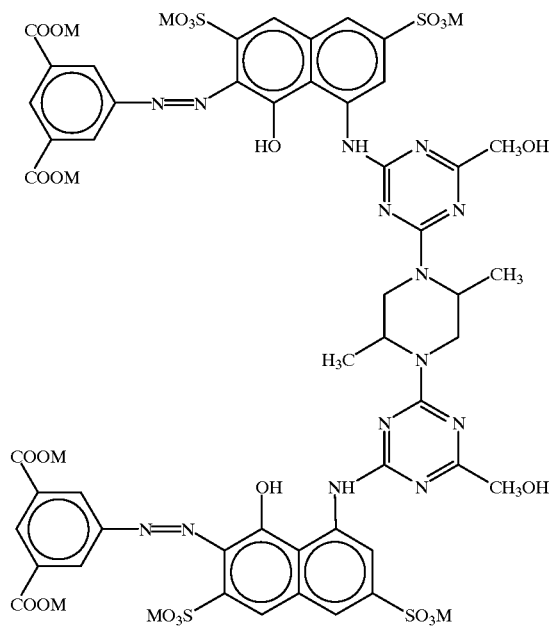

Compound IV-21

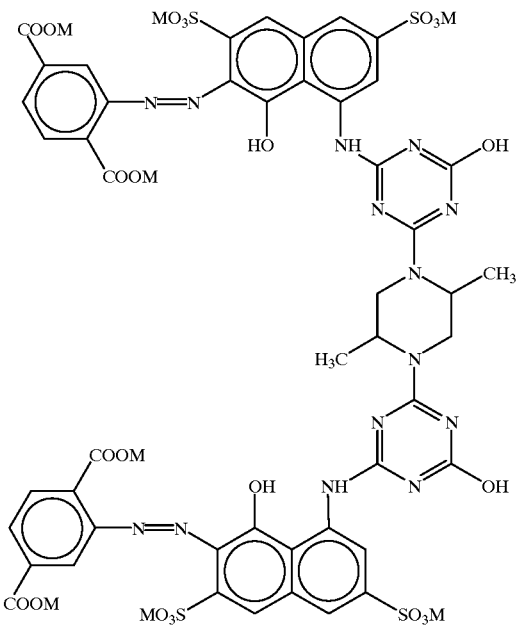

In the present invention, the colorant which is used in combination with the colorant represented by the general formula IV is at least one colorant selected from the group consisting of a colorant represented by the general formula V, C.I. Acid Red 23, C.I. Acid Red 249 and C.I. Direct Red 227. Preferably, the colorant which is used in combination with the colorant represented by the general formula IV is a colorant represented by the general formula V. The use of a mixture of a colorant represented by the general formula IV and a colorant represented by the general formula V brings about advantages such as excellent water resistance, superior hue on plain paper, particularly on acidic paper, higher density of image and excellent stability in the ejection of ink.

In the colorant represented by the general formula V, $M^8$, $M^9$ and $M^{10}$, which each represent a counter ion, are each a hydrogen atom or a base selected from the group consisting of an alkali metal, ammonium and an amine. Illustrative nonlimiting examples of the counter ion include a sodium ion, a lithium ion, a potassium ion, an ammonium ion and an alkanolammonium ion such as a triethanolammonium ion. A particularly preferable example of the counter ion is an ammonium ion, because the ammonium ion leads to an increase in the water resistance of the print.

Preferable examples (compounds V-1~V-24) of the colorant represented by the general formula V are given below. However, it should be noted that the present invention is not limited to these examples.

Compound V-1

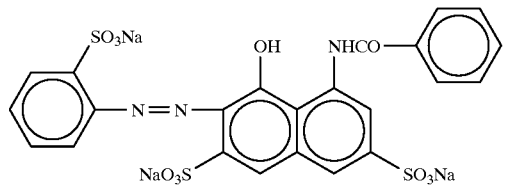

Compound V-2

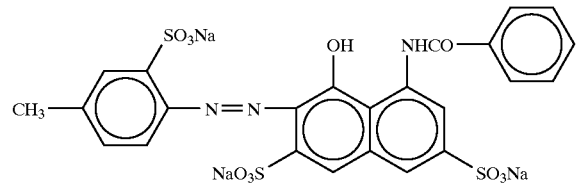

-continued
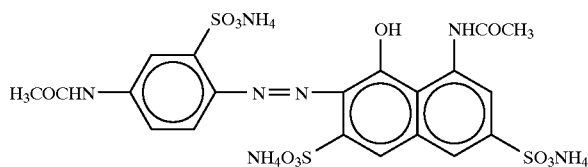
Compound V-3
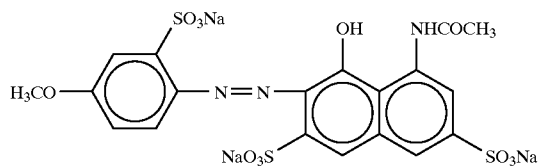
Compound V-4
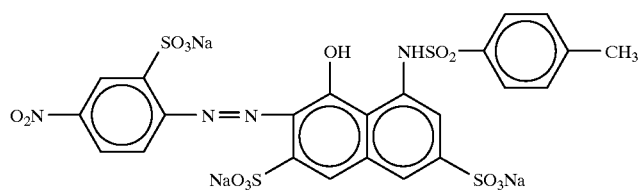
Compound V-5
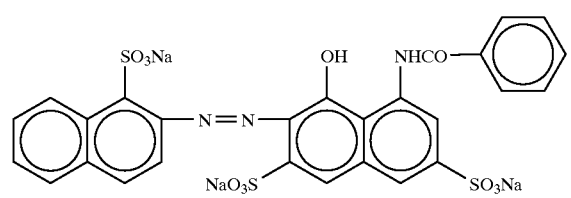
Compound V-6
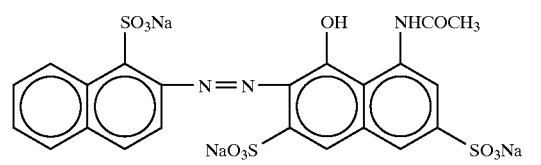
Compound V-7
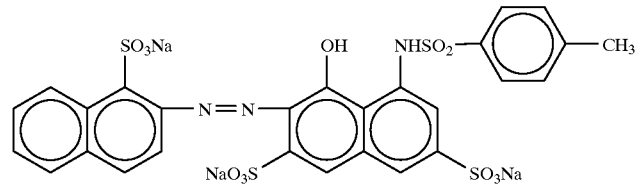
Compound V-8
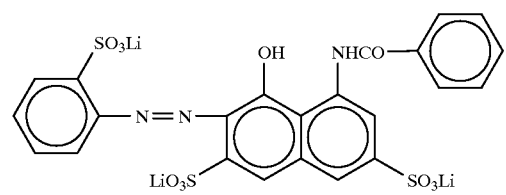
Compound V-9

-continued
Compound V-10
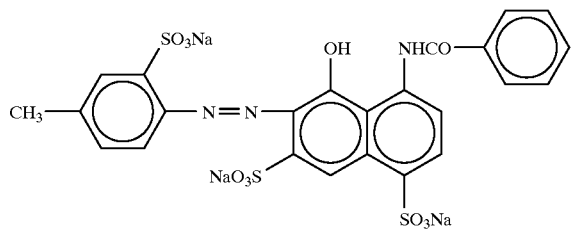
Compound V-11
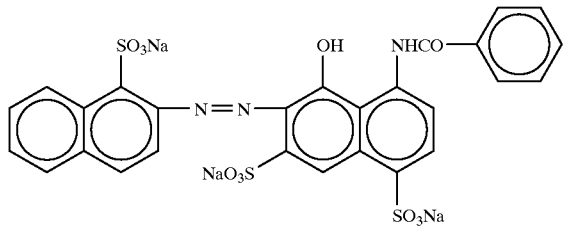
Compound V-12
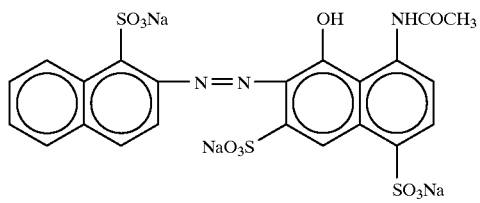
Compound V-13
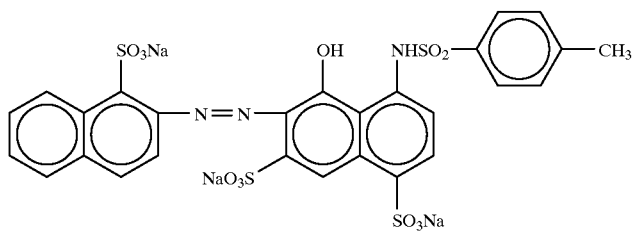
Compound V-14
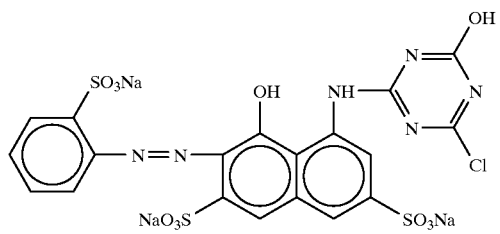
Compound V-15
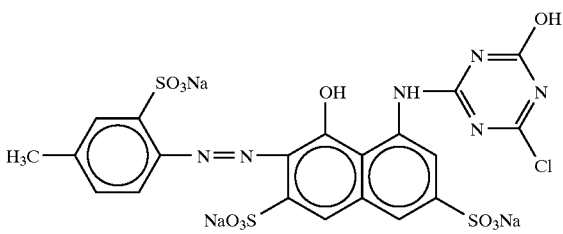

-continued
Compound V-16
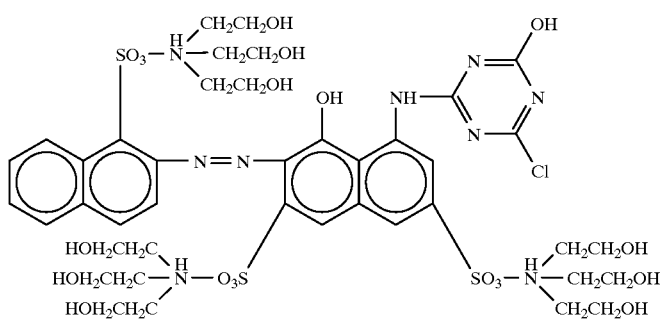
Compound V-17
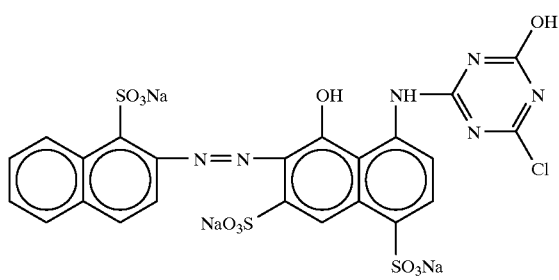
Compound V-18
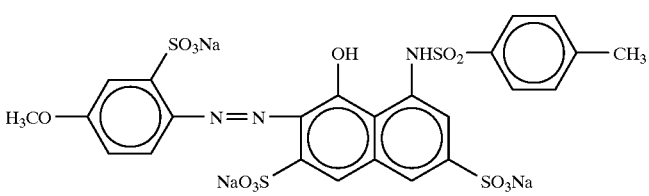
Compound V-19
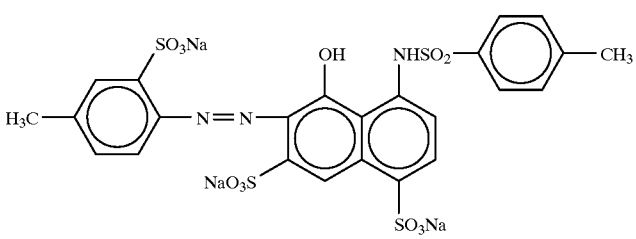
Compound V-20
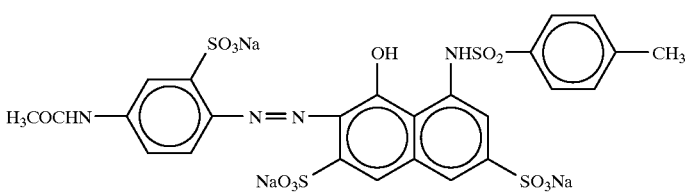
Compound V-21
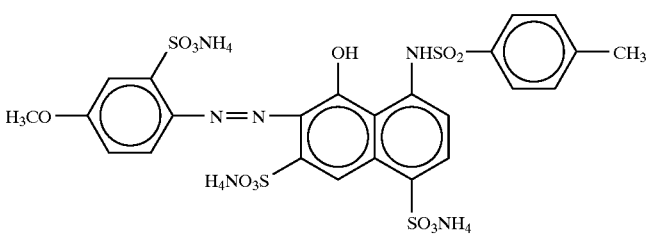

Compound V-22

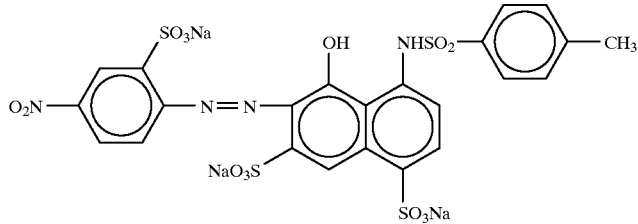

Compound V-23

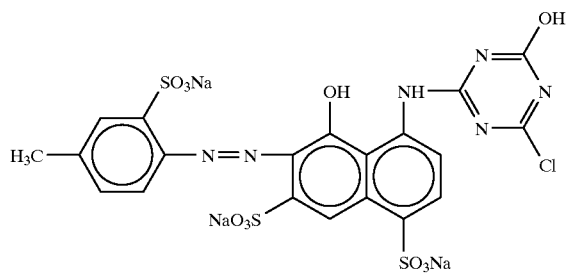

Compound V-24

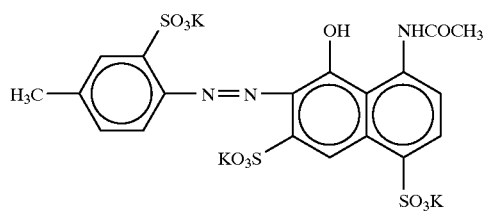

(c) colorant in the yellow-color ink

The colorant in the yellow-color ink comprises a mixture of a colorant represented by the general formula VII and C.I. Direct Yellow 144 and/or C.I. Direct Yellow 86, or otherwise it comprises C.I. Direct Yellow 144 and/or C.I. Direct Yellow 86.

General Formula VII

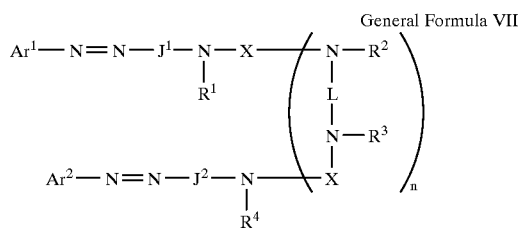

In the general formula VII, $Ar^1$ and $Ar^2$ are each independently selected from the group consisting of an aryl group and a substituted aryl group. At least one of $Ar^1$ and $Ar^2$ has at least one substituent selected from the group consisting of —$COSM^{11}$ and —$COOM^{11}$. Examples of the substituent include a methyl group and an ethyl group.

$J^1$ and $J^2$ each independently represent any one of the following formulas (1) to (3).

(1)

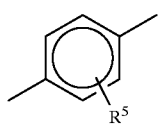

(2)

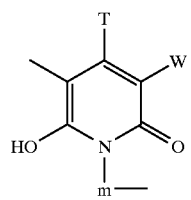

(3)

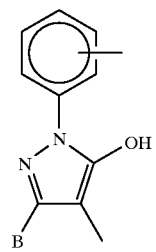

In the formulas (1) to (3), $R^5$ is selected from the group consisting of a hydrogen atom, an alkyl group, a substituted alkyl group, an alkoxy group, a halogen atom, —CN, ureido and —$NHCOR^6$. $R^6$ is selected from the group consisting of a hydrogen atom, an alkyl group, a substituted alkyl group, an aryl group, a substituted aryl group, an aralkyl group and a substituted aralkyl group. Examples of the substituent include a methyl group and an ethyl group.

T represents an alkyl group. W represents a group selected from the group consisting of a hydrogen atom, —CN, —$CONR^{10}R^{11}$, pyridinium and —$COOM^{12}$.

m represents an alkylene chain having 2 to 8 carbon atoms, and examples of the alkylene chain include an ethylene group and a propylene group.

B represents a hydrogen atom, an alkyl group or —COOM$^{13}$. $R^1$, $R^2$, $R^3$, $R^4$, $R^{10}$ and $R^{11}$ are each independently selected from the group consisting of a hydrogen atom, an alkyl group and a substituted alkyl group. Examples of the substituent include a methyl group and an ethyl group.

L represents a divalent organic linking group, and examples of the linking group include an ethylene group and a propylene group.

n is 0 or 1, and X represents a carbonyl group or a group represented by any one of the following formulas (4) to (6).

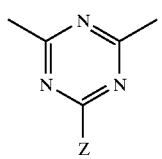

(4)

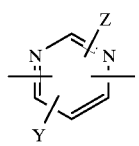

(5)

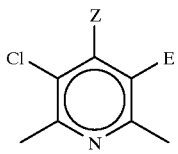

(6)

In the formulas (4) to (6), Z represents $OR^7$, $SR^7$ or $NR^8R^9$, Y represents H, Cl or CN, and E represents Cl or CN. $R^7$, $R^8$ and $R^9$ are each independently selected from the group consisting of a hydrogen atom, an alkyl group, a substituted alkyl group, an alkenyl group, a substituted alkenyl group, an aryl group, a substituted aryl group, an aralkyl group and a substituted aralkyl group or $R^8$ and $R^9$ represent a group forming a 5 or 6 membered ring with a bonded nitrogen atom. Examples of the substituent include a methyl group and an ethyl group. Examples of the 5- or 6-membered ring formed by $R^8$ and $R^9$ together with the nitrogen atom include a triazyl ring.

The dye represented by the general formula VII has at least one —COOM such that the sum of the number of the —COSM and —COOM groups is 2 or greater if the dye has no —SO$_3$M group whereas the sum of the number of the —COSM and —COOM groups is equal to or greater than the number of the —SO$_3$M group if the dye has a —SO$_3$M group. $M^{11}$, $M^{12}$ and $M^{13}$ each represent a counter ion and are each a hydrogen atom or a base selected from the group consisting of an alkali metal, ammonium and an amine.

Preferable examples (compounds VII-1~VII-30) of the dye represented by the general formula VII are given below. However, it should be noted that the present invention is not limited to these examples.

Compound VII-1

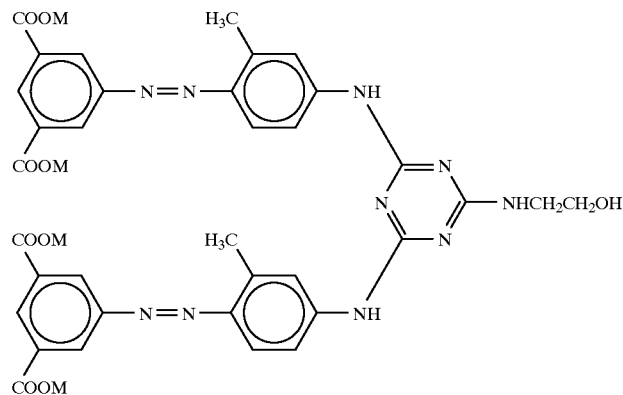

-continued
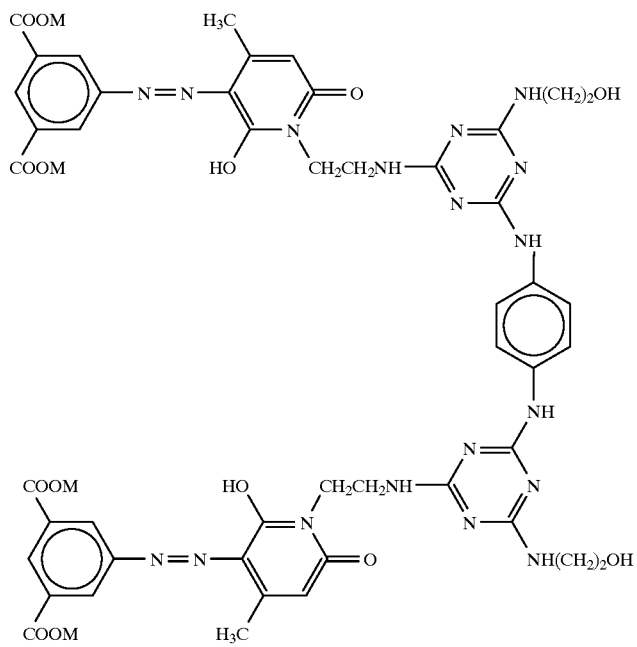
Compound VII-2
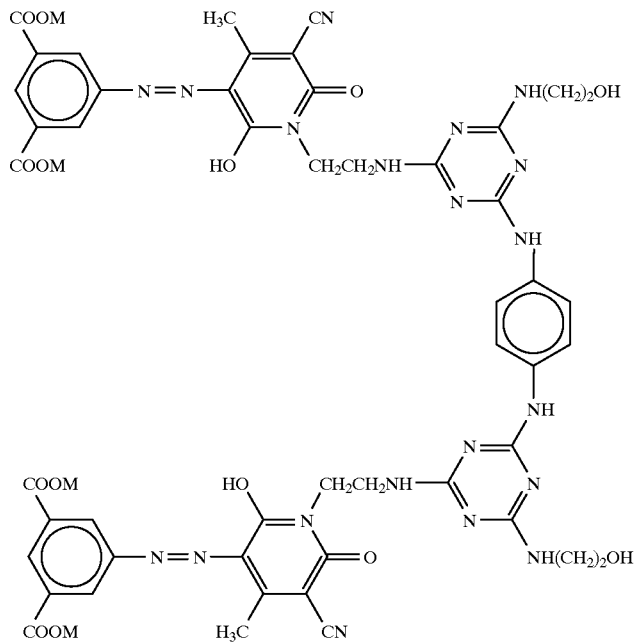
Compound VII-3

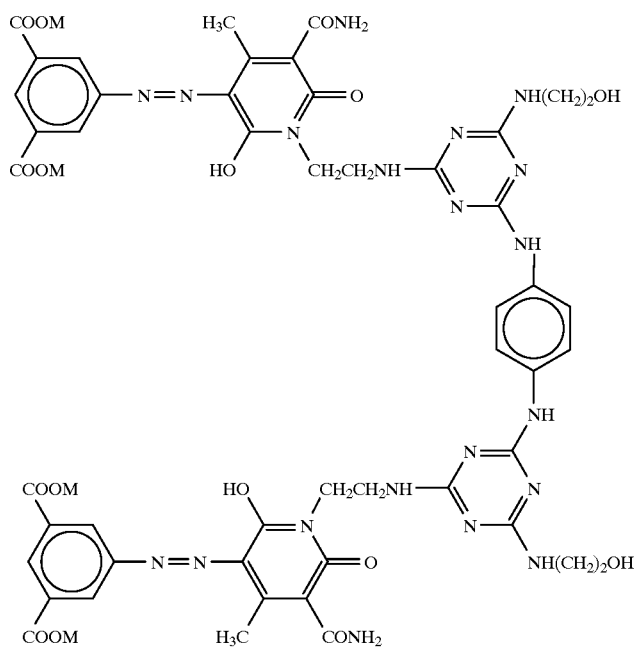
Compound VII-4
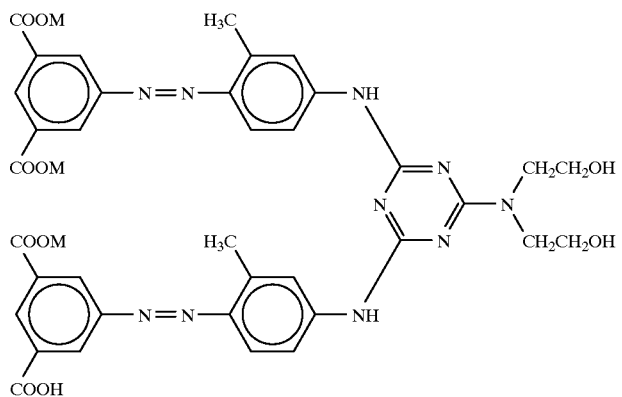
Compound VII-5
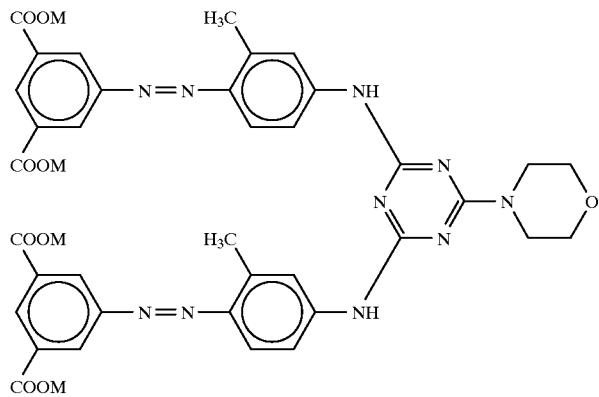
Compound VII-6

-continued
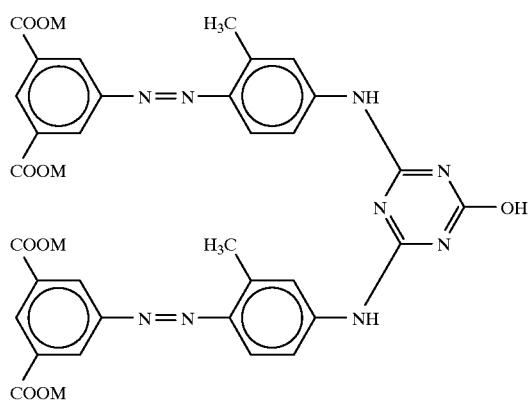
Compound VII-7
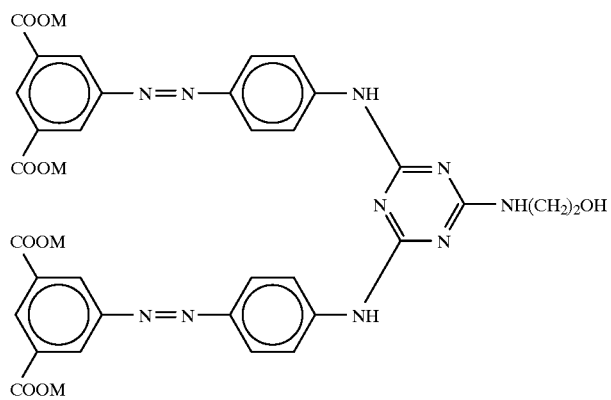
Compound VII-8
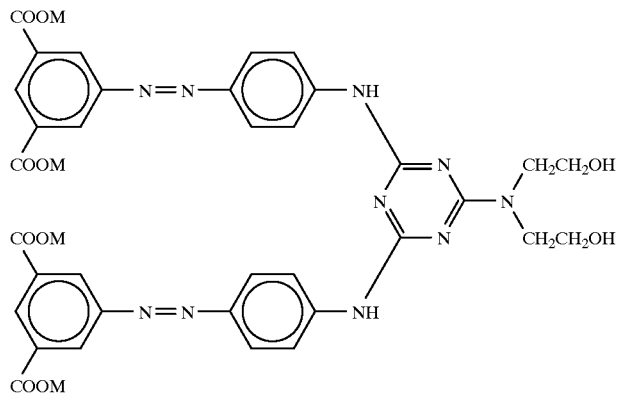
Compound VII-9
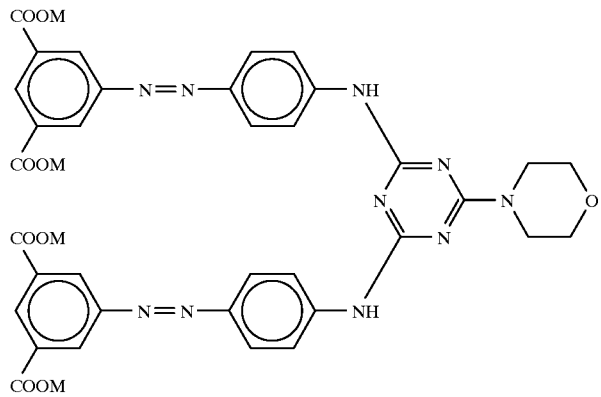
Compound VII-10

-continued
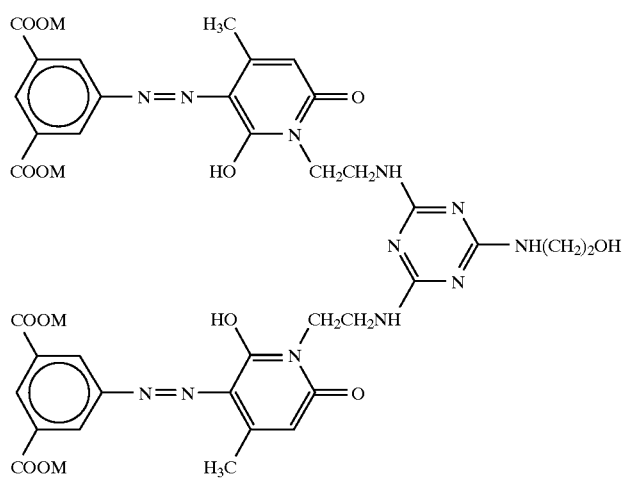
Compound VII-11
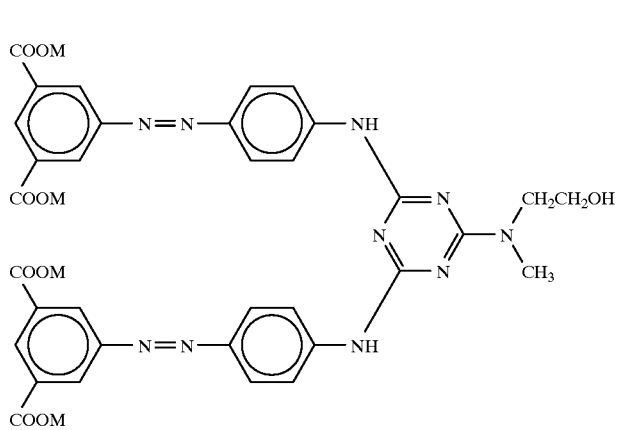
Compound VII-12
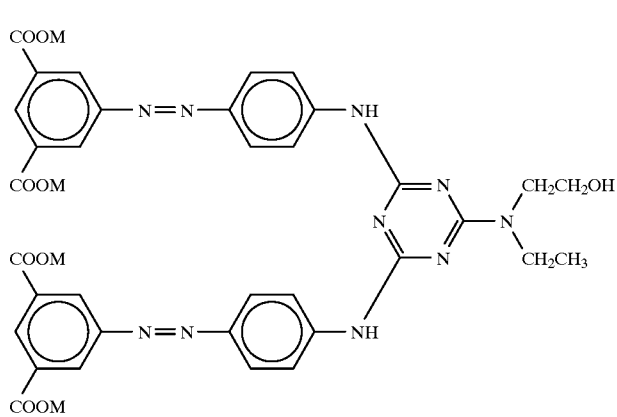
Compound VII-13

Compound VII-14
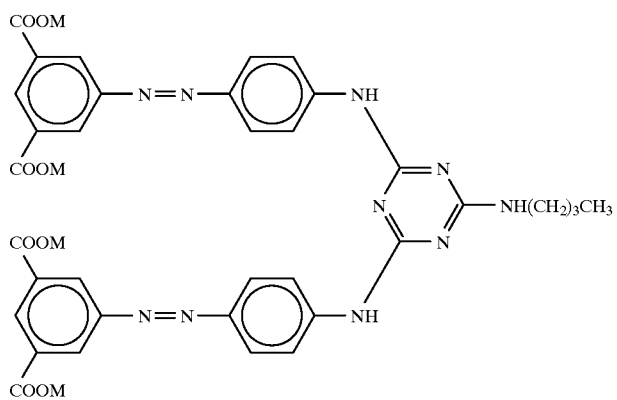
Compound VII-15
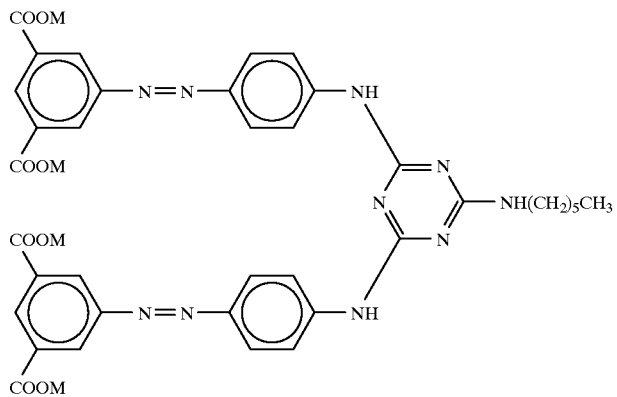
Compound VII-16
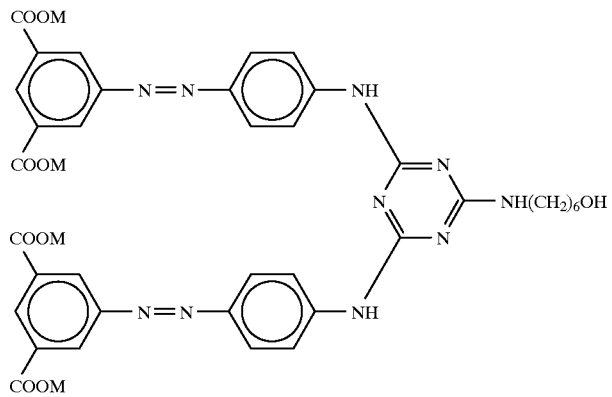
Compound VII-17
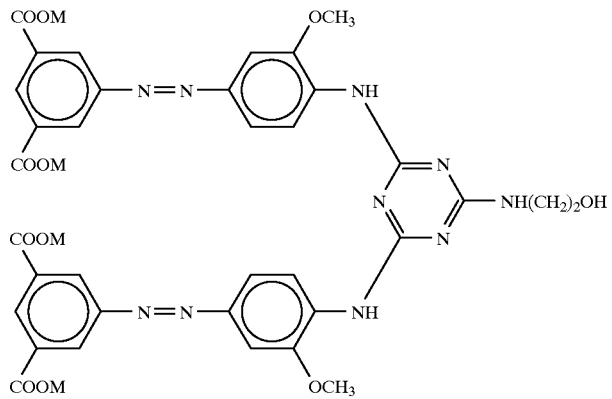

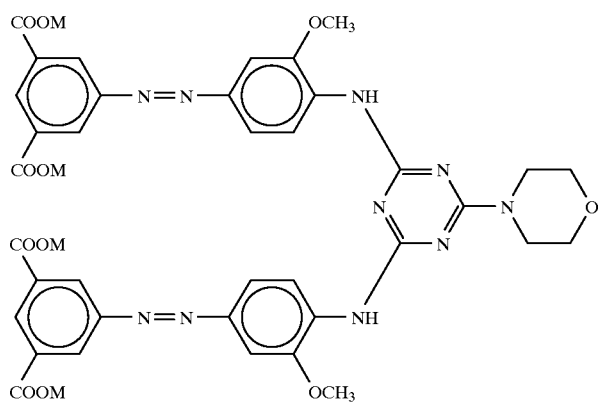
Compound VII-18
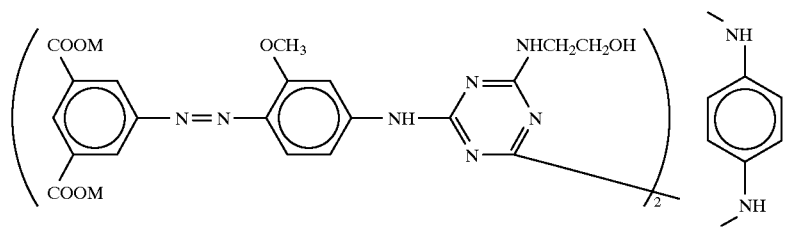
Compound VII-19
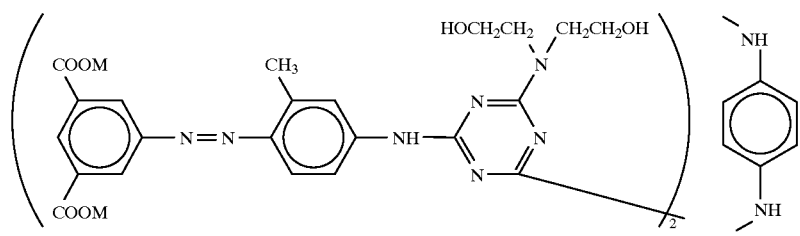
Compound VII-20
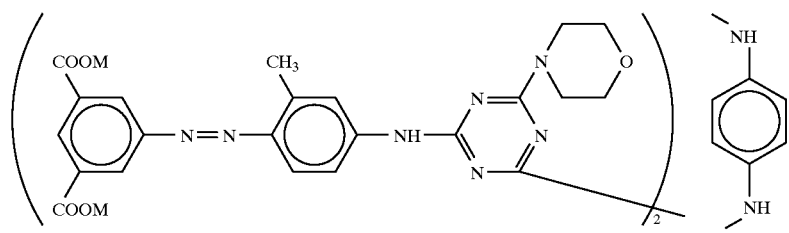
Compound VII-21
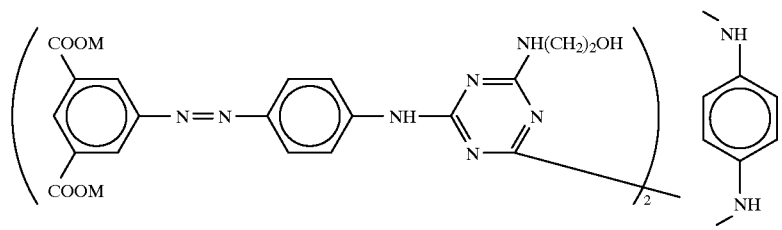
Compound VII-22

-continued
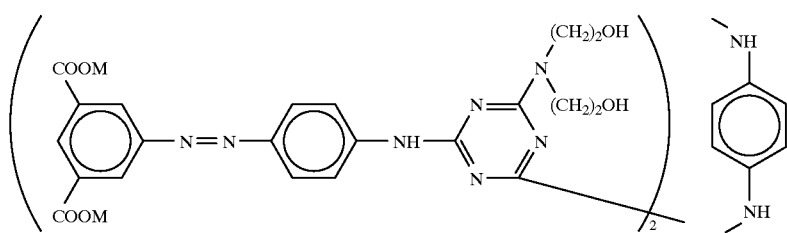
Compound VII-23
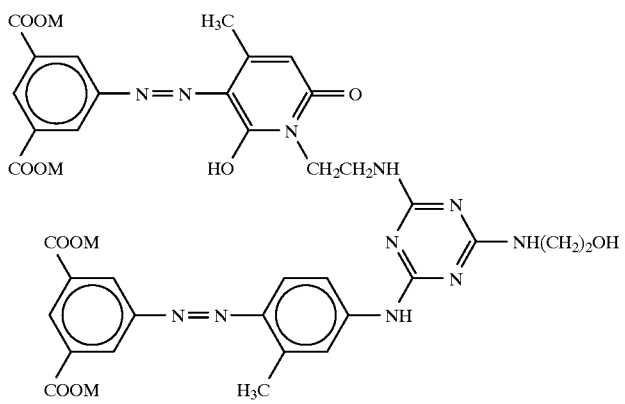
Compound VII-24
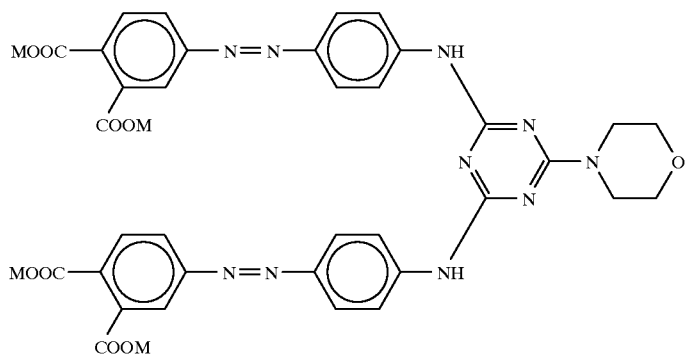
Compound VII-25
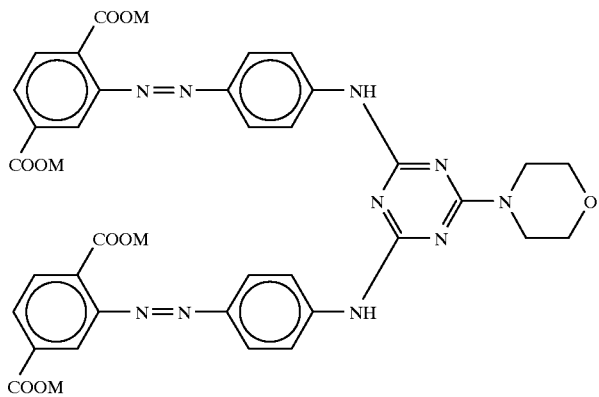
Compound VII-26

-continued

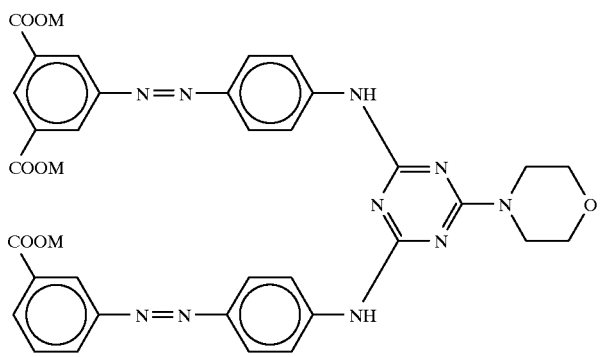

Compound VII-27

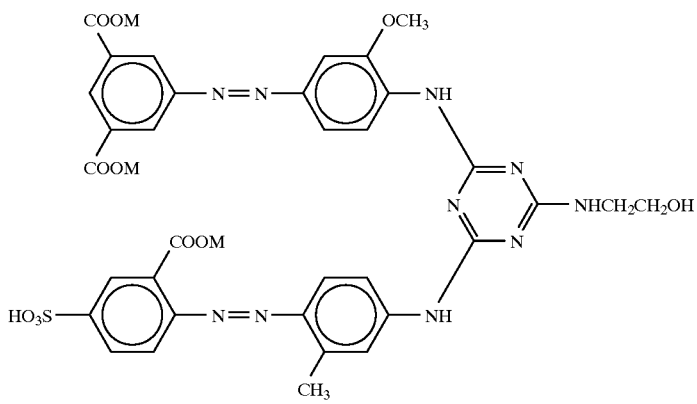

Compound VII-28

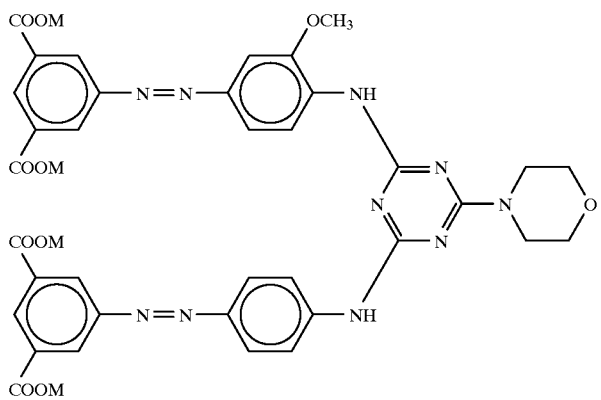

Compound VII-29

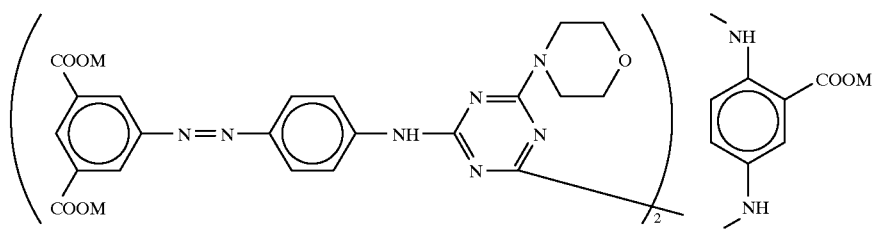

Compound VII-30

The colorant in the yellow-color ink comprises a mixture of the dye represented by the general formula VII and C. I. Direct Yellow 144 and/or C. I. Direct Yellow 86, or otherwise it comprises C. I. Direct yellow 144 and/or C. I. Yellow 86. If these dyes are used as a mixture, the proportion of "the dye represented by the general formula VII" is 20 parts by weight or less calculated with respect to 1 part by weight of "C. I. Direct Yellow 144 and/or C.I. Direct Yellow 86". As the proportion of "the dye represented by the general formula VII" exceeds 20 parts by weight, undesirable phenomena, such as inferior hue of the yellow color, poor color formation in a secondary color and clogging of the outlet of an ejection nozzle, appear, and in particular the poor color formation in a secondary color becomes marked.

(d) Colorant in the black-color ink

The colorant in the black-color ink comprises a mixture composed of at least one colorant represented by the general formula VIII and at least one colorant selected from the group consisting of the colorant represented by the general formula IX and/or C. I. Direct Yellow 144.

General Formula VIII

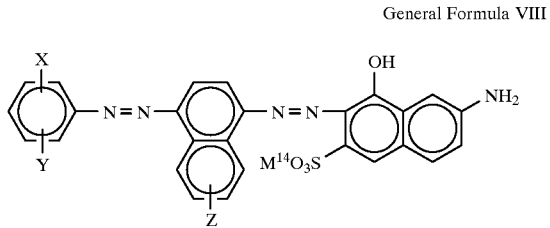

In the general formula VIII, X represents a hydrogen atom or —COOM$^{15}$; Y represents a hydrogen atom or —COOM$^{16}$; and Z represents a hydrogen atom, —COOM$^{17}$ or —SO$_3$M$^{17}$, with the proviso that at least one of X, Y and Z represents —COOM. M$^{14}$, M$^{15}$, M$^{16}$ and M$^{17}$ each represent a counter ion and are each a hydrogen atom or an ion selected from the group consisting of an alkali metal ion, an ammonium ion and a substituted ammonium ion.

General Formula IX

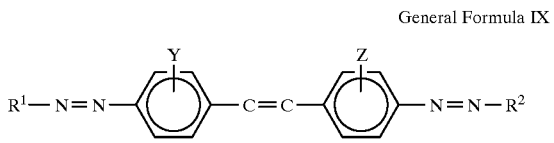

where R$^1$ and R$^2$ each independently represent a group represented by the formula (1) or (2) given below; and Y and Z each independently represent a hydrogen atom or —SO$_3$M$^{18}$. M$^{18}$ represents a counter ion and is a hydrogen atom or an ion selected from the group consisting of an alkali metal ion, an ammonium ion and a substituted ammonium ion.

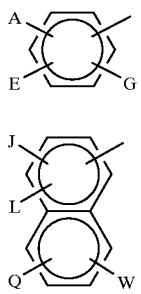

where A, E and G are each independently selected from the group consisting of a hydrogen atom, an alkyl group, —OH and —COOM$^{19}$. J, L, Q and W are each independently selected from the group consisting of a hydrogen atom, —OH, —NH$_2$ and —SO$_3$M$^{20}$. M$^{19}$ and M$^{20}$ each represent a counter ion and are each a hydrogen atom or an ion selected from the group consisting of an alkali metal ion, an ammonium ion and a substituted ammonium ion.

The colorant represented by the general formula VIII in the present invention is a disazo dye having a carboxyl group. However, the colorant exhibits an excellent water resistance, because the free acid has a relatively low solubility in water and because the solubility in a liquid medium abruptly drops at a pH value smaller than 7.

In the general formula VIII, X represents a hydrogen atom or —COOM$^{15}$; Y represents a hydrogen atom or —COOM$^{16}$; and Z represents a hydrogen atom, —COOM$^{17}$ or —SO$_3$M$^{17}$, with the proviso that at least one of X, Y and Z represents —COOM.

M$^{14}$, M$^5$, M$^{16}$ and M$^{17}$, which each represent a counter ion, are not particularly limited only if these counter ions are each are a hydrogen atom or an ion selected from the group consisting of an alkali metal ion, an ammonium ion and a substituted ammonium ion. A particularly preferable example of the counter ion is an ammonium ion, because the ammonium ion evaporates in the form of ammonia from the print produced on a recording medium such as paper to leave the colorant represented by the general formula VIII as a free acid on the recording medium, and, as a result, the water resistance of the print increases.

Examples of the alkali metal ion include a sodium ion, a lithium ion and a potassium ion. Examples of the substituted ammonium ion include an adduct of a proton and an alkanolamine such as triethanolamine.

Among the colorants represented by the general formula VIII, the colorant represented by the following general formula X is particularly preferable from the viewpoint of the balance between water resistance and stable solubility.

General Formula X

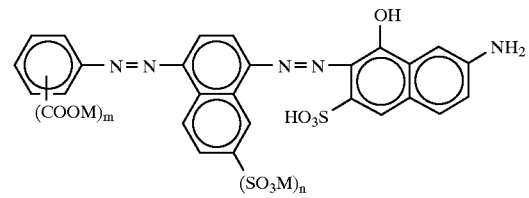

where m is an integer of 1 or 2, and n is an integer of 0 or 1. M represents a counter ion and is a hydrogen atom or an ion selected from the group consisting of an alkali metal ion, an ammonium ion and a substituted ammonium ion.

Preferable examples (compounds VIII-1~VIII-6) of the colorant represented by the general formula VIII are given below. However, it should be noted that the present invention is not limited to these examples.

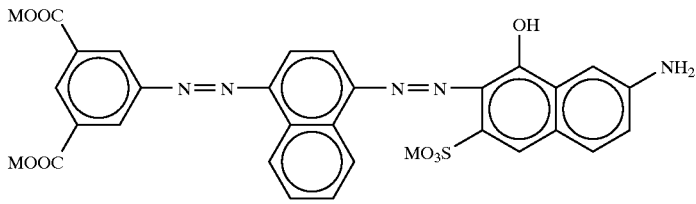
Compound VIII-1
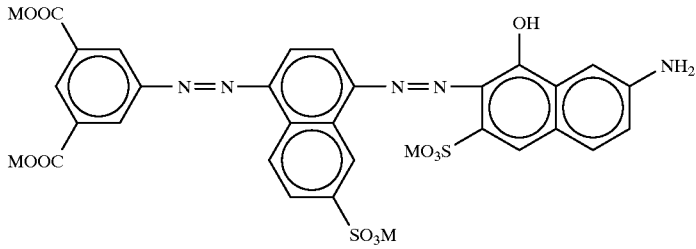
Compound VIII-2
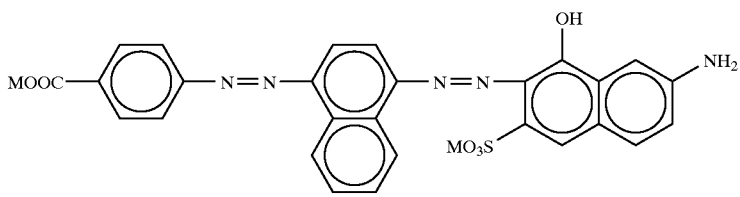
Compound VIII-3
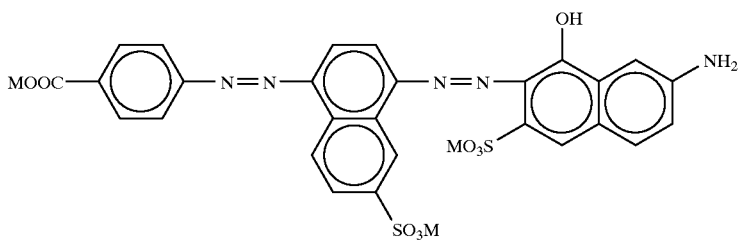
Compound VIII-4
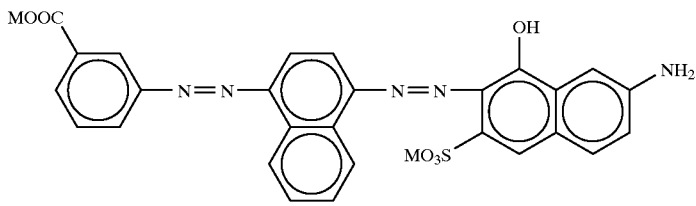
Compound VIII-5
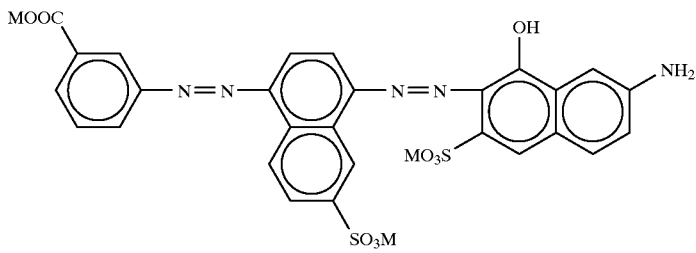
Compound VIII-6
In the general formula IX, $R^1$ and $R^2$ each independently represent a group represented by the formula (1) or (2) given previously.
In the formula (1), A, E and G are each independently selected from the group consisting of a hydrogen atom, an alkyl group, —OH and —COOM$^{19}$.

$M^{19}$ represents a counter ion and is a hydrogen atom or an ion selected from the group consisting of an alkali metal ion, an ammonium ion and a substituted ammonium ion.

In the formula (2), J, L, Q and W are each independently selected from the group consisting of a hydrogen atom, —OH, —$NH_2$ and —$SO_3M^{20}$.

$M^{20}$ represents a counter ion and is a hydrogen atom or an ion selected from the group consisting of an alkali metal ion, an ammonium ion and a substituted ammonium ion.

Among the colorants represented by the general formula IX, the colorant represented by the general formula XI is particularly preferable in terms of stability in the ejection of ink, stability in the density of image formed by a continuous ejection of ink over a long period of time and reproduction of fine lines.

General Formula XI

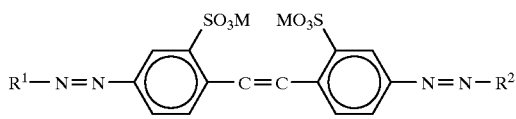

In the general formula XI, $R^1$ and $R^2$ each independently represent a group represented by the formula (3), (4) or (5) given below.

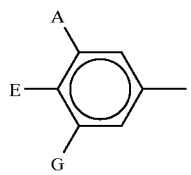

(3)

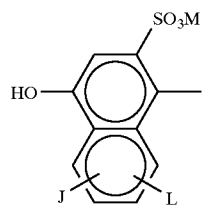

(4)

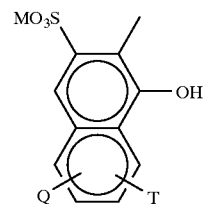

(5)

In the formula (3), A, E, G and the counter ion M are each the same as those defined for the general formula VIII.

In the formula (4) or (5), J, L, Q, W and the counter ion M are each the same as those defined for the general formula Preferable examples (compounds IX-1~IX-27) of the colorant represented by the general formula IX are given below. However, it should be noted that the present invention is not limited to these examples.

Compound IX-1

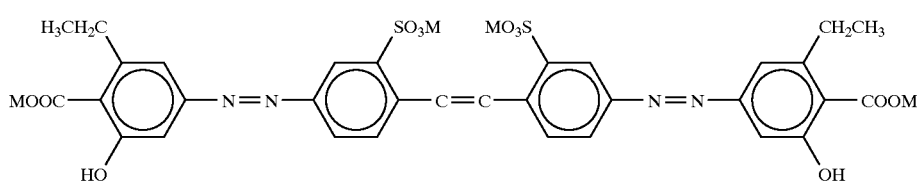

Compound IX-2

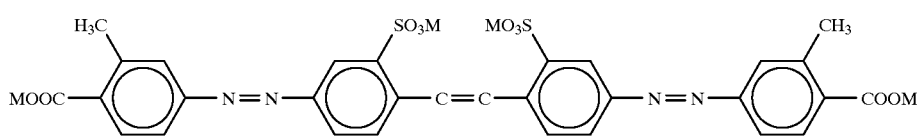

Compound IX-3

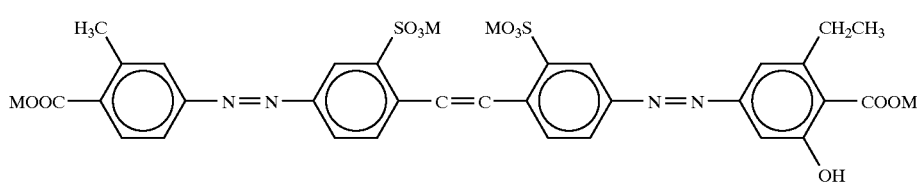

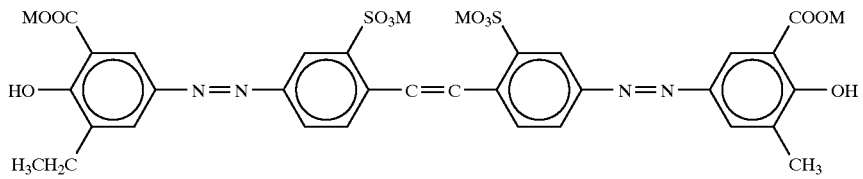
Compound IX-4
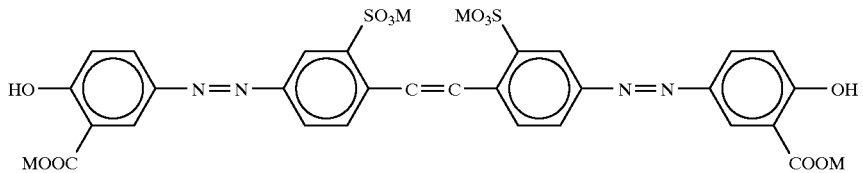
Compound IX-5
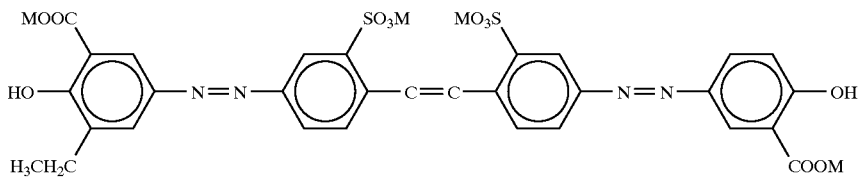
Compound IX-6
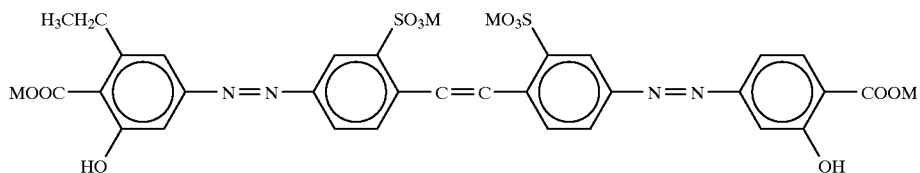
Compound IX-7
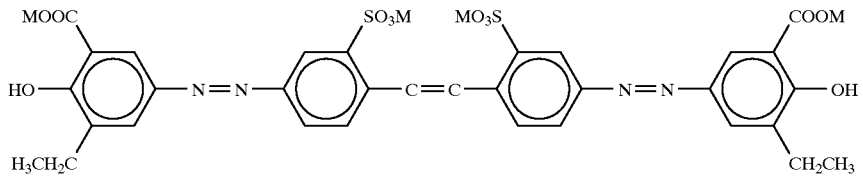
Compound IX-8
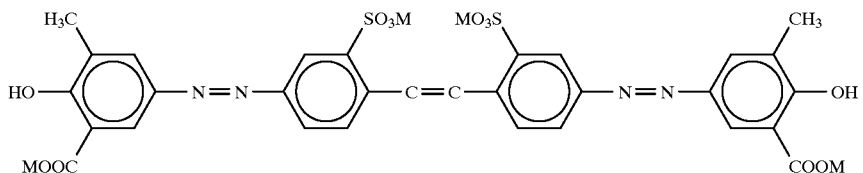
Compound IX-9
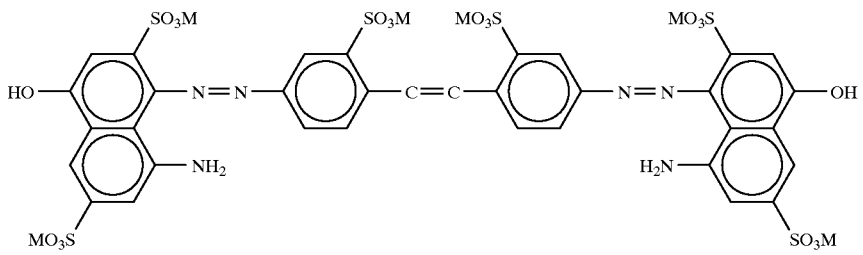
Compound IX-10

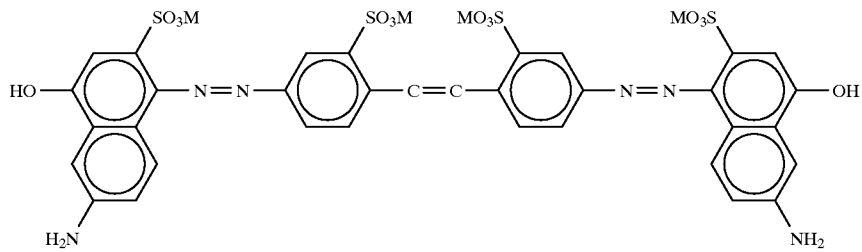
Compound IX-11
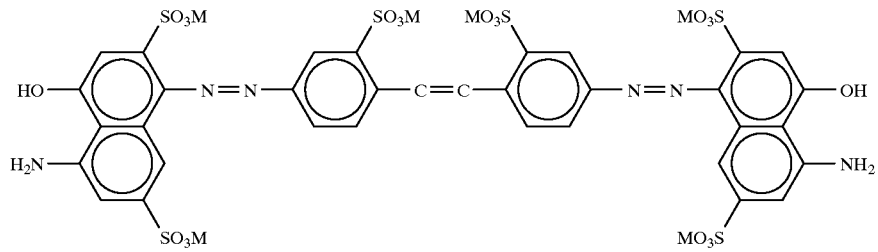
Compound IX-12
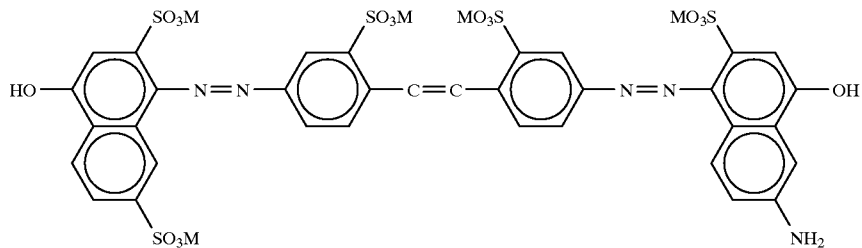
Compound IX-13
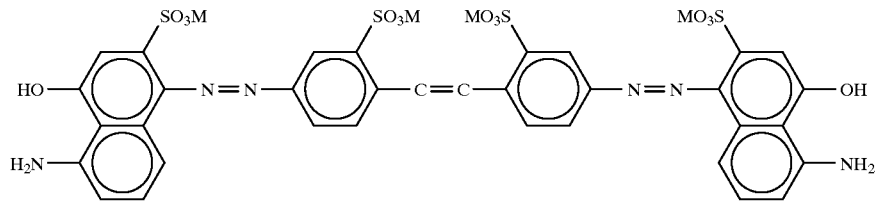
Compound IX-14
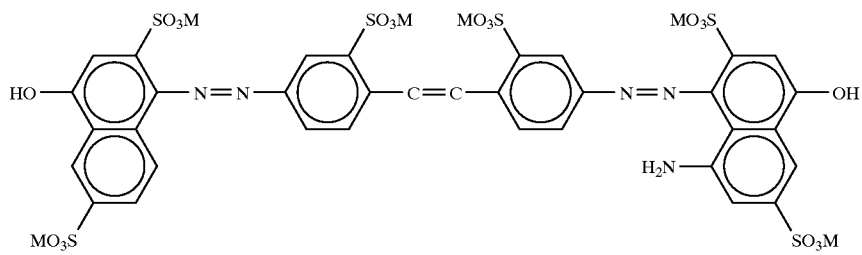
Compound IX-15
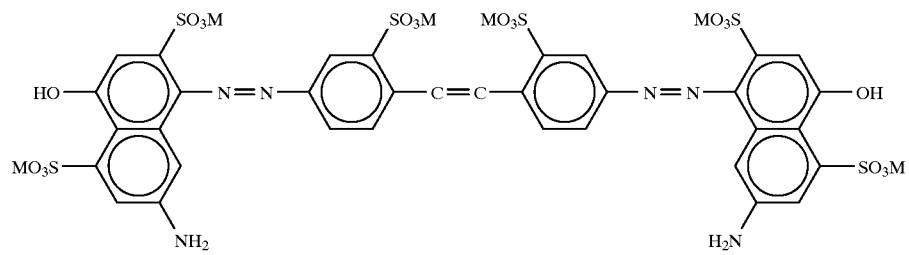
Compound IX-16

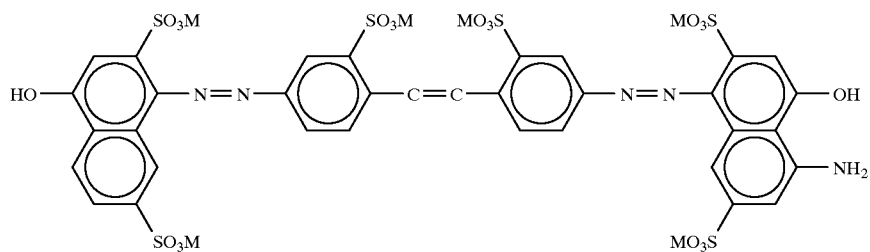
Compound IX-17
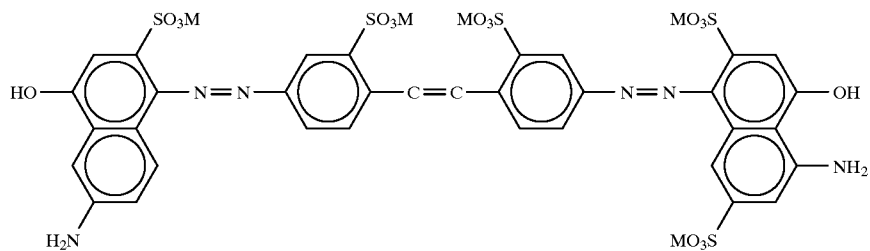
Compound IX-18
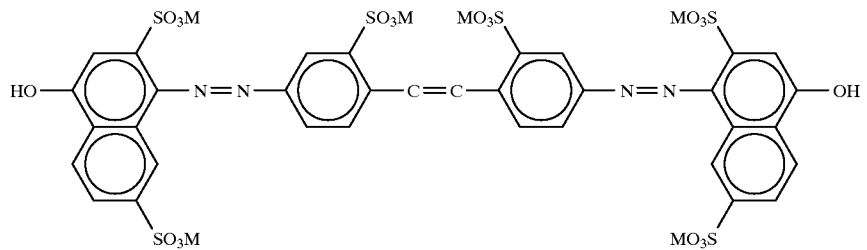
Compound IX-19
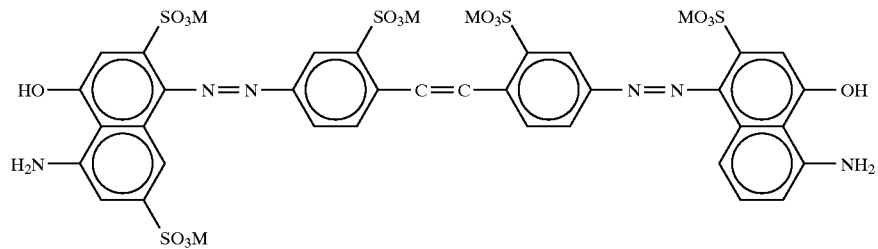
Compound IX-20
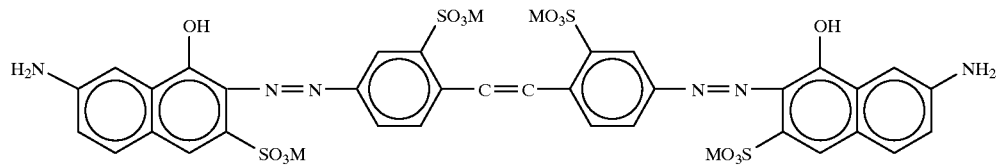
Compound IX-21
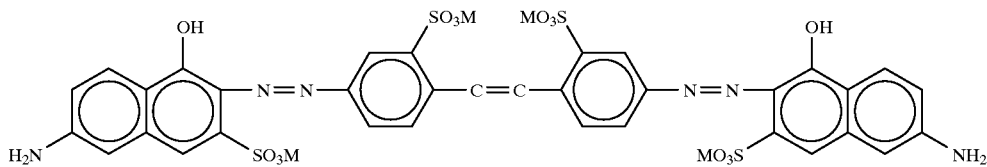
Compound IX-22

Compound IX-23

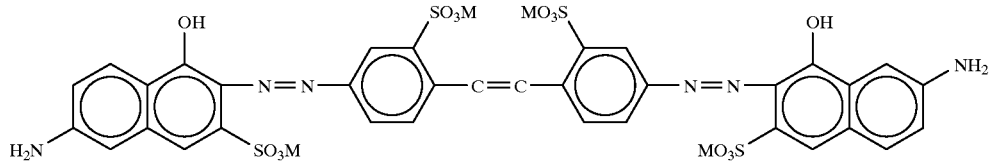

Compound IX-24

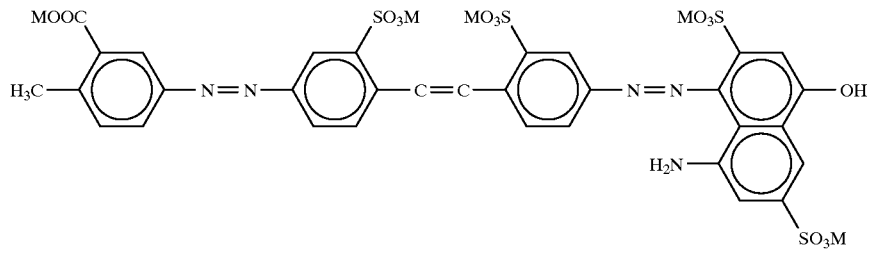

Compound IX-25

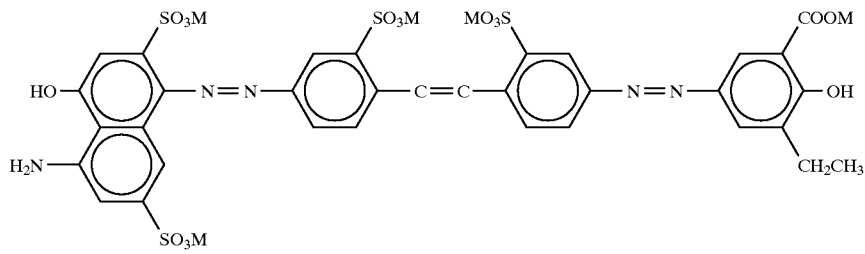

Compound IX-26

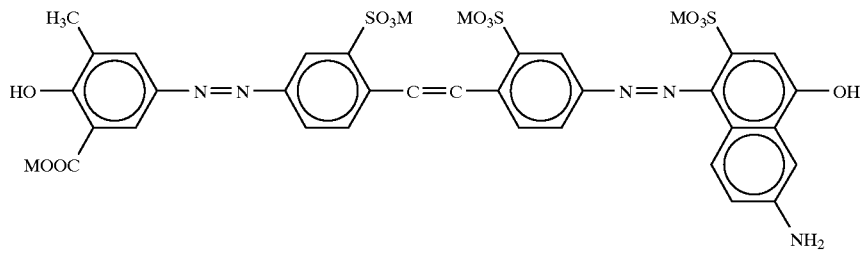

Compound IX-27

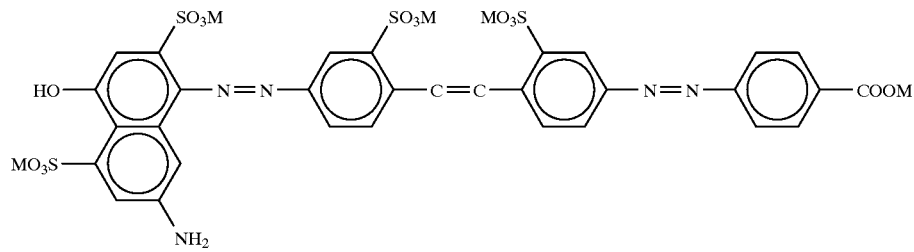

As described previously, colorants represented by the general formulas I, II, IV, VII and VIII exhibit an excellent water resistance, because the free acids of these colorants have a relatively low solubility in water and because the solubility of these free acids in a liquid medium abruptly drops at a pH value below7. However, if the ink for ink-jet recording contains only a colorant represented by any of these formulas, the ink is liable to produce poor hue on plain paper, in particular on acidic paper. This is because the abrupt decrease in pH causes flocculation and deposition of the colorants represented by these formulas on recording media. In addition, in the case of hot ink-jet recording, since the deposit which is referred to as kogation is easily formed on the surface of a heater, continuous ejection of ink over a long period of time often brings about problems such as decrease in the density of printed images and poor reproduction of fine lines of printed images.

The single-color ink of the present invention comprises a mixture of a group of colorants, which are each represented by any one of the general formulas which account for a major proportion of the dyes for ink (hereinafter referred to as "the colorants represented by the general formulas" on occasion), and a group of colorants which are added to the foregoing group of colorants and account for a minor proportion of the dyes for ink (hereinafter referred to as "added colorants" on occasion). The use of this mixture makes it possible to improve the hue on plain paper, in particular on acidic paper, without a reduction in water resistance and to prevent the deposition of the colorants even when the colorant concentration increases due to decrease in the proportion of water, thereby preventing clogging of nozzles and stabilizing the ejection of ink. Further, since the colorants hardly deposit on the surface of a heater, continuous ejection of ink over a long period of time is freed from troubles such as decrease in the density of printed image and poor reproduction of fine lines of printed images.

The above-mentioned effect is presumably caused by the following mechanism. That is, owing to a sort of interaction between the colorants represented by the general formulas and the added colorants, the added colorants protect the colorants represented by the general formulas so that the abrupt flocculation and deposition thereof can be inhibited or diminished when a pH value abruptly drops in the recording paper. Further, since the added colorants themselves also have an excellent hue, the mixture compensates the poor hue of the colorants represented by the general formulas so that the hue of ink as a whole is improved. Furthermore, since the added colorants have a relatively higher solubility in comparison with the colorants represented by the general formulas, the added colorants protect and solubilize the colorants represented by the general formulas even if the colorants represented by the general formulas start becoming insoluble as the proportion of water decreases.

The kogation, which is a problem in hot ink-jet recording, is presumably caused by a mechanism wherein the dissociation of water in ink takes place as a result of an abrupt rise in temperature in the vicinity of a heater to bring about a localized rise in hydrogen ion concentration, which causes the formation of a free acid from a dye having a carboxyl group so that the colorant becomes insoluble. In the present invention, the problem of koagation is solved presumably because the added colorants have a relatively higher solubility in comparison with the colorants represented by the general formulas, and, as a result, the added colorants interact with the colorants represented by the general formulas and inhibit the colorants represented by the general formulas from becoming insoluble so that no deposit is formed on the surface of the heater.

In the ink for use in ink-jet recording in the present invention, the weight ratio of the colorants represented by the general formulas to the added colorants is preferably in the range of from 20:1 to 1:1. If the proportion of the colorants represented by the general formulas exceeds the upper limit, the improvement in hue may be impossible because the above-mentioned interaction does not take place. On the other hand, if the proportion of the colorants represented by the general formulas is below the lower limit, the water resistance of the printed image may become worse.

In the ink for ink-jet recording in the present invention, the total content of the colorants is preferably in the range of from 0.1 to 10% by weight, and more preferably in the range of from 1 to 8% by weight, from the viewpoint of color formation, density of image and stable solubility of the colorant.

[water-soluble organic solvents]

The organic solvents for use in the present invention are not particularly limited as long as they are soluble in water. Examples of these organic solvents include polyhydric alcohol, polyglycol, glycol ether, alcohol, alkanolamine and other polar solvents.

The water-soluble solvent is preferably at least one substance selected from the group consisting of polyhydric alcohol, polyglycol and glycol ether, because the use of such a water-soluble solvent improves the moisture retention of the ink and the solubility of the colorants, and, as a result, prevents the clogging of nozzles to maintain the stable ejection of ink and also prevents the flocculation and deposition of the colorant even if the ink is stored for a long period of time. Particularly preferable solvents are glycerin, ethylene glycol, diethylene glycol, propylene glycol and thiodiglycol. In addition, from the viewpoint of the penetration of ink into paper for ink-jet recording and solubility of the colorants, glycol ether is preferable, and particularly preferable glycol ethers are diethylene glycol monoethyl ether, diethylene glycol monobutyl ether and triethylene glycol monobutyl ether.

Preferable examples of the polyhydric alcohol and polyglycol include ethylene glycol, diethylene glycol, triethylene glycol, polyethylene glycol, propylene glycol, 1,5-pentanediol, glycerin and thiodiglycol.

Preferable examples of the glycol ether include ethylene glycol monomethyl ether, ethylene glycol monobutyl ether, diethylene glycol monoethyl ether, diethylene glycol monobutyl ether, triethylene glycol monobutyl ether and propylene glycol monomethyl ether.

Preferable examples of the alcohol include ethanol, isopropanol, butanol and benzyl alcohol.

Preferable examples of the alkanolamine include monoethanolamine, diethanolamine and triethanolamine.

Preferable examples of the polar solvent include pyrrolidone, N-methyl-2-pyrrolidone, triethanolamine, dimethylsulfoxide and sulfolane.

In the present invention, these organic solvents may be used singly or in a combination of two or more.

In the present invention, the amount of the water-soluble organic solvent added to the ink is preferably in the range of from 3 to 50% by weight, and more preferably in the range of from 10 to 30% by weight, based on the total weight of the ink. If the amount added is less than 3% by weight, the prevention of clogging is insufficient, whereas if the amount added is more than 50% by weight, the drying of the print is inferior.

[Water]

The water for use in the present invention is preferably distilled water, ion-exchanged water, pure water or ultra-pure water, and ultra-pure water is particularly preferable from the viewpoint of storage stability and prevention of clogging because the mingling of polyvalent cations and microorganisms can be prevented.

[Other components]

The ink for ink-jet recording in the present invention may contain other components, which are not particularly limited and selected suitably according to purposes.

For example, components which may be incorporated in the ink include a nitrogen-containing compound having a carboxylic and/or sulfonic acid structure whose pKa ranges from 6.0 to 10.0 at 20° C., a hydroxide of analkali metal, ammonium hydroxide, a water-soluble organic compound which is solid at room temperature and 50% by weight or more of which evaporates at 100 to 350° C., and a surfactant.

The pH of the ink for ink-jet recording in the present invention is preferably in the range of from 6.0 to 12.0. The ink having a pH value in this range exhibits a proper pH buffering action, relaxes the abrupt decrease in pH value at the time of drying after printing and produces a better hue. If the pH is less than 6.0, the colorant may undesirably deposit at an early stage, whereas, if the pH is more than 12.0, a predictable problem is the deterioration, such as corrosion, dissolution or peeling, of a member, e.g., head, which is always in contact with the ink in the ink-jet recording apparatus. In addition, from the viewpoint of stable solubility of the colorants and stability of other components, the pH is preferably in the range of from 8.0 to 10.0, and more preferably in the range of from 8.5 to 9.5.

In order to maintain the pH value within the range of from 6.0 to 12.0 and to dissolve the colorants in a stable manner, it is preferable to add to the ink a nitrogen-containing compound having a carboxylic and/or sulfonic acid structure (the structure may be in the form of a salt) whose pKa ranges from 6.0 to 10.0 at 20° C. and a hydroxide of an alkali metal (in the form of MOH where M is selected from Li, Na and K) or ammonium hydroxide. Adjustment of pH by means of these components is desirable particularly in terms of storage stability and prevention of clogging of the nozzles.

Example of the nitrogen-containing compound having a carboxylic and/or sulfonic acid structure (the structure may be in the form of a salt) whose pKa ranges from 6.0 to 10.0 at 20° C. include a nitrogen-containing compound having a carboxyl-substituted alkyl group and a nitrogen-containing compound having a sulfo-substituted alkyl group. Another example of the nitrogen-containing compound is a nitrogen-containing compound having a hydroxy- or carbamoyl-substituted alkyl group in addition to the carboxyl- or sulfo-substituted alkyl group.

Examples of the carboxyl-substituted alkyl group include carboxymethyl, 1-carboxyethyl, 2-carboxyethyl, 1-carboxy-n-propyl, 2-carboxy-n-propyl, 3-carboxypropyl, 2-carboxy-i-propyl, 1-carboxy-n-butyl, 4-carboxybutyl, 3-carboxy-i-butyl, 2-methyl-4-carboxybutyl, carboxy-t-butyl and 5-carboxypentyl groups.

Examples of the sulfo-substituted alkyl group include the alkyl groups corresponding to the carboxyl-substituted alkyl groups but with the carboxyl groups being replaced by sulfonic acid groups.

The alkyl groups may bear these acidic substituents in the form of salts of lithium, sodium, potassium or ammonium. Preferable examples of these acidic groups include carboxymethyl, 1-carboxyethyl, 1-carboxy-n-propyl, sulfomethyl, 1-sulfoethyl and 1-sulfo-n-propyl groups.

Examples of the hydroxyl -substituted alkyl group include methylol, 2-hydroxyethyl, methylolmethyl, trimethylolmethyl, 1-hyroxy-n-propyl, 2-hydroxy-n-propyl, 3-hydroxypropyl, 2-hydroxy-i-propyl, 1-hydroxy-n-butyl, 2-hydroxy-n-butyl, 4-hydroxybutyl, 3-hydroxy-i-butyl, 2-methyl-3-hydroxybutyl, hydroxy-t-butyl, 4-hydroxy-n-pentyl and 5-hydroxypentyl groups.

Examples of the carbamoyl-substituted alkyl group include the alkyl groups corresponding to the carboxyl-substituted alkyl groups but with the carboxyl groups being replaced by carbamoyl groups. Preferable examples include methylol, 2-hydroxyethyl, trimethylolmethyl and carbamoylmethyl groups.

Nitrogen-containing compounds having the above-mentioned groups are not particularly limited, and examples of these compounds include acetamideglycine, N-2-hydroxyethylglycine, N-carbamoylmethyl-β-alanine, N-2-hydroxyethyl-N-carbamoylmethylglycine, N-hydroxymethyl-N-carbamoylmethyl-γ-aminobutyric acid, N-carboxymethyliminodiacetamide, N-carbamoylmethyliminodiacetic acid, N-hydroxypropyliminodipropionic acid and N,N-bis(2-hydroxyethyl)glycine as well as N-2-hydroxyethyl-2-aminoethanesulfonic acid, N-3-hydroxypropyl-2-aminoethanesulfonic acid, N-carbamoylmethyl-2-aminoethanesulfonic acid, N,N-bis(2-hydroxyethyl)-2-aminoethanesulfonic acid, N-2-hydroxyethyl-N-carbamoylmethylaminomethanesulfonic acid, N-2-hydroxyethyl-N-carbamoylmethyl-2-aminoethanesulfonic acid, N,N-bis-carbamoylmethyl-2-aminoethanesulfonic acid, N-2-hydroxyethyliminodiethanesulfonic acid, N-tris(hydroxymethyl)methyl-3-aminopropanesulfonic acid, and salts thereof with lithium, sodium, potassium or ammonium.

In the present invention, among these nitrogen-containing compounds, N,N-bis(2-hydroxyethyl)-2-aminoethanesulfonic acid, acetamideglycine, N-carbamoylmethyliminodiacetic acid, N-tris(hydroxymethyl)methyl-3-aminopropanesulfonic acid and N,N-bis(2-hydroxyethyl)glycine are preferable from the viewpoint of the solubility of these compounds in the vehicle of ink. Further, N,N-bis(2-hydroxyethyl)-2-aminoethanesulfonic acid is more preferable from the viewpoint of thermal stability.

In the present invention, these nitrogen-containing compounds may be used singly or in a combination of two or more.

In the present invention, the content of the nitrogen-containing compound in the ink may vary and can be appropriately selected depending on the solubility of the colorant employed. However, the content is preferably in the range of from 0.1 to 8% by weight in order to attain a sufficiently stable solubility of the colorant and also of the nitrogen-containing compound itself, based on the total weight of the ink. More preferably, the content is in the range of from 0.4 to 3% by weight from the viewpoint of the balance between the stable solubility of the colorant and the stable solubility of the nitrogen-containing compound itself.

Examples of the hydroxide of alkali metal to be used in the present invention include lithium hydroxide, sodium hydroxide and potassium hydroxide. Among ammonium hydroxide and these hydroxides of alkali metal, lithium hydroxide and sodium hydroxide are particularly preferable from the viewpoint of water retention of the ionized compound that results.

In the present invention, the content of the hydroxide of alkali metal or the ammonium hydroxide may vary and can be appropriately selected depending on the content of the nitrogen-containing compound. However, the content is preferably 0.05% by weight or more in order to maintain the pH of the ink for ink-jet recording at 8 or more which is a preferable value, and preferably 5% by weight or less for the purpose of sufficient inhibition of the deterioration, such as corrosion, dissolution or peeling, of a member, for example head, which is always in contact with the ink in the ink-jet recording apparatus. Therefore, the content is preferably determined appropriately in the range of 0.05 to 5% by weight so that the pH of the ink for ink-jet recording is adjusted to a value within the range of from 8 to 12.

In the present invention, it is preferable that the ink for ink-jet recording contains a water-soluble organic compound (hereinafter referred to as "a specific water-soluble organic compound" on occasion) which is solid at room temperature but loses 50% by weight or more by evaporation at 100 to 350° C. The incorporation of such a water-soluble organic compound brings about the advantage that, if the ink is used in an ink-jet recording method wherein ink droplets are formed by heating the ink, the ink ejecting force increases and the ink droplets impact against the surface of paper more strongly and the time the droplets spend on the surface of the paper is reduced so that excessive flocculation and deposition of dye are prevented and an image of excellent coloration can be obtained in comparison with the case where the impact of the ink droplets against the surface of paper is weak. This effect becomes more marked, as the evaporating proportion of the specific water-soluble organic compound increases. If the evaporating proportion is 50% or less, the ink droplets ejecting force is insufficient and unstable. The term "room temperature" as used herein means about 25° C. The clause "50% by weight or more evaporates at 100 to 350° C." as used herein means that, when a thermal analysis for weight is conducted by raising the temperature at a rate of 20° C./minute, the weight loss in the temperature range of from 100 to 350° C. is 50% by weight or more.

If the content of the water-soluble organic compound, which is solid at room temperature and 50% by weight or more of which evaporates at 100 to 350° C., in the ink for ink-jet recording is in the range of from 0.1 to 15% by weight, it is possible to increase the force required for the ejection of the ink droplets sufficiently, to maintain the moisture retention of the ink, to sufficiently maintain the interaction between the nitrogen-containing compound and the hydroxide of alkali metal, to sufficiently obtain the stable solubility of the specific water-soluble organic compound and to obtain a stable ejecting force for ink droplets.

Preferable examples of the water-soluble organic compound, which is solid at room temperature and 50% by weight or more of which evaporates at 100 to 350° C., include a urea, a thiourea or a derivative thereof and betaine. Since such a water-soluble organic compound is stably soluble in water and water-soluble organic solvents, the use of this compound is beneficial for improving the storage stability of the ink and for the prevention of nozzle clogging.

Examples of the derivative of urea include alkyl urea, dialkyl urea and ethylene urea, while examples of the derivative of thiourea include alkyl thiourea and dialkyl thiourea.

Since the water-soluble organic compound itself has moisture retention, it assists the ink for ink-jet recording in increasing the moisture retention. Further, since the water-soluble organic compound increases the solubility of the colorant, it contributes to the inhibition of the deposition of the colorant and to the storage stability of the ink for ink-jet recording.

In the present invention, the content of the water-soluble organic compound in the ink for ink-jet recording is preferably 0.1% by weight or more in order to increase the force required for the ejection of the ink droplets sufficiently, to maintain the moisture retention of the ink sufficiently and to maintain the interaction between the nitrogen-containing compound and the hydroxide of alkali metal or ammonium hydroxide sufficiently, while the content is 15% by weight or less, and more preferably in the range of from 3 to 9 % by weight in order to obtain the stable solubility of the specific water-soluble organic compound and to obtain a stable ejecting force for ink droplets.

In the present invention, a surfactant is preferably incorporated in the ink for ink-jet recording. The surfactant incorporated in the ink for ink-jet recording not only assists the ink in penetrating into paper but also interacts with the colorant molecule to impart a stable solubility to the colorant so that the ejection of the ink for jet-recording can be protected from becoming unstable and so that the flocculation and deposition of the colorant can be prevented over a long period of storage. In addition, the interaction between the colorant molecule and the surfactant leads to better control of the coloration of the print.

The surfactant used in the present invention may be a nonionic surfactant, an anionic surfactant, a cationic surfactant or an amphoteric surfactant.

Examples of the nonionic surfactant include polyoxyethylene alkylphenyl ethers, such as polyoxyethylene nonylphenyl ethers, polyoxyethylene octylphenyl ethers and polyoxyethylene dodecylphenyl ethers, polyoxyethylene alkyl ethers, polyoxyethylene fatty acid esters, sorbitan fatty acid esters, polyoxyethylene/polyoxypropylene block copolymers, acetylene glycol/ethylene oxide adducts, glycerin/ethylene oxide adducts, polyoxyethylenesorbitan fatty acid esters and fatty acid alkylolamides.

Examples of the anionic surfactant include alkylbenzenesulfonates, alkylnaphthalenesulfonates, alkylnaphthalenesulfonate/formalin condensates, salts of higher fatty acids, salts of sulfated higher fatty acid esters, salts of sulfonated higher fatty acid esters, salts of sulfated higher alcohol ethers, salts of sulfonated higher alcohol ethers, higher-alkylsulfonamide alkylcarboxylates, sulfosuccinates, and salts of sulfosuccinic acid esters.

Examples of the cationic surfactant include primary, secondary or tertiary amines, and quaternary ammonium salts.

Examples of the amphoteric surfactant include betaine, sulfobetaine, sulfated betaine and imidazolyl betaine.

Further, the surfactants which can be used in the present invention include fluorine-containing surfactants, such as polyoxyethylene perfluoroalkyl ethers, perfluoroalkylbenzenesulfonates and perfluoroalkyl quaternary ammonium salts, and silicon-containing surfactants.

In the present invention, preferable surfactants are those nonionic surfactants which hardly interact with ions of the colorants and ions of other various components. Examples of these surfactants desirable from the viewpoint of thermal stability and purity are polyoxyethylene alkyl ethers, polyoxyethylene alkylphenyl ethers and polyoxyethylene/polyoxypropylene block copolymers.

In the present invention, the content of the surfactant in the ink for ink-jet recording is preferably in the range of from 0.005 to 5% by weight, and more preferably in the range of from 0.01 to 2% by weight.

The ink for ink-jet recording of the present invention may contain, if necessary, an inclusion compound, a chelating agent, anti-mildew agent, a water-soluble polymer and the like. Examples of the inclusion compound include cyclodextrin, polycyclodextrin, macrocyclic amines, crown ethers and acetamides. Examples of the chelating agent include EDTA (ethylenediamine-N,N,N',N'-tetraacetic acid), EDMA (ethylenediamine-N-monoacetic acid) and NTA (nitrilotriacetic acid). Examples of the anti-mildew agent include benzoic acid, sodium benzoate, salicylic acid, dehydroacetic acid, sodium dehydroacetate, propionic acid and sodium propionate. Examples of the water-soluble polymer include sodium alginate, styrene/acrylic acid copolymers, polyvinyl alcohol and polyvinylpyrrolidone.

[physical characteristics of each ink]

In the ink for ink-jet recording of the present invention, the product ($\Sigma \times \eta$) of the electrical conductivity $\Sigma$ (S/m) and the viscosity $\eta$(mPa·s) at 20° C. is preferably in the range of from 0.4 to 4.0. If this value is within the range, the colorants are dissolved in a stable manner, and, as a result, it is possible to prevent nozzle clogging and to prevent the loss of the ejection stability of the ink. The deposition of the colorants can be prevented even if the ink is stored for a long period of time.

The term "electrical conductivity $\Sigma$" as used herein refers to the electrical conductivity of the ink liquid prepared and is a value obtained in a condition of 20° C. and 50% RH by means of a conductivity meter (manufactured by Electrochemical Instruments Co., Ltd.). The term "viscosity $\eta$" as used herein refers to the viscosity of the ink liquid prepared and is a value obtained under conditions of 20° C. and 50% RH by means of a viscometer (manufactured by Rheomat Co., Ltd.).

In the ink for ink-jet recording of the present invention, it is preferable that the surface tension γ is 20 to 50 mN/m and the viscosity η is 1.2 to 5.0 mPa·s at 20° C. If these values are in these ranges, the penetration rate of the ink for ink-jet recording into paper can be increased so that the colorants are fixed to the surface of paper without being excessively flocculated and deposited. In addition, the ink can be ejected in a stable manner without causing the dots to change position even if the ink is ejected continuously over a long period of time.

If the surface tension γ is less than 20 mN/m, ink penetration becomes excessive giving undesirable results; the density of printed images decreases and, image bleeding tends to occur. If the surface tension γ is more than 50 mN/m, the penetration rate of the ink decreases and the colorants are excessively flocculated and deposited on the paper. If the viscosity η is less than 1.2 mPa·s, the ejection is liable to become unstable, whereas if the viscosity η is more than 5.0 mPa·s, the penetration rate of the ink decreases and the ink becomes liable to excessively flocculate and deposit on the paper.

The term "surface tension γ" as used herein refers to the surface tension of the ink liquid prepared and is a value obtained at 20° C. and 50% RH by means of a surface tension meter (manufactured by Kyowa Surface Chemistry Co., Ltd.).

The ink for ink-jet recording of the present invention can be prepared in the same way as publicly known formulations are prepared and can be used suitably in the ink-jet recording method described below.

[ink-jet recording method]

The ink-jet recording method according to the present invention is not particularly limited as long as the ink for ink-jet recording of the present invention is used. The method itself may be a publicly known method. The ink-jet recording method is a method wherein the ink droplets ejected from an orifice according to a recording signal are allowed to penetrate into a recording medium so that the recording is performed.

The mechanism which is adopted in the ink-jet recording of the present invention is not particularly limited. Examples of the mechanisms adopted include a charge-controlling method wherein ink is ejected by utilizing electrostatic attraction, a drop-on-demand method (pilzo method) wherein ink is ejected by utilizing the vibrating pressure of a piezoelement and a hot ink jet method wherein ink is ejected by utilizing the pressure which is created by forming and growing bubbles by means of heat.

Among these mechanisms, a hot ink jet method is preferable in the present invention. A high level of stability in ejection is obtained in the case where the ink droplets are formed by providing thermal energy from a heating means to the ink for ink-jet recording.

Figure 2:
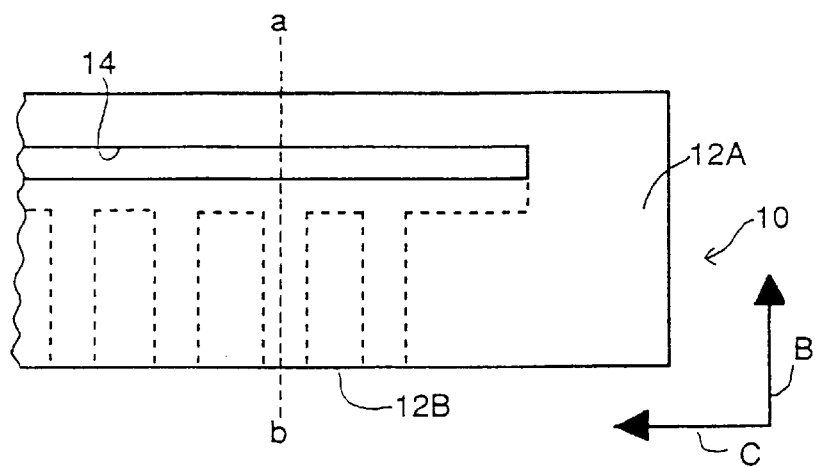
FIG. 2 is a top view illustrating an example of the recording head for use in a recording apparatus based on hot ink-jet recording.
Figure 3:
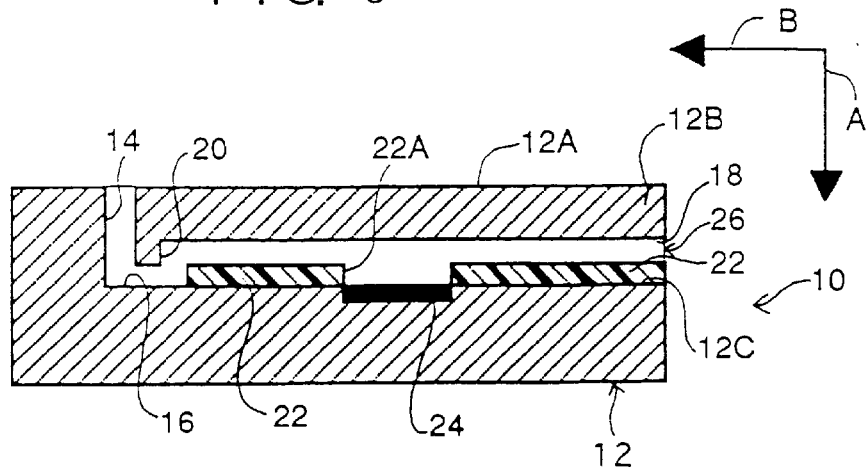
FIG. 3 is a cross section diagram of an example of the recording head for use in a recording apparatus based on hot ink-jet recording, wherein the cross section is taken through the dotted line a-b (towards the back) of the recording head shown in FIGS. 1 and 2.

Now, referring to FIGS. 1 to 3, a preferable example of a hot ink jet method for ink-jet recording according to the present invention is explained below.

A recording head 10 has a rectangular parallelepiped body 12 made of silicone. In the body 12, there is formed a first fluid passageway 14 which is parallel to the direction of height (direction indicated by an arrow A) and which extends from an upper face 12A to approximately the center of the body 12 in the direction of the height.

In the body 12, there is formed a rectangular parallelepiped cutaway 12C which is parallel to the direction of depth (direction indicated by an arrow B) and which extends from a front face 12B to a position short of the first fluid passageway 14. On the deep side of the cutaway 12C, there is formed a communicating channel 16 which is parallel to the direction of depth (direction indicated by an arrow B) and which allows the cutaway 12 to communicate with the first fluid passageway 14.

In the body 12, there is formed a second fluid passageway 18 in a position which is parallel to the direction of depth (direction indicated by an arrow B) and contiguous to the cutaway 12C. The front face of the second fluid passageway 18 is in the shape of a triangle, and the length in the direction of depth of the second fluid passageway 18 is a little smaller than the length in the direction of depth of the cutaway 12 C.

Further, in the body 12, there is formed a communicating channel 20 which is parallel to the direction of height (direction indicated by an arrow A) and which allows the first communicating channel 16 on the side facing the front face 12C to communicate with the second fluid passageway 18 on the side opposite the front face 12C.

In the cutaway 12C, there is inserted a rectangular parallelepiped insert 22 made of a polyimide resin and fixed by means of an epoxy resin. A rectangular parallelepiped cutaway 22A is formed in the insert 22 in a position which is downstream of the second fluid passageway 18 and at approximately the center of the insert 22 in the direction of the depth. A heat generating member 24 serving as a heating means and connected to a controller which is not shown is placed in the cutaway 22A. That is, the periphery of the heat generating member 24 which serves as a heating means in the recording head 10 is made from a polyimide resin. Since the periphery of the heating means is made from a polyimide resin which has a sufficient chemical resistance to the components contained in the ink for ink-jet recording, deterioration of the periphery of the heating means can be inhibited.

The term "periphery of heating means" as used herein refers to the part which is heated by the heat generating member to a temperature equal to or above 200° C. and which is in contact with the passageway of the ink.

In the recording head 10, the first fluid passageway 14, the communicating channels 16 and 20, and the second fluid passageway 18 jointly form a passageway of ink, while the side of the second fluid passageway 18 on the front face 12B forms an outlet 26. The ink flowing through the passageway is heated by the heat generating member 24 positioned underneath the second fluid passageway 18 so that ink droplets are formed and ejected from the outlet 26.

The heating of the heating member 24 is performed by the action (application) of a plurality of energy pulses provided from a controller, not shown, in accordance with recording signals. If a plurality of energy pulses are applied, the initial quality of print can be maintained even if the apparatus is used over a long period of time.

In addition to a recording step in the recording, the ink-jet recording method according to the present invention may include other steps. For example, the ink-jet recording method preferably includes a preparatory ejection step wherein the ink droplets are ejected in order to prevent clogging when recording is not performed.

EXAMPLES

In order that those skilled in the art will be better able to practice the present invention, the following examples are given by way of illustration and not by way of limitation. In Examples and Comparative Examples, all parts are by weight unless otherwise specified, and the total is 100 parts by weight.

[ink set]

Example 1

(black ink)

| | parts by weight |
|---|---|
| Ammonium salt of a dye in the form of the compound (VIII-1) | 2 |
| Ammonium salt of a dye in the form of the compound (IX-9) | 0.9 |
| Glycerin | 10 |
| (HOC$_2$H$_4$)$_2$NC$_2$H$_4$SO$_3$H | 2.5 |
| Sodium hydroxide | 0.5 |
| Urea | 6 |
| Polyoxyethylene oleyl ether having 30 mol of ethylene oxide (hereinafter referred to as "EO") added | 0.1 |
| Ion-exchanged water | 78 |

The above-identified ingredients were well mixed and dissolved, and the resulting solution was then press-filtered by means of a 0.45 μm filter to prepare ink. The ink prepared had a surface tension of 42 mN/m, a viscosity of 1.7 mPa·s and a pH value of 9.1 at 20° C.

(cyan ink)

| | parts by weight |
|---|---|
| Ammonium salt of a dye in the form of the compound (I-1) | 2 |
| C.I. Acid Blue 9 | 0.5 |
| Diethylene glycol | 20 |
| 2-(2-butoxyethoxy)ethanol | 5 |
| (HOCH$_2$)$_3$CNH(CH$_2$)$_2$SO$_3$H | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a filter having an opening of 0.45 μm to prepare ink. The ink prepared had a surface tension of 38 mN/m, a viscosity of 2.7 mPa·s and a pH value of 9.1 at 20° C.

(magenta ink)

| | parts by weight |
|---|---|
| Ammonium salt of a dye in the form of the compound (IV-1) | 2 |
| Sodium salt of a dye in the form of the compound (V-1) | 0.5 |
| Diethylene glycol | 20 |
| 2-(2-butoxyethoxy)ethanol | 5 |
| (HOCH$_2$)$_3$CNH(CH$_2$)$_2$SO$_3$H | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 36 mN/m, a viscosity of 2.8 mPa·s and a pH value of 9.2 at 20° C.

(yellow ink)

| | parts by weight |
|---|---|
| Ammonium salt of a dye in the form of the compound (VII-1) | 2 |
| C.I. Direct Yellow 144 | 0.5 |
| Diethylene glycol | 20 |
| 2-(2-butoxyethoxy)ethanol | 5 |
| (HOCH$_2$)$_3$CNH(CH$_2$)$_2$SO$_3$H | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 38 mN/m, a viscosity of 2.6 mPa·s and a pH value of 9.1 at 20° C.

Example 2

(black ink)

| | parts by weight |
|---|---|
| Ammonium salt of a dye in the form of the compound (VIII-1) | 2 |
| Lithium salt of a dye in the form of the compound (IX-9) | 0.9 |
| Glyercin | 10 |
| (HOC$_2$H$_4$)$_2$NC$_2$H$_4$SO$_3$H | 2.5 |
| Sodium hydroxide | 0.5 |
| Urea | 6 |
| Polyoxyethylene oleyl ether (having 30 mol of EO added) | 0.1 |
| Ion-exchanged water | 78 |

The above-identified ingredients were well mixed and dissolved, and the resulting solution was then press-filtered by means of a 0.45 μm filter to prepare ink. The ink prepared had a surface tension of 42 mN/m, a viscosity of 1.7 mPa·s and a pH value of 9.1 at 20° C.

(cyan ink)

| | parts by weight |
|---|---|
| Ammonium salt of a dye in the form of the compound (II-1) | 2 |
| C.I. Direct Blue 199 | 0.5 |
| Diethylene glycol | 20 |
| 2-(2-butoxyethoxy)ethanol | 5 |
| (HOCH$_2$)$_3$CNH(CH$_2$)$_2$SO$_3$H | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 38 mN/m, a viscosity of 2.7 mPa·s and a pH value of 9.1 at 20° C.

(magenta ink)

| | parts by weight |
|---|---|
| Ammonium salt of a dye in the form of the compound (IV-1) | 2 |
| Sodium salt of a dye in the form of the compound (V-1) | 0.5 |
| Diethylene glycol | 20 |
| 2-(2-butoxyethoxy)ethanol | 5 |
| $(HOCH_2)_3CNH(CH_2)_2SO_3H$ | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 36 mN/m, a viscosity of 2.8 mPa·s and a pH value of 9.2 at 20° C.

(yellow ink)

| | parts by weight |
|---|---|
| Ammonium salt of a dye in the form of the compound (VII-1) | 2 |
| C.I. Direct Yellow 144 | 0.5 |
| Diethylene glycol | 20 |
| 2-(2-butoxyethoxy)ethanol | 5 |
| $(HOCH_2)_3CNH(CH_2)_2SO_3H$ | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 38 mN/m, a viscosity of 2.6 mPa·s and a pH value of 9.1 at 20° C.

Example 3

(black ink)

| | parts by weight |
|---|---|
| Ammonium salt of a dye in the form of the compound (VIII-1) | 2.5 |
| Potassium salt of a dye in the form of the compound (IX-9) | 0.2 |
| Glycerin | 10 |
| $(HOC_2H_4)_2NC_2H_4SO_3H$ | 2.5 |
| Sodium hydroxide | 0.5 |
| Urea | 6 |
| Polyoxyethylene oleyl ether (having 30 mol of EO added) | 0.1 |
| Ion-exchanged water | 77.9 |

The above-identified ingredients were well mixed and dissolved, and the resulting solution was then press-filtered by means of a 0.45 μm filter to prepare ink. The ink prepared had a surface tension of 42 mN/m, a viscosity of 1.6 mPa·s and a pH value of 9.1 at 20° C.

(cyan ink)

| | parts by weight |
|---|---|
| Ammonium salt of a dye in the form of the compound (II-1) | 2.2 |
| C.I. Acid Blue 9 | 0.2 |
| Diethylene glycol | 20 |
| 2-(2-butoxyethoxy)ethanol | 5 |
| $(HOCH_2)_3CNH(CH_2)_2SO_3H$ | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.6 |

The above-identified ingredients were well mixed and dissolved, and the resulting solution was then press-filtered by means of a 0.45 μm filter to prepare ink. The ink prepared had a surface tension of 38 mN/m, a viscosity of 2.6 mPa·s and a pH value of 9.1 at 20° C.

(magenta ink)

| | parts by weight |
|---|---|
| Ammonium salt of a dye in the form of the compound (IV-1) | 2.2 |
| Sodium salt of a dye in the form of the compound (V-1) | 0.2 |
| Diethylene glycol | 20 |
| 2-(2-butoxyethoxy)ethanol | 5 |
| $(HOCH_2)_3CNH(CH_2)_2SO_3H$ | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.6 |

The above-identified ingredients were well mixed and dissolved, and the resulting solution was then press-filtered by means of a 0.45 μm filter to prepare ink. The ink prepared had a surface tension of 36 mN/m, a viscosity of 2.7 mPa·s and a pH value of 9.2 at 20° C.

(yellow ink)

| | parts by weight |
|---|---|
| Ammonium salt of a dye in the form of the compound (VII-1) | 2.2 |
| C.I. Direct Yellow 144 | 0.2 |
| Diethylene glycol | 20 |
| 2-(2-butoxyethoxy)ethanol | 5 |
| $(HOCH_2)_3CNH(CH_2)_2SO_3H$ | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.6 |

The above-identified ingredients were well mixed and dissolved, and the resulting solution was then press-filtered by means of a 0.45 μm filter to prepare ink. The ink prepared had a surface tension of 38 mN/m, a viscosity of 2.5 mPa·s and a pH value of 9.1 at 20° C.

Example 4

(black ink)

| | parts by weight |
|---|---|
| Ammonium salt of a dye in the form of the compound (VIII-1) | 1.8 |
| Lithium salt of a dye in the form of the compound (IX-9) | 1 |
| Glycerin | 10 |
| $(HOC_2H_4)_2NC_2H_4SO_3H$ | 2.5 |
| sodium hydroxide | 0.5 |
| Urea | 6 |
| Polyoxyethylene oleyl ether (having 30 mol of EO added) | 0.1 |
| Ion-exchanged water | 77.9 |

The above-identified ingredients were well mixed and dissolved, and the resulting solution was then press-filtered by means of a 0.45 μm filter to prepare ink. The ink prepared had a surface tension of 42 mN/m, a viscosity of 1.7 mPa·s and a pH value of 9.0 at 20° C.

(cyan ink)

| | parts by weight |
|---|---|
| Ammonium salt of a dye in the form of the compound (II-1) | 1.8 |
| C.I. Acid Blue 9 | 1 |
| Diethylene glycol | 20 |
| 2-(2-butoxyethoxy)ethanol | 5 |
| $(HOCH_2)_3CNH(CH_2)_2SO_3H$ | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.2 |

The above-identified ingredients were well mixed and dissolved, and the resulting solution was then press-filtered by means of a 0.45 μm filter to prepare ink. The ink prepared had a surface tension of 38 mN/m, a viscosity of 2.7 mPa·s and a pH value of 9.0 at 20° C.

(magenta ink)

| | parts by weight |
|---|---|
| Ammonium salt of a dye in the form of the compound (IV-1) | 1.8 |
| Sodium salt of a dye in the form of the compound (V-1) | 1.0 |
| Diethylene glycol | 20 |
| 2-(2-butoxyethoxy)ethanol | 5 |
| $(HOCH_2)_3CNH(CH_2)_2SO_3H$ | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.2 |

The above-identified ingredients were well mixed and dissolved, and the resulting solution was then press-filtered by means of a 0.45 μm filter to prepare ink. The ink prepared had a surface tension of 36 mN/m, a viscosity of 2.8 mPa·s and a pH value of 9.1 at 20° C.

(yellow ink)

| | parts by weight |
|---|---|
| Ammonium salt of a dye in the form of the compound (VII-1) | 1.8 |
| C.I. Direct Yellow 144 | 0.2 |

-continued

| | parts by weight |
|---|---|
| Diethylene glycol | 20 |
| 2-(2-butoxyethoxy)ethanol | 5 |
| $(HOCH_2)_3CNH(CH_2)_2SO_3H$ | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.2 |

The above-identified ingredients were well mixed and dissolved, and the resulting solution was then press-filtered by means of a 0.45 μm filter to prepare ink. The ink prepared had a surface tension of 38 mN/m, a viscosity of 2.6 mPa·s and a pH value of 9.1 at 20° C.

Example 5

(black ink)

| | parts by weight |
|---|---|
| Ammonium salt of a dye in the form of the compound (VIII-1) | 2 |
| Potassium salt of a dye in the form of the compound (IX-9) | 0.9 |
| Glycerin | 10 |
| $(HOC_2H_4)_2NC_2H_4SO_3H$ | 2.5 |
| Sodium hydroxide | 0.5 |
| Urea | 6 |
| Polyoxyethylene oleyl ether (having 30 mol of EO added) | 0.1 |
| Ion-exchanged water | 78 |

The above-identified ingredients were well mixed and dissolved, and the resulting solution was then press-filtered by means of a 0.45 μm filter to prepare ink. The ink prepared had a surface tension of 42 mN/m, a viscosity of 1.7 mPa·s and a pH value of 9.1 at 20° C.

(cyan ink)

| | parts by weight |
|---|---|
| Ammonium salt of a dye in the form of the compound (II-1) | 2 |
| C.I. Acid Blue 9 | 0.5 |
| Diethylene glycol | 20 |
| 2-(2-butoxyethoxy)ethanol | 5 |
| $(HOCH_2)_3CNH(CH_2)_2SO_3H$ | 4.5 |
| Sodium hydroxide | 0.30 |
| Urea | 6 |
| Nonionic surfactant Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 38 mN/m, a viscosity of 2.7 mPa·s and a pH value of 9.1 at 20° C.

(magenta ink)

| | parts by weight |
|---|---|
| Ammonium salt of a dye in the form of the compound (IV-1) | 2 |
| Sodium salt of a dye in the form of the compound (V-1) | 0.5 |
| Diethylene glycol | 20 |
| 2-(2-butoxyethoxy)ethanol | 5 |

| | parts by weight |
|---|---|
| (HOCH$_2$)$_3$CNH(CH$_2$)$_2$SO$_3$H | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 36 mN/m, a viscosity of 2.8 mPa·s and a pH value of 9.2 at 20° C.
(yellow ink)

| | parts by weight |
|---|---|
| C.I. Direct Yellow 144 | 2.5 |
| Diethylene glycol | 20 |
| 2-(2-butoxyethoxy)ethanol | 5 |
| (HOCH$_2$)$_3$CNH(CH$_2$)$_2$SO$_3$H | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 38 mN/m, a viscosity of 2.6 mPa·s and a pH value of 7.1 at 20° C.

Example 6

(black ink)

| | parts by weight |
|---|---|
| Ammonium salt of a dye in the form of the compound (VIII-1) | 2.0 |
| Potassium salt of a dye in the form of the compound (IX-9) | 0.9 |
| Glycerin | 10 |
| (HOC$_2$H$_4$)$_2$NC$_2$H$_4$SO$_3$H | 2.5 |
| Sodium hydroxide | 0.5 |
| Urea | 6 |
| Polyoxyethylene oleyl ether (having 30 mol of EO added) | 0.1 |
| Ion-exchanged water | 78 |

The above-identified ingredients were well mixed and dissolved, and the resulting solution was then press-filtered by means of a 0.45 μm filter to prepare ink. The ink prepared had a surface tension of 42 mN/m, a viscosity of 1.7 mPa·s and a pH value of 9.1 at 20° C.
(cyan ink)

| | parts by weight |
|---|---|
| Ammonium salt of a dye in the form of the compound (II-1) | 2 |
| C.I. Acid Blue 9 | 0.5 |
| Diethylene glycol | 20 |
| 2-(2-butoxyethoxy)ethanol | 5 |
| (HOCH$_2$)$_3$CNH(CH$_2$)$_2$SO$_3$H | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 38 mN/m, a viscosity of 2.7 mPa·s and a pH value of 9.1 at 20° C.
(magenta ink)

| | parts by weight |
|---|---|
| Ammonium salt of a dye in the form of the compound (IV-1) | 2 |
| Sodium salt of a dye in the form of the compound (V-1) | 0.5 |
| Diethylene glycol | 20 |
| 2-(2-butoxyethoxy)ethanol | 5 |
| (HOCH$_2$)$_3$CNH(CH$_2$)$_2$SO$_3$H | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 36 mN/m, a viscosity of 2.8 mPa·s and a pH value of 9.2 at 20° C.
(yellow ink)

| | parts by weight |
|---|---|
| Ammonium salt of a dye in the form of the compound (VII-1) | 2 |
| C.I. Direct Yellow 86 | 0.5 |
| Diethylene glycol | 20 |
| 2-(2-butoxyethoxy)ethanol | 5 |
| (HOCH$_2$)$_3$CNH(CH$_2$)$_2$SO$_3$H | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 38 mN/m, a viscosity of 2.6 mPa·s and a pH value of 9.0 at 20° C.

Example 7

(black ink)

| | parts by weight |
|---|---|
| Ammonium salt of a dye in the form of the compound (VIII-1) | 2 |
| C.I. Direct Yellow 144 | 0.9 |
| Glycerin | 10 |
| (HOC$_2$H$_4$)$_2$NC$_2$H$_4$SO$_3$H | 2.5 |
| Sodium hydroxide | 0.5 |

|  | parts by weight |
|---|---|
| Urea | 6 |
| Polyoxyethylene oleyl ether (having 30 mol of EO added) | 0.1 |
| Ion-exchanged water | 78 |

The above-identified ingredients were well mixed and dissolved, and the resulting solution was then press-filtered by means of a 0.45 μm filter to prepare ink. The ink prepared had a surface tension of 41 mN/m, a viscosity of 1.7 mPa·s and a pH value of 9.0 at 20° C.
(cyan ink)

|  | parts by weight |
|---|---|
| Ammonium salt of a dye in the form of the compound (II-1) | 2 |
| C.I. Acid Blue 9 | 0.5 |
| Diethylene glycol | 20 |
| 2-(2-butoxyethoxy)ethanol | 5 |
| (HOCH$_2$)$_3$CNH(CH$_2$)$_2$SO$_3$H | 4.5 |
| Sodium hydroxide | 0.30 |
| Urea | 6 |
| Nonionic surfactant Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 38 mN/m, a viscosity of 2.7 mPa·s and a pH value of 9.1 at 20° C.
(magenta ink)

|  | parts by weight |
|---|---|
| Ammonium salt of a dye in the form of the compound (IV-1) | 2 |
| Sodium salt of a dye in the form of the compound (V-1) | 0.5 |
| Diethylene glycol | 20 |
| 2-(2-butoxyethoxy)ethanol | 5 |
| (HOCH$_2$)$_3$CNH(CH$_2$)$_2$SO$_3$H | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 36 mN/m, a viscosity of 2.8 mPa·s and a pH value of 9.2 at 20° C.
(yellow ink)

|  | parts by weight |
|---|---|
| Ammonium salt of a dye in the form of the compound (VII-1) | 2 |
| C.I. Direct Yellow 86 | 0.5 |
| Diethylene glycol | 20 |
| 2-(2-butoxyethoxy)ethanol | 5 |
| (HOCH$_2$)$_3$CNH(CH$_2$)$_2$SO$_3$H | 4.5 |
| Sodium hydroxide | 0.30 |
| Urea | 6 |

|  | parts by weight |
|---|---|
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 38 mN/m, a viscosity of 2.6 mPa·s and a pH value of 9.0 at 20° C.

Comparative Example 1

(black ink)

|  | parts by weight |
|---|---|
| Ammonium salt of a dye in the form of the compound (VIII-1) | 2 |
| Lithium salt of a dye in the form of the compound (IX-9) | 0.9 |
| Glycerin | 10 |
| (HOC$_2$H$_4$)$_2$NC$_2$H$_4$SO$_3$H | 2.5 |
| Sodium hydroxide | 0.5 |
| Urea | 6 |
| Polyoxyethylene oleyl ether (having 30 mol of EO added) | 0.1 |
| Ion-exchanged water | 78 |

The above-identified ingredients were well mixed and dissolved, and the resulting solution was then press-filtered by means of a 0.45 μm filter to prepare ink. The ink prepared had a surface tension of 42 mN/m, a viscosity of 1.7 mPa·s and a pH value of 9.1 at 20° C.
(cyan ink)

|  | parts by weight |
|---|---|
| Ammonium salt of a dye in the form of the compound (I-1) | 2.5 |
| Diethylene glycol | 20 |
| 2-(2-butoxyethoxy)ethanol | 5 |
| (HOCH$_2$)$_3$CNH(CH$_2$)$_2$SO$_3$H | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 38 mN/m, a viscosity of 2.6 mPa·s and a pH value of 9.1 at 20° C.
(magenta ink)

|  | parts by weight |
|---|---|
| Ammonium salt of a dye in the form of the compound (IV-1) | 2 |
| Sodium salt of a dye in the form of the compound (V-1) | 0.5 |
| Diethylene glycol | 20 |
| 2-(2-butoxyethoxy)ethanol | 5 |
| (HOCH$_2$)$_3$CNH(CH$_2$)$_2$SO$_3$H | 4.5 |
| Sodium hydroxide | 0.30 |
| Urea | 6 |

101

-continued

| | parts by weight |
|---|---|
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 36 mN/m, a viscosity of 2.8 mPa·s and a pH value of 9.2 at 20° C.
(yellow ink)

| | parts by weight |
|---|---|
| Ammonium salt of a dye in the form of the compound (VII-1) | 2 |
| C.I. Direct Yellow 144 | 0.5 |
| Diethylene glycol | 20 |
| 2-(2-butoxyethoxy)ethanol | 5 |
| (HOCH$_2$)$_3$CNH(CH$_2$)$_2$SO$_3$H | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 38 mN/m, a viscosity of 2.6 mPa·s and a pH value of 9.1 at 20° C.

Comparative Example 2

(black ink)

| | parts by weight |
|---|---|
| Ammonium salt of a dye in the form of the compound (VIII-1) | 2 |
| Lithium salt of a dye in the form of the compound (IX-9) | 0.9 |
| Glycerin | 10 |
| (HOC$_2$H$_4$)$_2$NC$_2$H$_4$SO$_3$H | 2.5 |
| Sodium hydroxide | 0.5 |
| Urea | 6 |
| Polyoxyethylene oleyl ether (having 30 mol of EO added) | 0.1 |
| Ion-exchanged water | 78 |

The above-identified ingredients were well mixed and dissolved, and the resulting solution was then press-filtered by means of a 0.45 μm filter to prepare ink. The ink prepared had a surface tension of 42 mN/m, a viscosity of 1.7 mPa·s and a pH value of 9.1 at 20° C.
(cyan ink)

| | parts by weight |
|---|---|
| Ammonium salt of a dye in the form of the compound (I-1) | 0.5 |
| C.I. Acid Blue 9 | 2 |
| Diethylene glycol | 20 |
| 2-(2-butoxyethoxy)ethanol | 5 |
| (HOCH$_2$)$_3$CNH(CH$_2$)$_2$SO$_3$H | 4.5 |
| Sodium hydroxide | 0.30 |
| Urea | 6 |

102

-continued

| | parts by weight |
|---|---|
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 38 mN/m, a viscosity of 2.8 mPa·s and a pH value of 9.1 at 20° C.
(magenta ink)

| | parts by weight |
|---|---|
| Ammonium salt of a dye in the form of the compound (IV-1) | 2 |
| Sodium salt of a dye in the form of the compound (V-1) | 0.5 |
| Diethylene glycol | 20 |
| 2-(2-butoxyethoxy)ethanol | 5 |
| (HOCH$_2$)$_3$CNH(CH$_2$)$_2$SO$_3$H | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 36 mN/m, a viscosity of 2.8 mPa·s and a pH value of 9.2 at 20° C.
(yellow ink)

| | parts by weight |
|---|---|
| Ammonium salt of a dye in the form of the compound (VII-1) | 2 |
| C.I. Direct Yellow 144 | 0.5 |
| Diethylene glycol | 20 |
| 2-(2-butoxyethoxy)ethanol | 5 |
| (HOCH$_2$)$_3$CNH(CH$_2$)$_2$SO$_3$H | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 38 mN/m, a viscosity of 2.6 mPa·s and a pH value of 9.1 at 20° C.

Comparative Example 3

(black ink)

| | parts by weight |
|---|---|
| Ammonium salt of a dye in the form of the compound (VIII-1) | 2 |
| Potassium salt of a dye in the form of the compound (IX-9) | 0.9 |
| Glycerin | 10 |
| (HOC$_2$H$_4$)$_2$NC$_2$H$_4$SO$_3$H | 2.5 |
| Sodium hydroxide | 0.5 |
| Urea | 6 |

| | parts by weight |
|---|---|
| Polyoxyethylene oleyl ether (having 30 mol of EO added) | 0.1 |
| Ion-exchanged water | 78 |

The above-identified ingredients were well mixed and dissolved, and the resulting solution was then press-filtered by means of a 0.45 μm filter to prepare ink. The ink prepared had a surface tension of 42 mN/m, a viscosity of 1.7 mPa·s and a pH value of 9.1 at 20° C.

(cyan ink)

| | parts by weight |
|---|---|
| Ammonium salt of a dye in the form of the compound (I-1) | 2 |
| C.I. Acid Blue 9 | 0.5 |
| Diethylene glycol | 20 |
| 2-(2-butoxyethoxy)ethanol | 5 |
| $(HOCH_2)_3CNH(CH_2)_2SO_3H$ | 4.5 |
| Sodium hydroxide | 0.30 |
| Urea | 6 |
| Nonionic surtactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 38 mN/m, a viscosity of 2.7 mPa·s and a pH value of 9.1 at 20° C.

(magenta ink)

| | parts by weight |
|---|---|
| Ammonium salt of a dye in the form of the compound (IV-1) | 2.5 |
| Diethylene glycol | 20 |
| 2-(2-butoxyethoxy)ethanol | 5 |
| $(HOCH_2)_3CNH(CH_2)_2SO_3H$ | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 36 mN/m, a viscosity of 2.7 mPa·s and a pH value of 9.2 at 20° C.

(yellow ink)

| | parts by weight |
|---|---|
| Ammonium salt of a dye in the form of the compound (VII-1) | 2 |
| C.I. Direct Yellow 144 | 0.5 |
| Diethylene glycol | 20 |
| 2-(2-butoxyethoxy)ethanol | 5 |
| $(HOCH_2)_3CNH(CH_2)_2SO_3H$ | 4.5 |
| Sodium hydroxide | 0.30 |
| Urea | 6 |
| Nonionic surfactant Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 38 mN/m, a viscosity of 2.6 mPa·s and a pH value of 9.1 at 20° C.

Comparative Example 4

(black ink)

| | parts by weight |
|---|---|
| Ammonium salt of a dye in the form of the compound (VIII-1) | 2 |
| Ammonium salt of a dye in the form of the compound (IX-9) | 0.9 |
| Glycerin | 10 |
| $(HOC_2H_4)_2NC_2H_4SO_3H$ | 2.5 |
| Sodium hydroxide | 0.5 |
| Urea | 6 |
| Polyoxyethylene oleyl ether (having 30 mol of EO added) | 0.1 |
| Ion-exchanged water | 78 |

The above-identified ingredients were well mixed and dissolved, and the resulting solution was then press-filtered by means of a 0.45 μm filter to prepare ink. The ink prepared had a surface tension of 42 mN/m, a viscosity of 1.7 mPa·s and a pH value of 9.1 at 20° C.

(cyan ink)

| | parts by weight |
|---|---|
| Ammonium salt of a dye in the form of the compound (I-1) | 2 |
| C.I. Acid Blue 9 | 0.5 |
| Diethylene glycol | 20 |
| 2-(2-butoxyethoxy)ethanol | 5 |
| $(HOCH_2)_3CNH(CH_2)_2SO_3H$ | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 38 mN/m, a viscosity of 2.7 mPa·s and a pH value of 9.1 at 20° C.

(magenta ink)

| | parts by weight |
|---|---|
| Ammonium salt of a dye in the form of the compound (IV-1) | 0.5 |
| Sodium salt of a dye in the form of the compound (V-1) | 2 |
| Diethylene glycol | 20 |
| 2-(2-butoxyethoxy)ethanol | 5 |
| $(HOCH_2)_3CNH(CH_2)_2SO_3H$ | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 36 mN/m, a viscosity of 2.8 mPa·s and a pH value of 9.2 at 20° C.

(yellow ink)

| | parts by weight |
|---|---|
| Ammonium salt of a dye in the form of the compound (VII-1) | 2 |
| C.I. Direct Yellow 144 | 0.5 |
| Diethylene glycol | 20 |
| 2-(2-butoxyethoxy)ethanol | 5 |
| $(HOCH_2)_3CNH(CH_2)_2SO_3H$ | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 38 mN/m, a viscosity of 2.6 mPa·s and a pH value of 9.1 at 20° C.

Comparative Example 5

(black ink)

| | parts by weight |
|---|---|
| Ammonium salt of a dye in the form of the compound (VIII-1) | 2 |
| Ammonium salt of a dye in the form of the compound (IX-9) | 0.9 |
| Glycerin | 10 |
| $(HOC_2H_4)_2NC_2H_4SO_3H$ | 2.5 |
| Sodium hydroxide | 0.5 |
| Urea | 6 |
| Polyoxyethylene oleyl ether (having 30 mol of EO added) | 0.1 |
| Ion-exchanged water | 78 |

The above-identified ingredients were well mixed and dissolved, and the resulting solution was then press-filtered by means of a 0.45 μm filter to prepare ink. The ink prepared had a surface tension of 42 mN/m, a viscosity of 1.7 mPa·s and a pH value of 9.1 at 20° C.

(cyan ink)

| | parts by weight |
|---|---|
| Ammonium salt of a dye in the form of the compound (I-1) | 2 |
| C.I. Acid Blue 9 | 0.5 |
| Diethylene glycol | 20 |
| 2-(2-butoxyethoxy)ethanol | 5 |
| $(HOCH_2)_3CNH(CH_2)_2SO_3H$ | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 38 mN/m, a viscosity of 2.7 mPa·s and a pH value of 9.1 at 20° C.

(magenta ink)

| | parts by weight |
|---|---|
| Ammonium salt of a dye in the form of the compound (IV-1) | 2 |
| Sodium salt of a dye in the form of the compound (V-1) | 0.5 |
| Diethylene glycol | 20 |
| 2-(2-butoxyethoxy)ethanol | 5 |
| $(HOCH_2)_3CNH(CH_2)_2SO_3H$ | 4.5 |
| Sodium hydroxide | 0.30 |
| Urea | 6 |
| Nonionic surfactant Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 36 mN/m, a viscosity of 2.8 mPa·s and a pH value of 9.2 at 20° C.

(yellow ink)

| | parts by weight |
|---|---|
| Ammonium salt of a dye in the form of the compound (VII-1) | 2.5 |
| Diethylene glycol | 20 |
| 2-(2-butoxyethoxy)ethanol | 5 |
| $(HOCH_2)_3CNH(CH_2)_2SO_3H$ | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 38 mN/m, a viscosity of 2.6 mPa·s and a pH value of 9.1 at 20° C.

Comparative Example 6

(black ink)

| | parts by weight |
|---|---|
| Ammonium salt of a dye in the form of the compound (VIII-1) | 2.5 |
| Glycerin | 10 |
| $(HOC_2H_4)_2NC_2H_4SO_3H$ | 2.5 |
| Sodium hydroxide | 0.5 |
| Urea | 6 |
| Polyoxyethylene oleyl ether (having 30 mol of EO added) | 0.1 |
| Ion-exchanged water | 78.4 |

The above-identified ingredients were well mixed and dissolved, and the resulting solution was then press-filtered by means of a 0.45 μm filter to prepare ink. The ink prepared had a surface tension of 42 mN/m, a viscosity of 1.6 mPa·s and a pH value of 9.1 at 20° C.

(cyan ink)

| | parts by weight |
|---|---|
| Ammonium salt of a dye in the form of the compound (I-1) | 2.5 |
| Diethylene glycol | 20 |
| 2-(2-butoxyethoxy)ethanol | 5 |

-continued

| | parts by weight |
|---|---|
| $(HOCH_2)_3CNH(CH_2)_2SO_3H$ | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 38 mN/m, a viscosity of 2.6 mPa·s and a pH value of 9.1 at 20° C.
(magenta ink)

| | parts by weight |
|---|---|
| Ammonium salt of a dye in the form of the compound (IV-1) | 2.5 |
| Diethylene glycol | 20 |
| 2-(2-butoxyethoxy)ethanol | 5 |
| $(HOCH_2)_3CNH(CH_2)_2SO_3H$ | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 36 mN/m, a viscosity of 2.7 mPa·s and a pH value of 9.2 at 20° C.
(yellow ink)

| | parts by weight |
|---|---|
| Ammonium salt of a dye in the form of the compound (VII-1) | 2.5 |
| Diethylene glycol | 20 |
| 2-(2-butoxyethoxy)ethanol | 5 |
| $(HOCH_2)_3CNH(CH_2)_2SO_3H$ | 4.5 |
| Sodium hydroxide | 0.30 |
| Urea | 6 |
| Nonionic surfactant: Pluronic PE4300 (manufactured by BASF AG.) | 0.2 |
| Ion-exchanged water | 61.5 |

The above-identified ingredients were well mixed and dissolved, and the resulting solution was then press-filtered by means of a 0.45 μm filter to prepare ink. The ink prepared had a surface tension of 38 mN/m, a viscosity of 2.5 mPa·s and a pH value of 9.1 at 20° C.

Example 8

In order to prepare an ink set of Example 8 comprising 3 colors of ink, the procedure of Example 1 for the preparation of ink set was repeated, except that the black-color was excluded.

Evaluation Tests

The ink sets described in Examples 1 to 8 and Comparative Examples 1 to 6 were subjected to the tests described below by using a thermal ink-jet printer comprising an experimental ink-jet printing head which was made from a silicone resin, a polyimide resin, an epoxy resin and the like and which had a cross-section of nozzle outlet in the form of an equilateral triangle having 60 μm long sides. The condition to drive the printing head was as follows: driving voltage: 30 V, resistance of heat generating resistor: 180 Ω, and frequency: 6 KHz. The condition of pulses for ink ejection for printing in response to recording signals and for pre-ejection was as follows. The pre-ejection was performed at a pulse of $1 \times 10^5$ when the pulse for printing exceeded $1 \times 10^7$.

| | Pre-pulse (μs) | Interval (μs) | Main pulse (μs) |
|---|---|---|---|
| Ejection for printing | 0.5 | 1.0 | 4.8 |
| Pre-ejection | 1.0 | 1.0 | 3.8 |

(1) Image quality

The ink sets described in Examples 1 to 8 and Comparative Examples 1 to 6 were each mounted on the experimental thermal ink-jet printer, and solid images were printed on Xerox 4024 paper (manufactured by Xerox Co., Ltd.) in single colors, i.e., cyan, magenta and yellow, and in a secondary color, i.e., RGB color. The Gamut was measured as an indicator of color reproduction by means of a* and b* of a primary color (CMY) and a secondary color (RBG). The chroma of the colors was visually inspected. The results are given in Table 1. The criteria employed for the evaluation are given below.

(a) color reproduction
◯: color reproduction range is broad (Gamut≧7,000)
Δ: color reproduction range is somewhat narrow (6,000≦Gamut <7,000)
X: color reproduction range is narrow (Gamut<6,000)

(b) hue
◯: colored solid image is almost free of dullness
Δ: colored solid image is somewhat dull
X: colored solid image is very dull

TABLE 1

Evaluation results

| | 1) Image quality | | | | | | |
|---|---|---|---|---|---|---|---|
| | a) Gamut | | b) Chroma | | | | |
| | Values obtained | Rating | Single color | | | Secondary color | | |
| | | | C | M | Y | R | G | B |
| Example 1 | 7550 | ◯ | ◯ | ◯ | ◯ | ◯ | ◯ | ◯ |
| Example 2 | 7050 | ◯ | ◯ | ◯ | ◯ | ◯ | ◯ | ◯ |
| Example 3 | 7100 | ◯ | ◯ | ◯ | ◯ | ◯ | ◯ | ◯ |
| Example 4 | 7400 | ◯ | ◯ | ◯ | ◯ | ◯ | ◯ | ◯ |
| Example 5 | 7600 | ◯ | ◯ | ◯ | ◯ | ◯ | ◯ | ◯ |
| Example 6 | 7500 | ◯ | ◯ | ◯ | ◯ | ◯ | ◯ | ◯ |
| Example 7 | 7500 | ◯ | ◯ | ◯ | ◯ | ◯ | ◯ | ◯ |
| Example 8 | 7550 | ◯ | ◯ | ◯ | ◯ | ◯ | ◯ | ◯ |
| Comparative example 1 | 6350 | Δ | Δ | ◯ | ◯ | ◯ | X | X |
| Comparative example 2 | 7050 | ◯ | ◯ | ◯ | ◯ | ◯ | ◯ | ◯ |
| Comparative example 3 | 6550 | Δ | ◯ | Δ | ◯ | X | ◯ | X |
| Comparative example 4 | 7250 | ◯ | ◯ | ◯ | ◯ | ◯ | ◯ | ◯ |
| Comparative example 5 | 6500 | Δ | ◯ | ◯ | Δ | X | X | ◯ |
| Comparative example 6 | 5750 | X | Δ | Δ | Δ | X | X | X |

※ C: Cyan. M: Magenta. Y: Yellow. R: Red. G: Green. B: Blue (2) Water resistance The ink sets described in Examples 1 to 8 and Comparative Examples 1 to 6 were each mounted on the experimental thermal ink-jet printer, and solid images were printed on FX-L paper (manufactured by Fuji Xerox Co., Ltd.) and Xerox 4024 paper (manufactured by Xerox Co., Ltd.), and the density of the images was measured by means of a Macbeth densitometer. Upon completion of the printing, the images were dried at room temperature for 24 hours and were then immersed in water for 3 minutes. After being taken out of water, the images were dried. The density of the images were again measured to obtain the density retention (i.e., the ratio of the density after immersion in water to the density before immersion in water), which was used as an indicator of water resistance. The results are given in Table2. The criteria employed for the evaluation are given below.

○: density retention is 80% or more

Δ: density retention is in the range of from 50 to 80%

X: density retention is less than 50%

(3) Resistance to clogging

The ink sets described in Examples 1 to 8 and Comparative Examples 1 to 6 were each mounted on the experimental thermal ink-jet printer, and the printer was left open in an unused state for a predetermined period of time at 10° C. and 15% RH and at 30° C. and 85% RH. After the printer was left in these conditions, an ejection test was conducted. The results are given in Table 2. The criteria employed for the evaluation are given below.

○: all colors of ink could be ejected after being left for 300 seconds

Δ: all colors of ink could be ejected after being left for 180 seconds

X: all colors of ink could not be ejected after being left for 180 seconds (4) Recovery of ejection after being left unused for a long period of time The ink sets described in Examples 1 to 8 and Comparative Examples 1 to 6 were each mounted on the experimental thermal ink-jet printer, and the printer was left unused for two months at 10° C. and 15% RH and at 30° C. and 85% RH. Then, a number of recovery operations by use of a suction pump were made in order to resume the ejection to produce normal print. By counting the number of the recovery operations made before the normal print was obtained, the capability to resume ejection after being left unused for a long period of time was evaluated. The results are given in Table 2. The criteria employed for the evaluation are given below.

○: all colors of ink produced normal print after 3 or less recovery operations

Δ: all colors of ink produced normal print after 4 to 8 recovery operations

X: all colors of ink could not produce normal print even after 8 recovery operations

TABLE 2

Evaluation results

| | 2) Water resistance | | | | 3) Resistance to clogging | 4) Recovery of ejection after being left unused for a long period of time |
|---|---|---|---|---|---|---|
| | Cyan | Magenta | Yellow | Black | | |
| Example 1 | ○ | ○ | ○ | ○ | ○ | ○ |
| Example 2 | ○ | ○ | ○ | ○ | ○ | ○ |
| Example 3 | ○ | ○ | ○ | ○ | ○ | ○ |
| Example 4 | ○ | ○ | ○ | ○ | ○ | ○ |
| Example 5 | ○ | ○ | ○ | ○ | ○ | ○ |
| Example 6 | ○ | ○ | ○ | ○ | ○ | ○ |
| Example 7 | ○ | ○ | ○ | ○ | ○ | ○ |
| Example 8 | ○ | ○ | ○ | — | ○ | ○ |
| Comparative example 1 | ○ | ○ | ○ | ○ | Δ | Δ |
| Comparative example 2 | X | ○ | ○ | ○ | ○ | ○ |
| Comparative example 3 | ○ | ○ | ○ | ○ | Δ | Δ |
| Comparative example 4 | ○ | X | ○ | ○ | ○ | ○ |
| Comparative example 5 | ○ | ○ | ○ | ○ | Δ | Δ |
| Comparative example 6 | ○ | ○ | ○ | ○ | X | X |

[single-colored ink]

(cyan ink)

Example 9

| | parts by weight |
|---|---|
| Ammonium salt of a dye in the form of the compound (I-2) | 3.0 |
| C.I. Acid Blue 9 | 0.6 |
| Ethylene glycol | 20.0 |
| Diethylene glycol monoethyl ether | 3.0 |
| N,N-bis(2-hydroxyethyl)glycine (pka = 8.35) | 1.5 |
| Sodium hydroxide | 0.25 |
| Urea | 5.0 |
| Nonionic surfactant (polyoxyethylene lauryl ether having 15 mol of EO added) (manufactured by Nippon Oil & Fats Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 9.5.

Example 10

| | parts by weight |
|---|---|
| Ammonium salt of a dye in the form of the compound (I-10) | 3.2 |
| C.I. Acid Blue 9 | 0.28 |
| Thiodiglycol | 20.0 |
| Diethylene glycol monoethyl ether | 4.0 |
| N,N-bis(2-hydroxyethyl)glycine (pka = 8.35) | 1.0 |
| Lithium hydroxide | 0.2 |
| Betaine (trimethylglycine) | 3.0 |
| Anionic surfactant (Surfynol 465) (manufactured by Nisshin Chemicals Co., Ltd.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.4.

Example 11

| | parts by weight |
|---|---|
| Ammonium salt of a dye in the form of the compound (II-5) | 3.3 |
| Direct Blue 86 | 0.825 |
| Glycerin | 5.0 |
| Thiodiglycol | 10.0 |
| N-(2-acetamide)iminodiacetic acid (pka = 6.60) | 4.5 |
| Sodium hydroxide | 1.2 |
| Urea | 6.0 |
| Anionic surfactant (Surfynol 465) (manufactured by Nisshin Chemicals Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 9.2.

Example 12

| | parts by weight |
|---|---|
| Ammonium salt of a dye in the form of the compound (I-1) | 2.9 |
| Acid Blue 9 | 0.58 |
| Glycerin | 12.0 |
| Propylene glycol | 5.0 |
| Diethylene glycol monoethyl ether | 4.5 |
| Bis(2-hydroxyethyl)iminotris(hydroxymethyl)methane (pka = 6.46) | 3.0 |
| Lithium hydroxide | 0.7 |
| Nonionic surfactant: Pluronic PE4300 (manufactured by BASF AG.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 8.9.

Example 13

| | parts by weight |
|---|---|
| Ammonium salt of a dye in the form of the compound (I-9) | 3.3 |
| Acid Blue 9 | 0.396 |
| Propylene glycol | 3.0 |
| Dithioglycol | 15.0 |
| N.N-bis(2-hydroxyethyl)-2-aminoethanesulfonic acid (pka = 7.15) | 1.5 |
| Lithium hydroxide | 0.45 |
| Nonionic surfactant: Pluronic PE4300 (manufactured by BASF AG.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.2.

Example 14

| | parts by weight |
|---|---|
| Ammonium salt of a dye in the form of the compound (II-7) | 3.6 |
| Direct Blue 199 | 0.9 |
| Ethylene glycol | 18.0 |
| Diethylene glycol monobutyl ether | 3.0 |
| N,N-bis(2-hydroxyethyl)glycine (pka = 8.35) | 2.0 |
| Sodium hydroxide | 0.4 |
| Anionic surfactant (Surfynol 465) (manufactured by Nisshin Chemicals Co., Ltd. | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 9.7.

Example 15

| | parts by weight |
|---|---|
| Ammonium salt of a dye in the form of the compound (I-6) | 3.2 |
| Direct Blue 199 | 0.4 |
| Diethylene glycol | 20.0 |
| Diethylene glycol monoethyl ether | 3.0 |
| N.N-bis(2-hydroxyethyl)-2-aminoethanesulfonic acid (pka = 7.15) | 1.0 |
| Lithium hydroxide | 0.3 |
| Betaine (trimethylglycine) | 4.0 |
| Nonionic surfactant (polyoxyethylene nonylphenyl ether having 30 mol of EO added) (manufactured by Nippon Oil & Fats Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 9.0.

Example 16

| | parts by weight |
|---|---|
| Ammonium salt of a dye in the form of the compound (II-4) | 3.2 |
| Direct Blue 86 | 0.42 |
| Propylene glycol | 15.0 |
| N-(2-acetamide)iminodiacetic acid (pka = 6.60) | 4.5 |
| Sodium hydroxide | 1.8 |
| Nonionic surfactant: Pluronic PE4300 (manufactured by BASF AG.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.6.

Example 17

| | parts by weight |
|---|---|
| Ammonium salt of a dye in the form of the compound (II-1) | 3.4 |
| Direct Blue 86 | 0.74 |
| Propylene glycol | 17.0 |
| Diethylene glycol monobutyl ether | 4.0 |
| N,N-bis(2-hydroxyethyl)glycine (pka = 8.35) | 2.0 |
| Lithium hydroxide | 0.25 |
| Betaine (trimethylglycine) | 4.0 |
| Anionic surfactant (Surfynol 465) (manufactured by Nisshin Chemicals Co., Ltd.) | 0.25 |
| Ion-exchanged water | balance |

The above-identified ingredients were well mixed and dissolved, and the resulting solution was then press-filtered by means of a 0.45 μm filter to prepare ink. The ink prepared had a pH value of 9.4.

Example 18

| | parts by weight |
|---|---|
| Ammonium salt of a dye in the form of the compound (I-15) | 3.5 |
| Acid Blue 9 | 0.42 |
| Glycerin | 15.0 |
| Diethylene glycol monobutyl ether | 5.0 |
| N.N-bis(2-hydroxyethyl)-2-aminoethanesulfonic acid (pka = 7.15) | 3.0 |
| Sodium hydroxide | 0.5 |
| Urea | 5.0 |
| Nonionic surfactant (polyoxyethylene lauryl ether having 15 mol of EO added) (manufactured by Nippon Oil & Fats Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 9.2.

Example 19

| | parts by weight |
|---|---|
| Ammonium salt of a dye in the form of the compound (II-10) | 3.0 |
| Direct Blue 86 | 0.5 |
| Diethylene glycol | 18.0 |
| Diethylene glycol monoethyl ether | 6.0 |
| Bis(2-hydroxyethyl)iminotris(hydroxymethyl)methane (pka = 6.46) | 3.5 |
| Sodium hydroxide | 1.0 |
| Nonionic surfactant: Pluronic PE4300 (manufactured by BASF AG.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.2.

Example 20

| | parts by weight |
|---|---|
| Ammonium salt of a dye in the form of the compound (I-12) | 3.0 |
| Direct Blue 199 | 0.41 |
| Glycerin | 10.0 |
| Ethylene glycol | 8.0 |
| N.N-bis(2-hydroxyethyl)-2-aminoethanesulfonic acid (pka = 7.15) | 1.5 |
| Sodium hydroxide | 0.45 |
| Urea | 6.0 |
| Nonionic surfactant (polyoxyethylene lauryl ether having 15 mol of EO added) (manufactured by Nippon Oil & Fats Co., Ltd.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.4.

Example 21

| | parts by weight |
|---|---|
| Ammonium salt of a dye in the form of the compound (II-9) | 2.3 |
| Direct Blue 199 | 0.485 |
| Ethylene glycol | 5.0 |
| Propylene glycol | 12.0 |
| Diethylene glycol monobutyl ether | 5.0 |
| N.N-bis(2-hydroxyethyl)-2-aminoethanesulfonic acid (pka = 7.15) | 2.5 |
| Lithium hydroxide | 1.0 |
| Nonionic surfactant (polyoxyethylene lauryl ether having 15 mol of EO added) (manufactured by Nippon Oil & Fats Co., Ltd.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.6.

Example 22

|  | parts by weight |
|---|---|
| Ammonium salt of a dye in the form of the compound (II-5) | 3.2 |
| Direct Blue 86 | 0.384 |
| Diethylene glycol | 10.0 |
| Propylene glycol | 8.0 |
| Bis(2-hydroxyethyl)iminotris(hydroxymethyl)methane (pka = 6.46) | 3.5 |
| Sodium hydroxide | 1.0 |
| Nonionic surfactant (polyoxyethylene lauryl ether having 15 mol of EO added) (manufactured by Nippon Oil & Fats Co., Ltd.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.3.

Example 23

|  | parts by weight |
|---|---|
| Ammonium salt of a dye in the form of the compound (II-8) | 3.3 |
| Direct Blue 199 | 1.15 |
| Ethylene glycol | 10.0 |
| Thiodiglycol | 5.0 |
| Diethylene glycol monobutyl ether | 5.0 |
| N-(2-acetamide)iminodiacetic acid (pka = 6.60) | 3.0 |
| Lithium hydroxide | 1.0 |
| Anionic surfactant (Surfynol 465) (manufactured by Nisshin Chemicals Co., Ltd.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.2.

Example 24

|  | parts by weight |
|---|---|
| Ammonium salt of a dye in the form of the compound (I-5) | 1.5 |
| Ammonium salt of a dye in the form of the compound (II-3) | 1.5 |
| Acid Blue 9 | 0.5 |
| Diethylene glycol | 20.0 |
| Diethylene glycol monobutyl ether | 3.0 |
| N.N-bis(2-hydroxyethyl)-2-aminoethanesulfonic acid (pka = 7.15) | 1.0 |
| Lithium hydroxide | 1.0 |
| Betaine (trimethylglycine) | 4.0 |
| Nonionic surfactant (polyoxyethylene lauryl ether having 15 mol of EO added) (manufactured by Nippon Oil & Fats Co., Ltd.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.1.

Comparative Example 7

|  | parts by weight |
|---|---|
| Ammonium salt of a dye in the form of the compound (I-6) | 3.5 |
| Diethylene glycol | 20.0 |
| Diethylene glycol monoethyl ether | 3.0 |
| N.N-bis(2-hydroxyethyl)-2-aminoethanesulfonic acid (pka = 7.15) | 1.0 |
| Lithium hydroxide | 0.3 |
| Urea | 4.0 |
| Nonionic surfactant (polyoxyethylene nonylphenyl ether having 30 mol of EO added) (manufactured by Nippon Oil & Fats Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 9.4.

Comparative Example 8

|  | parts by weight |
|---|---|
| Acid blue 9 | 2.2 |
| Ethylene glycol | 20.0 |
| Diethylene glycol monoethyl ether | 3.0 |
| N,N-bis(2-hydroxyethyl)glycine (pka = 8.35) | 1.5 |
| Sodium hydroxide | 0.25 |
| Urea | 5.0 |
| Nonionic surfactant (polyoxyethylene lauryl ether having 15 mol of EO added) (manufactured by Nippon Oil & Fats Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 7.7.

Comparative Example 9

|  | parts by weight |
|---|---|
| Direct Blue 199 | 2.2 |
| Acid Blue 9 | 0.3 |
| Diethylene glycol | 18.0 |
| Diethylene glycol monoethyl ether | 6.0 |
| Bis(2-hydroxyethyl)iminotris(hydroxymethyl)methane (pka = 6.46) | 3.5 |
| Sodium hydroxide | 1.0 |
| Nonionic surfactant: Pluronic PE4300 (manufactured by BASF AG.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 8.8.

Comparative Example 10

| | parts by weight |
|---|---|
| Ammonium salt of a dye in the form of the compound (II-1) | 3.3 |
| Ethylene glycol | 20.0 |
| Diethylene glycol monoethyl ether | 3.0 |
| Sodium hydroxide | 0.25 |
| Betaine | 5.0 |
| Nonionic surfactant (polyoxyethylene lauryl ether having 15 mol of EO added) (manufactured by Nippon Oil & Fats Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 11.5

Comparative Example 11

| | parts by weight |
|---|---|
| Ammonium salt of a dye in the form of the compound (I-2) | 3.5 |
| Ethylene glycol | 18.0 |
| Diethylene glycol monobutyl ether | 3.0 |
| N,N-bis(2-hydroxyethyl)glycine (pka = 8.35) | 2.0 |
| Anionic surfactant (Surfynol 465) (manufactured by Nisshin Chemicals Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 8.4.

Comparative Example 12

| | parts by weight |
|---|---|
| Direct Blue 86 | 3.0 |
| Ethylene glycol | 20.0 |
| Diethylene glycol monoethyl ether | 3.0 |
| Sodium hydroxide | 0.25 |
| Urea | 5.0 |
| Nonionic surfactant (polyoxyethylene lauryl ether having 15 mol of EO added) (manufactured by Nippon Oil & Fats Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 9.2.

Comparative Example 13

| | parts by weight |
|---|---|
| Direct Blue 199 | 3.0 |
| Diethylene glycol | 10.0 |
| Propylene glycol | 8.0 |
| Bis(2-hydroxyethyl)iminotris(hydroxymethyl)methane (pka = 6.46) | 3.5 |
| Nonionic surfactant (polyoxyethylene lauryl ether having 15 mol of EO added) (manufactured by Nippon Oil & Fats Co., Ltd.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 8.4.

Comparative Example 14

| | parts by weight |
|---|---|
| Acid Blue 9 | 2.0 |
| Direct Blue 86 | 0.5 |
| Diethylene glycol | 18.0 |
| Diethylene glycol monoethyl ether | 6.0 |
| Sodium hydroxide | 1.0 |
| Nonionic surfactant Pluronic PE4300 (manufactured by BASF AG.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 8.6.

Comparative Example 15

| | parts by weight |
|---|---|
| Direct Blue 199 | 3.0 |
| Acid Blue 9 | 0.45 |
| Diethylene glycol | 18.0 |
| Diethylene glycol monoethyl ether | 6.0 |
| Bis(2-hydroxyethyl)iminotris(hydroxymethyl)methane (pka = 6.46) | 3.5 |
| Nonionic surfactant: Pluronic PE4300 (manufactured by BASF AG.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 7.8.

Comparative Example 16

| | parts by weight |
|---|---|
| Direct Blue 199 | 1.3 |
| Acid Blue 9 | 1.2 |
| Diethylene glycol | 18.0 |
| Diethylene glycol monoethyl ether | 6.0 |
| Bis(2-hydroxyethyl)iminotris(hydroxymethyl)methane (pka = 6.46) | 3.5 |
| Sodium hydroxide | 1.0 |

-continued

| | parts by weight |
|---|---|
| Nonionic surfactant: Pluronic PE4300 (manufactured by BASF AG.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 8.8.

Comparative Example 17

| | parts by weight |
|---|---|
| Ammonium salt of a dye in the form of the compound (I-10) | 3.5 |
| Reacted Blue 72 | 0.5 |
| Ethylene glycol | 18.0 |
| Diethylene glycol monobutyl ether | 3.0 |
| N,N-bis(2-hydroxyethyl)glycine (pka = 8.35) | 2.0 |
| Sodium hydroxide | 0.20 |
| Nonionic surfactant (polyoxyethylene lauryl ether having 15 mol of EO added) (manufactured by Nippon Oil & Fats Co., Ltd.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.4.
(magenta-color ink)

Example 25

| | parts by weight |
|---|---|
| Ammonium salt of a dye in the form of the compound (IV-2) | 2.0 |
| Acid Red 23 | 0.4 |
| Ethylene glycol | 20.0 |
| Diethylene glycol monoethyl ether | 3.0 |
| N,N-bis(2-hydroxyethyl)glycine (pka = 8.35) | 1.5 |
| Sodium hydroxide | 0.25 |
| Urea | 5.0 |
| Nonionic surfactant (polyoxyethylene lauryl ether having 15 mol of EO added) (manufactured by Nippon Oil & Fats Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 9.4.

Example 26

| | parts by weight |
|---|---|
| Ammonium salt of a dye in the form of the compound (IV-6) | 2.4 |
| Sodium salt of a dye in the form of the compound (V-3) | 0.3 |
| Diethylene glycol | 20.0 |
| Diethylene glycol monoethyl ether | 3.0 |
| N,N-bis(2-hydroxyethyl)-2-aminoethanesulfonic acid (pka = 7.15) | 1.0 |

-continued

| | parts by weight |
|---|---|
| Lithium hydroxide | 0.3 |
| Betaine (trimethylglycine) | 4 |
| Nonionic surfactant (polyoxyethylene nonylphenyl ether having 30 mol of EO added) (manufactured by Nippon Oil & Fats Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 8.9.

Example 27

| | parts by weight |
|---|---|
| Ammonium salt of a dye in the form of the compound (IV-5) | 2.0 |
| Sodium salt of a dye in the form of the compound (V-3) | 0.5 |
| Glycerin | 5.0 |
| Thiodiglycol | 10.0 |
| N-(2-acetamide)iminodiacetic acid (pka = 6.60) | 4.5 |
| Sodium hydroxide | 1.2 |
| Urea | 6.0 |
| Anionic surfactant: (Surfynol 465) (manufactured by Nisshin Chemicals Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 8.8.

Example 28

| | parts by weight |
|---|---|
| Ammonium salt of a dye in the form of the compound (IV-1) | 2.5 |
| Sodium salt of a dye in the form of the compound (V-4) | 0.5 |
| Glycerin | 12.0 |
| Propylene glycol | 5.0 |
| Diethylene glycol monoethyl ether | 4.5 |
| Bis(2-hydroxyethyl)iminotris(hydroxymethyl)methane (pka = 6.46) | 2.5 |
| Lithium hydroxide | 0.7 |
| Nonionic surfactant: Prulonic PE4300 (manufactured by BASF AG.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.2.

Example 29

| | parts by weight |
|---|---|
| Ammonium salt of a dye in the form of the compound (IV-7) | 2.0 |
| Sodium salt of a dye in the form of the compound (V-1) | 0.5 |
| Ethylene glycol | 18.0 |
| Diethylene glycol monobutyl ether | 3.0 |

-continued

| | parts by weight |
|---|---|
| N,N-bis(2-hydroxyethyl)glycine (pka = 8.35) | 2.0 |
| Sodium hydroxide | 0.2 |
| Anionic surfactant (Surfynol 465) (manufactured by Nisshin Chemicals Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 9.4.

Example 30

| | parts by weight |
|---|---|
| Ammonium salt of a dye in the form of the compound (IV-8) | 2.3 |
| Sodium salt of a dye in the form of the compound (V-5) | 0.5 |
| Propylene glycol | 17.0 |
| Diethylene glycol monobutyl ether | 4.0 |
| N,N-bis(2-hydroxyethyl)glycine (pka = 8.35) | 1.5 |
| Lithium hydroxide | 0.25 |
| Betaine (trimethylglycine) | 4.0 |
| Anionic surfactant (Surfynol 465) (manufactured by Nisshin Chemicals Co., Ltd.) | 0.25 |
| Ion-exchanged water | balance |

The above-identified ingredients were well mixed and dissolved, and the resulting solution was then press-filtered by means of a 0.45 μm filter to prepare ink. The ink prepared had a pH value of 9.2.

Example 31

| | parts by weight |
|---|---|
| Ammonium salt of a dye in the form of the compound (IV-1) | 2.5 |
| Sodium salt of a dye in the form of the compound (V-1) | 0.3 |
| Glycerin | 15.0 |
| Diethylene glycol monobutyl ether | 5 |
| N.N-bis(2-hydroxyethyl)-2-aminoethanesulfonic acid (pka = 7.15) | 2.5 |
| Sodium hydroxide | 0.5 |
| Urea | 5.0 |
| Nonionic surtactant (polyoxyethylene lauryl ether having 15 mol of EO added) (manufactured by Nippon Oil & Fats Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 9.2.

Example 32

| | parts by weight |
|---|---|
| Ammonium salt of a dye in the form of the compound (IV-6) | 2.2 |
| Sodium salt of a dye in the form of the compound (V-5) | 0.3 |
| Glycerin | 10.0 |
| Ethylene glycol | 8 |
| N.N-bis(2-hydroxyethyl)-2-aminoethanesulfonic acid (pka = 7.15) | 1.5 |
| Sodium hydroxide | 0.45 |
| Urea | 6.0 |
| Nonionic surfactant (polyoxyethylene lauryl ether having 15 mol of EO added) (manufactured by Nippon Oil & Fats Co., Ltd.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.3.

Example 33

| | parts by weight |
|---|---|
| Ammonium salt of a dye in the form of the compound (IV-4) | 2.3 |
| Sodium salt of a dye in the form of the compound (V-2) | 0.3 |
| Propylene glycol | 15.0 |
| N-(2-acetamide)iminodiacetic acid (pka = 6.60) | 4.5 |
| Sodium hydroxide | 1.8 |
| Nonionic surfactant: Pluronic PE4300 (manufactured by BASF AG.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.5.

Example 34

| | parts by weight |
|---|---|
| Ammonium salt of a dye in the form of the compound (IV-9) | 2.5 |
| Sodium salt of a dye in the form of the compound (V-1) | 0.3 |
| Propylene glycol | 3.0 |
| Thioglycol | 15.0 |
| N.N-bis(2-hydroxyethyl)-2-aminoethanesulfonic acid (pka = 7.15) | 1.5 |
| Sodium hydroxide | 0.45 |
| Nonionic surfactant: Pluronic PE4300 (manufactured by BASF AG.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.2.

Example 35

| | parts by weight |
|---|---|
| Ammonium salt of a dye in the form of the compound (IV-9) | 2.3 |
| Sodium salt of a dye in the form of the compound (V-4) | 0.4 |
| Ethylene glycol | 5.0 |
| Propylene glycol | 12.0 |
| Diethylene glycol monobutyl ether | 5.0 |

|  | parts by weight |
|---|---|
| N,N-bis(2-hydroxyethyl)-2-aminoethanesulfonic acid (pka = 7.15) | 2.5 |
| Lithium hydroxide | 1.0 |
| Nonionic surfactant (polyoxyethylene lauryl ether having 15 mol of EO added) (manufactured by Nippon Oil & Fats Co., Ltd.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.8.

Example 36

|  | parts by weight |
|---|---|
| Ammonium salt of a dye in the form of the compound (IV-3) | 2.5 |
| Direct Red 227 | 0.3 |
| Diethylene glycol | 10.0 |
| Propylene glycol | 8.0 |
| Bis(2-hydroxyethyl)iminotris(hydroxymethyl)methane (pka = 6.46) | 3.5 |
| Sodium hydroxide | 1.0 |
| Nonionic surfactant (polyoxyethylene lauryl ether having 15 mol of EO added) (manufactured by Nippon Oil & Fats Co., Ltd.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.3.

Example 37

|  | parts by weight |
|---|---|
| Ammonium salt of a dye in the form of the compound (IV-10) | 2.3 |
| Sodium salt of a dye in the form of the compound (V-2) | 0.2 |
| Thiodiglycol | 20.0 |
| Diethylene glycol monoethyl ether | 4.0 |
| N,N-bis(2-hydroxyethyl)glycine (pka = 8.35) | 1.0 |
| Lithium hydroxide | 0.2 |
| Betaine (trimethylglycine) | 3.0 |
| Anionic surfactant (Surfynol 465) (manufactured by Nisshin Chemicals Co., Ltd.) | 0.2 |
| Ion-exchanged water | balance |

Above-identified ingredients were well mixed and dissolved, and the resulting solution was then press-filtered by means of a 0.45 μm filter to prepare ink. The ink prepared had a pH value of 9.3.

Example 38

|  | parts by weight |
|---|---|
| Ammonium salt of a dye in the form of the compound (IV-3) | 2.0 |
| Direct Red 227 | 0.7 |
| Ethylene glycol | 10.0 |

|  | parts by weight |
|---|---|
| Thiodiglycol | 5.0 |
| Diethylene glycol monobutyl ether | 5.0 |
| N-(2-acetamide)iminodiacetic acid (pka = 6.60) | 1.0 |
| Lithium hydroxide | 1.0 |
| Anionic surfactant (Surfynol 465) (manufactured by Nisshin Chemicals Co., Ltd.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.4.

Example 39

|  | parts by weight |
|---|---|
| Ammonium salt of a dye in the form of the compound (IV-8) | 2.4 |
| Acid Red 23 | 0.4 |
| Diethylene glycol | 18.0 |
| Diethylene glycol monoethyl ether | 6.0 |
| Bis(2-hydroxyethyl)iminotris(hydroxymethyl)methane (pka = 6.46) | 3.5 |
| Sodium hydroxide | 1.0 |
| Nonionic surfactant: Prulonic PE4300 (manufactured by BASF AG.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.1.

Example 40

|  | parts by weight |
|---|---|
| Ammonium salt of a dye in the form of the compound (IV-6) | 2.2 |
| Acid Red 249 | 0.3 |
| Diethylene glycol | 15.0 |
| Diethylene glycol monoethyl ether | 5.0 |
| Bis(2-hydroxyethyl)iminotris(hydroxymethyl)methane (pka = 6.46) | 2.5 |
| Sodium hydroxide | 0.5 |
| Nonionic surfactant: Pluronic PE4300 (manufactured by BASF AG.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.1.

Comparative Example 18

|  | parts by weight |
|---|---|
| Ammonium salt of a dye in the form of the compound (IV-6) | 2.5 |
| Diethylene glcyol | 20.0 |
| Diethylene glycol monoethyl ether | 3.0 |
| N,N-bis(2-hydroxyethyl)-2-aminoethanesulfonic acid (pka = | 1.0 |

7.15)

| | parts by weight |
|---|---|
| Lithium hydroxide | 0.3 |
| Urea | 4.0 |
| Nonionic surfactant (polyoxyethylene nonylphenyl ether having 30 mol of EO added) (manufactured by Nippon Oil & Fats Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 9.4.

Comparative Example 19

| | parts by weight |
|---|---|
| Acid Red 23 | 2.3 |
| Ethylene glycol | 20.0 |
| Diethylene glycol monoethyl ether | 3.0 |
| N,N-bis(2-hydroxyethyl)glycine (pka = 8.35) | 1.5 |
| Sodium hydroxide | 0.25 |
| Urea | 5.0 |
| Nonionic surfactant (polyoxyethylene nonylphenyl ether having 30 mol of EO added) (manufactured by Nippon Oil & Fats Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 8.5.

Comparative Example 20

| | parts by weight |
|---|---|
| Direct Red 227 | 2.2 |
| Acid Red 23 | 0.3 |
| Diethylene glycol | 18.0 |
| Diethylene glycol monoethyl ether | 6.0 |
| Bis(2-hydroxyethyl)iminotris(hydroxymethyl)methane (pka = 6.46) | 3.5 |
| Sodium hydroxide | 1.0 |
| Nonionic surfactant: Pluronic PE4300 (manufactured by BASF AG.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.0.

Comparative Example 21

| | parts by weight |
|---|---|
| Ammonium salt of a dye in the form of the compound (IV-2) | 2.5 |
| Ethylene glycol | 20.0 |
| Diethylene glycol monoethyl ether | 3.0 |
| Sodium hydroxide | 0.25 |
| Betaine (trimethylglycine) | 5.0 |
| Nonionic surfactant (polyoxyethylene nonylphenyl ether having 30 mol of EO added) (manufactured by Nippon Oil & Fats Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 10.9.

Comparative Example 22

| | parts by weight |
|---|---|
| Ammonium salt of a dye in the form of the compound (IV-7) | 3.0 |
| Ethylene glycol | 18.0 |
| Diethylene glycol monobutyl ether | 3.0 |
| N,N-bis(2-hydroxyethyl)glycine (pka = 8.35) | 2.0 |
| Anionic surfactant (Surfynol 465) (manufactured by Nisshin Chemicals Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 8.3.

Comparative Example 23

| | parts by weight |
|---|---|
| Acid Red 23 | 2.0 |
| Ethylene glycol | 20.0 |
| Diethylene glycol monoethyl ether | 3.0 |
| Sodium hydroxide | 0.25 |
| Urea | 5.0 |
| Nonionic surfactant (polyoxyethylene nonylphenyl ether having 30 mol of EO added) (manufactured by Nippon Oil & Fats Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 8.9.

Comparative Example 24

| | parts by weight |
|---|---|
| Direct Red 227 | 2.5 |
| Diethylene glycol | 10.0 |
| Propylene glycol | 8.0 |
| Bis(2-hydroxyethyl)iminotris(hydroxymethyl)methane (pka = 6.46) | 3.5 |
| Nonionic surfactant (polyoxyethylene nonylphenyl ether having 30 mol of EO added) (manufactured by Nippon Oil & Fats Co., Ltd.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 8.4.

Comparative Example 25

|  | parts by weight |
|---|---|
| Direct Red 227 | 2.3 |
| Acid Red 23 | 0.5 |
| Diethylene glycol | 18.0 |
| Diethylene glycol monoethyl ether | 6.0 |
| Sodium hydroxide | 1.0 |
| Nonionic surfactant: Pluronic PE4300 (manufactured by BASF AG.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.9.

Comparative Example 26

|  | parts by weight |
|---|---|
| Direct Red 227 | 2.0 |
| Acid Red 23 | 0.5 |
| Diethylene glycol | 18.0 |
| Diethylene glycol monoethyl ether | 6.0 |
| Bis(2-hydroxyethyl)iminotris(hydroxymethyl)methane (pka = 6.46) | 3.5 |
| Nonionic surfactant: Pluronic PE4300 (manufactured by BASF AG.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 8.5.

Comparative Example 27

|  | parts by weight |
|---|---|
| Direct Red 227 | 1.3 |
| Acid Red 23 | 1.2 |
| Diethylene glycol | 18.0 |
| Diethylene glycol monoethyl ether | 6.0 |
| Bis(2-hydroxyethyl)iminotris(hydroxymethyl)methane (pka = 6.46) | 3.5 |
| Sodium hydroxide | 1.0 |
| Nonionic surfactant: Pluronic PE4300 (manufactured by BASF AG.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.0.

Comparative Example 28

|  | parts by weight |
|---|---|
| Ammonium salt of a dye in the form of the compound (IV-7) | 2.0 |
| Reacted Red 180 | 0.5 |
| Ethylene glycol | 18.0 |
| Diethylene glycol monobutyl ether | 3.0 |
| N,N-bis(2-hydroxyethyl)glycine (pka = 8.35) | 2.0 |
| Sodium Hydroxide | 0.2 |
| Nonionic surfactant (polyoxyethylene nonylphenyl ether having 30 mol of EO added) (manufactured by Nippon Oil & Fats Co., Ltd.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.4.

(black-color ink)

Example 41

|  | parts by weight |
|---|---|
| Ammonium salt of a dye in the form of the compound (VIII-1) | 2.0 |
| Sodium salt of a dye in the form of the compound (IX-9) | 0.2 |
| Potassium salt of a dye in the form of the compound (IX-11) | 0.4 |
| Glycerin | 10.0 |
| Isopropyl alcohol | 3.0 |
| N.N-bis(2-hydroxyethyl)-2-aminoethanesulfonic acid (pka = 7.15) | 2.0 |
| Sodium hydroxide | 0.55 |
| Urea | 5.0 |
| Nonionic surfactant (polyoxyethylene lauryl ether having 15 mol of EO added) (manufactured by Nippon Oil & Fats Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 9.0.

Example 42

|  | parts by weight |
|---|---|
| Ammonium salt of a dye in the form of the compound (VIII-2) | 2.1 |
| Sodium salt of a dye in the form of the compound (IX-9) | 0.9 |
| Glycerin | 7.0 |
| Thiodiglycol | 7.0 |
| N,N-bis(2-hydroxyethyl)glycine (pka = 8.35) | 2.0 |
| Lithium hydroxide | 0.45 |
| Betaine (trimethylglycine) | 6.0 |
| Anionic surfactant (Surfynol 465) (manufactured by Nisshin Chemicals Co., Ltd.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 8.9.

Example 43

| | parts by weight |
|---|---|
| Ammonium salt of a dye in the form of the compound (VIII-2) | 2.4 |
| Lithium salt of a dye in the form of the compound (IX-12) | 0.3 |
| Triethanolammonium salt of a dye in the form of the compound (IX-18) | 0.5 |
| Glycerin | 7.0 |
| Diethylene glycol | 5.0 |
| N-(2-acetamide)iminodiacetic acid (pka = 6.60) | 2.8 |
| Sodium hydroxide | 1.3 |
| Urea | 6.0 |
| Anionic surfactant (Surfynol 465) (manufactured by Nisshin Chemicals Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 9.3.

Example 44

| | parts by weight |
|---|---|
| Ammonium salt of a dye in the form of the compound (VIII-1) | 2.5 |
| Sodium salt of a dye in the form of the compound (IX-9) | 0.25 |
| Glycerin | 5.0 |
| Diethylene glycol | 10.0 |
| Diethylene glycol monobutyl ether | 4.0 |
| N,N-bis(2-hydroxyethyl)-2-aminoethanesulfonic acid (pka = 7.15) | 2.0 |
| Sodium hydroxide | 0.6 |
| Nonionic surfactant: Pluronic PE4300 (manufactured by BASF AG.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.2.

Example 45

| | parts by weight |
|---|---|
| Ammonium salt of a dye in the form of the compound (VIII-1) | 2.7 |
| Direct Yellow 144 | 0.23 |
| Glycerin | 7.0 |
| Ethylene glycol | 5.0 |
| Isopropanol | 3.0 |
| Bis(2-hydroxyethyl)iminotris(hydroxymethyl)methane (pka = 6.46) | 1.5 |
| Sodium hydroxide | 0.72 |
| Urea | 8.0 |
| Nonionic surfactant (polyoxyethylene nonylphenyl ether having 30 mol of EO added) (manufactured by Nippon Oil & Fats Co., Ltd.) | 0.08 |
| Ion-exchanged water | balance |

The above-identified ingredients were well mixed and dissolved, and the resulting solution was then press-filtered by means of a 0.45 μm filter to prepare ink. The ink prepared had a pH value of 9.6.

Example 46

| | parts by weight |
|---|---|
| Ammonium salt of a dye in the form of the compound (VIII-2) | 2.0 |
| Sodium salt of a dye in the form of the compound (IX-21) | 0.42 |
| Direct Yellow 144 | 0.25 |
| Diethylene glycol | 7.0 |
| Thiodiglycol | 8.0 |
| N,N-bis(2-hydroxyethyl)glycine (pka = 8.35) | 2.3 |
| Lithium hydroxide | 0.6 |
| Betaine (trimethylglycine) | 7.0 |
| Anioni surfactant (Surfynol 465) (manufactured by Nisshin Chemicals Co., Ltd.) | 0.1 |

The above-identified ingredients were well mixed and dissolved, and the resulting solution was then press-filtered by means of a 0.45 μm filter to prepare ink. The ink prepared had a pH value of 9.0.

Example 47

| | parts by weight |
|---|---|
| Ammonium salt of a dye in the form of the compound (VIII-1) | 2.3 |
| Sodium salt of a dye in the form of the compound (IX-9) | 0.27 |
| Sodium salt of a dye in the form of the compound (IX-21) | 0.5 |
| Glycerin | 12.0 |
| Isopropanol | 3.0 |
| N-(2-acetamide)iminodiacetic acid (pka = 6.60) | 2.1 |
| Sodium hydroxide | 0.8 |
| Urea | 6.0 |
| Nonionic surfactant (polyoxyethylene nonylphenyl ether having 30 mol of EO added) (manufactured by Nippon Oil & Fats Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 9.4.

Example 48

| | parts by weight |
|---|---|
| Ammonium salt of a dye in the form of the compound (VIII-2) | 2.4 |
| Potassium salt of a dye in the form of the compound (IX-11) | 0.8 |
| Glycerin | 7.0 |
| Diethylene glycol | 8.0 |
| Diethylene glycol monobutyl ether | 4.0 |
| N,N-bis(2-hydroxyethyl)-2-aminoethanesulfonic acid (pka = 7.15) | 2.0 |
| Sodium hydroxide | 0.73 |
| Nonionic surfactant: Pluronic PE4300 (manufactured by BASF AG.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.3.

Example 49

|  | parts by weight |
|---|---|
| Ammonium salt of a dye in the form of the compound (VIII-1) | 2.1 |
| Sodium salt of a dye in the form of the compound (IX-9) | 0.25 |
| Potassium salt of a dye in the form of the compound (IX-11) | 0.5 |
| Triethanolamine salt of a dye in the form of the compound (IX-18) | 0.15 |
| Glycerin | 8.0 |
| Propylene glycol | 5.0 |
| Bis(2-hydroxyethyl)iminotris(hydroxymethyl)methane (pka = 6.46) | 1.8 |
| Lithium hydroxide | 0.8 |
| Betaine (trimethylglycine) | 6.0 |
| Anionic surfactant (Surfynol 465) (manufactured by Nisshin Chemicals Co., Ltd.) | 0.25 |
| Ion-exchanged water | balance |

The above-identified ingredients were well mixed and dissolved, and the resulting solution was then press-filtered by means of a 0.45 μm filter to prepare ink. The ink prepared had a pH value of 9.3.

Example 50

|  | parts by weight |
|---|---|
| Ammonium salt of a dye in the form of the compound (VIII-2) | 2.2 |
| Triethanolammonium salt of a dye in the form of the compound (IX-18) | 0.7 |
| Glycerin | 7.0 |
| Ethylene glycol | 7.0 |
| Isopropanol | 3.0 |
| N-(2-acetamide)iminodiacetic acid (pka = 6.60) | 1.7 |
| Sodium hydroxide | 0.75 |
| Betaine (trimethylglycine) | 5.0 |
| Nonionic surfactant (polyoxyethylene lauryl ether having 15 mol of EO added) (manufactured by Nippon Oil & Fats Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 9.3.

Example 51

|  | parts by weight |
|---|---|
| Ammonium salt of a dye in the form of the compound (VIII-2) | 2.0 |
| Potassium salt of a dye in the form of the compound (IX-11) | 0.4 |
| Sodium salt of a dye in the form of the compound (IX-21) | 0.4 |
| Direct Yellow 144 | 0.2 |
| Glycerin | 5.0 |
| Diethylene glycol | 5.0 |
| Isopropanol | 3.0 |
| N,N-bis(2-hydroxyethyl)-2-aminoethanesulfonic acid (pka = 7.15) | 1.5 |
| Sodium hydroxide | 0.45 |
| Urea | 6.0 |
| Nonionic surfactant (polyoxyethylene nonylphenyl ether having 30 mol of EO added) (manufactured by Nippon Oil & Fats Co., Ltd.) | 0.15 |
| Ion-exchanged water | balance |

The above-identified ingredients were well mixed and dissolved, and the resulting solution was then press-filtered by means of a 0.45 μm filter to prepare ink. The ink prepared had a pH value of 9.1.

Example 52

|  | parts by weight |
|---|---|
| Ammonium salt of a dye in the form of the compound (VIII-1) | 2.3 |
| Lithium salt of a dye in the form of the compound (IX-12) | 0.7 |
| Glycerin | 5.0 |
| Propylene glycol | 5.0 |
| N,N-bis(2-hydroxyethyl)glycine (pka = 8.35) | 1.8 |
| Sodium hydroxide | 0.45 |
| Nonionic surfactant (polyoxyethylene lauryl ether having 15 mol of EO added) (manufactured by Nippon Oil & Fats Co., Ltd.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.3

Example 53

|  | parts by weight |
|---|---|
| Ammonium salt of a dye in the form of the compound (VIII-1) | 2.1 |
| Potassium salt of a dye in the form of the compound (IX-11) | 0.4 |
| Sodium salt of a dye in the form of the compound (IX-21) | 0.3 |
| Glycerin | 10.0 |
| Thiodiglycol | 5.0 |
| Isopropanol | 3.0 |
| N,N-bis(2-hydroxyethyl)-2-aminoethanesulfonic acid (pka = 7.15) | 2.0 |
| Sodium hydroxide | 0.6 |
| Nonionic surfactant (polyoxyethylene lauryl ether having 15 mol of EO added) (manufactured by Nippon Oil & Fats Co., Ltd.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.5.

Example 54

|  | parts by weight |
|---|---|
| Ammonium salt of a dye in the form of the compound (VIII-2) | 2.2 |
| Potassium salt of a dye in the form of the compound (IX-11) | 0.1 |
| Lithium salt of a dye in the form of the compound (IX-12) | 0.25 |
| Triethanolamonium salt of a dye in the form of the compound (IX-18) | 0.3 |
| Direct Yellow 144 | 0.15 |
| Glycerin | 10.0 |
| Propylene glycol | 3.0 |
| Isopropanol | 3.0 |
| Bis(2-hydroxyethyl)iminotris(hydroxymethyl)methane (pka = 6.46) | 2.3 |
| Lithium hydroxide | 1.8 |
| Betaine (trimethylglycine) | 4.0 |
| Nonionic surfactant (polyoxyethylene lauryl ether having 15 mol of EO added) (manufactured by Nippon Oil & Fats Co., Ltd.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 9.9.

Example 55

| | parts by weight |
|---|---|
| Ammonium salt of a dye in the form of the compound (VIII-1) | 2.0 |
| Sodium salt of a dye in the form of the compound (IX-21) | 0.9 |
| Glycerin | 10.0 |
| Ethylene glycol | 5.0 |
| N,N-bis(2-hydroxyethyl)glycine (pka = 8.35) | 1.4 |
| Sodium hydroxide | 0.35 |
| Urea | 5.0 |
| Anionic surfactant (Surfynol 465) (manufactured by Nisshin Chemicals Co., Ltd.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 8.8.

Comparative Example 29

| | parts by weight |
|---|---|
| Ammonium salt of a dye in the form of the compound (VIII-1) | 2.6 |
| Glycerin | 10.0 |
| Isopropylalcohol | 3.0 |
| N,N-bis(2-hydroxyethyl)-2-aminoethanesulfonic acid (pka = 7.15) | 2.0 |
| Sodium hydroxide | 0.55 |
| Urea | 5.0 |
| Nonionic surfactant (polyoxyethylene lauryl ether having 15 mol of EO added) (manufactured by Nisshin Chemicals Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 9.4.

Comparative Example 30

| | parts by weight |
|---|---|
| Ammonium salt of a dye in the form of the compound (VIII-2) | 1.5 |
| Sodium salt of a dye in the form of the compound (IX-9) | 1.5 |
| Glycerin | 7.0 |
| Thiodiglycol | 7.0 |
| N,N-bis(2-hydroxyethyl)glycine (pka = 8.35) | 2.0 |
| Lithium hydroxide | 0.45 |
| Betaine (trimethylglycine) | 6.0 |
| Anionic surfactant (Surfynol 465) (manufactured by Nisshin Chemicals Co., Ltd.) | 0.2 |
| Ion-exchanged water | balance |

The above-identified ingredients were well mixed and dissolved, and the resulting solution was then press-filtered by means of a 0.45 μm filter to prepare ink. The ink prepared had a pH value of 8.7.

Comparative Example 31

| | parts by weight |
|---|---|
| Ammonium salt of a dye in the form of the compound (VIII-2) | 1.6 |
| Lithium salt of a dye in the form of the compound (IX-12) | 0.6 |
| Triethanolamonium salt of a dye in the form of the compound (IX-18) | 1.0 |
| Glycerin | 7.0 |
| Diethylene glycol | 5.0 |
| N-(2-acetamide)iminodiacetic acid (pka = 6.60) | 2.8 |
| Sodium hydroxide | 1.3 |
| Urea | 6.0 |
| Anionic surfactant (Surfynol 465) (manufactured by Nisshin Chemicals Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 9.0.

Comparative Example 32

| | parts by weight |
|---|---|
| Ammonium salt of a dye in the form of the compound (VIII-1) | 2.7 |
| Acid Yellow 65 | 0.23 |
| Glycerin | 7.0 |
| Ethylene glycol | 5.0 |
| Isopropanol | 3.0 |
| Bis(2-hydroxyethyl)iminotris(hydroxymethyl)methane (pka = 6.46) | 1.5 |
| Sodium Hydroxide | 0.72 |
| Urea | 8.0 |
| Nonionic surfactant (polyoxyethylene nonylphenyl ether having 30 mol of EO added) (manufactured by Nisshin Chemicals Co., Ltd.) | 0.08 |
| Ion-exchanged water | balance |

The above-identified ingredients were well mixed and dissolved, and the resulting solution was then press-filtered by means of a 0.45 μm filter to prepare ink. The ink prepared had a pH value of 9.0.

Comparative Example 33

| | parts by weight |
|---|---|
| Ammonium salt of a dye in the form of the compound (VIII-1) | 0.7 |
| Sodium salt of a dye in the form of the compound (IX-9) | 1.8 |
| Sodium salt of a dye in the form of the compound (IX-21) | 0.57 |
| Glycerin | 12.0 |
| Isopropanol | 3.0 |
| N-(2-acetamide)iminodiacetic acid (pka = 6.60) | 1.2 |
| Sodium hydroxide | 0.22 |
| Urea | 6.0 |
| Nonionic surfactant (polyoxyethylene nonylphenyl ether having 30 mol EO added) (manufactured by Nisshin Chemicals Co., Ltd.) | 0.1 |
| Ion-exchanged water | balance |

The above-identified ingredients were well mixed and dissolved, and the resulting solution was then press-filtered by means of a 0.45 μm filter to prepare ink. The ink prepared had a pH value of 8.0.

Comparative Example 34

|  | parts by weight |
|---|---|
| Ammonium salt of a dye in the form of the compound (VIII-1) | 2.94 |
| Lithium salt of a dye in the form of the compound (IX-12) | 0.06 |
| Glycerin | 5.0 |
| Propylene glycol | 5.0 |
| Sodium hydroxide | 0.25 |
| Nonionic surfactant (polyoxyethylene lauryl ether having 15 mol of EO added) (manufactured by Nippon Oil & Fats Co., Ltd.) | 0.2 |
| Ion-exchanged water | balance |

The above-identified ingredients were well mixed and dissolved, and the resulting solution was then press-filtered by means of a filter having an opening of 0.45 μm to prepare ink. The ink prepared had a pH value of 10.5.

[Evaluation Methods]

The ink prepared in Examples 9 to 55 and Comparative Examples 7 to 34 was evaluated regarding the following items by the methods described below. The results are shown in Tables 3 to 11.

(1) pH: pH was measured at 20° C. and 50% RH by means of a pH meter manufactured by Horiba Seisakusho Co., Ltd.

(2) Electrical conductivity: Electrical conductivity was measured at 20° C. and 50% RH by means of a conductivity meter manufactured by Electrochemical Instruments Co., Ltd.

(3) Viscosity: Viscosity was measured at 20° C. and 50% RH by means of a viscometer manufactured by Rheomat Co., Ltd.

(4) Surface tension: Surface tension was measured at 20° C. and 50% RH by means of a surface tension meter manufactured by Kyowa Surface Chemistry Co., Ltd.

The thermal ink-jet printer used was the same as the one used for the evaluation of the ink sets. Further, the driving condition of the printing head was the same as the driving condition in the evaluation of the ink sets.

(5) Water resistance: Water resistance test was conducted in the same way as in the evaluation of the ink sets, and the water resistance was evaluated according to the same criteria.

(6) Hue

Using the experimental thermal ink-jet printer, solid images were printed on FX-L paper (manufactured by Fuji Xerox Co., Ltd.) and Xerox 4024 paper (manufactured by Xerox Co., Ltd.), and the hue of the images was visually evaluated. The results were recorded according to the following criteria.

For cyan ink and magenta-color ink:
  ○: vivid cyan color or magenta color
  Δ: somewhat dull cyan color or magenta color
  X: dull cyan color or magenta color For black ink:
  ○: pure black
  X: black with a tinge of purple (7) Bronzing (black ink alone)

Using the experimental thermal ink-jet printer, solid images were printed on FX-L paper (manufactured by Fuji Xerox Co., Ltd.), Xerox 4024 paper (manufactured by Xerox Co., Ltd.) and commercially available official postcards, and the level of the bronzing of the images was visually evaluated. The results were recorded according to the following criteria.

○: black image with almost no tinge of red
Δ: black image with a slight tinge of red
X: black image with a marked tinge of red (8) Density of images Using the experimental thermal ink-jet printer, solid images were printed on FX-L paper (manufactured by Fuji Xerox Co., Ltd.) and Xerox 4024 paper (manufactured by Xerox Co., Ltd.), and the density of the images was measured by means of a Macbeth densitometer. The results were recorded according to the following criteria.

For cyan ink and magenta ink:
  ○: density of print is 1.10 or more
  Δ: density of print is in the range of from 1.00 to 1.09
  X: density of print is 0.99 or less For black ink:
  ○: density of print is 1.30 or more
  Δ: density of print is in the range of from 1.20 to 1.29
  X: density of print is 1.19 or less (9) Resistance to clogging The experimental thermal ink-jet printer comprising a printing head for ink-jet recording filled with each ink was left open in an unused state for a predetermined period of time at 10° C. and 15% RH and at 30° C. and 85% RH. After the printer was left in these conditions, an ejection test was conducted. The criteria employed for the evaluation are given below.

○: ink could be ejected after being left for 300 seconds
Δ: ink could be ejected after being left for 180 seconds
X: ink could not be ejected after being left for 180 seconds

(10) Continuous ejection test 1 (for black-ink alone)

Using the experimental thermal ink-jet printer, solid images were printed continuously on FX-L paper (manufactured by Fuji Xerox Co., Ltd.) at a $1\times10^8$ pulse, and the density of the images was measured by means of a Macbeth densitometer. The results were recorded according to the following criteria.

○: change in density is ±10% or less
Δ: change in density is in the range of from ±10 to less than 20%
X: change in density is ±20% or more Meanwhile, the occurrence of any failure of heater was also inspected (at $\sim 1\times10^8$ pulse), and the evaluation was made according to the following criteria.

○: no failure occurred
X: failure occurred

(11) Continuous ejection test 2 (for black-ink alone)

Using the experimental thermal ink-jet printer, 1-dot lines were printed continuously on FX-L paper (manufactured by Fuji Xerox Co., Ltd.) at a $1\times10^8$ pulse, and evaluated in comparison with the first line. The results were recorded according to the following criteria.

○: 1-dot line is free of disorder and the line is perfectly straight
Δ: 1-dot line is somewhat disordered
X: 1-dot line is disordered

(12) Recovery of ejection after being left unused for a long period of time

The printing head for the experimental thermal ink-jet printer was filled with ink, and was then left unused for two months at 10° C. and 15% RH and at 30° C. and 85% RH. Then, a number of recovery operations by use of a suction pump were made in order to resume the ejection to produce normal print. By counting the number of the recovery operations made before the normal print was obtained, the capability to resume ejection after being left unused for a long period of time was evaluated. The criteria employed for the evaluation are given below.

○: ink produced normal print after 3 or less recovery operations
Δ: ink produced normal print after 4 to 8 recovery operation
X: ink could not produced normal print after 4 to 8 recovery operations

TABLE 3

| | Colorant-1 | Colorant-2 | pH | Electrical conductivity S·m⁻¹ | Viscosity mPa·s | Electrical conductivity × viscosity | Surface tension mN·m⁻¹ |
|---|---|---|---|---|---|---|---|
| Example 9 | I-2 | AB9 | 9.5 | 0.42 | 2.8 | 1.18 | 37 |
| Example 10 | I-10 | AB9 | 9.4 | 0.40 | 2.6 | 1.04 | 36 |
| Example 11 | II-5 | DB86 | 9.2 | 0.80 | 2.1 | 1.68 | 39 |
| Example 12 | I-1 | AB9 | 8.9 | 0.74 | 2.4 | 1.78 | 37 |
| Example 13 | I-9 | AB9 | 9.2 | 0.49 | 1.9 | 0.93 | 38 |
| Example 14 | II-7 | DB199 | 9.7 | 0.53 | 2.3 | 1.22 | 36 |
| Example 15 | I-6 | DB199 | 9.0 | 0.48 | 2.7 | 1.30 | 38 |
| Example 16 | II-4 | DB86 | 9.6 | 0.83 | 1.6 | 1.33 | 40 |
| Example 17 | II-1 | DB86 | 9.4 | 0.65 | 2.5 | 1.63 | 35 |
| Example 18 | I-15 | AB9 | 9.2 | 0.78 | 2.2 | 1.72 | 38 |
| Example 19 | II-10 | DB86 | 9.2 | 0.54 | 2.4 | 1.30 | 37 |
| Example 20 | I-12 | DB199 | 9.4 | 0.46 | 2.2 | 1.01 | 40 |
| Example 21 | II-9 | DB199 | 9.6 | 0.39 | 2.3 | 0.90 | 38 |
| Example 22 | II-5 | DB86 | 9.3 | 0.44 | 1.8 | 0.79 | 40 |
| Example 23 | I-8 | DB199 | 9.2 | 0.89 | 2.7 | 2.40 | 38 |
| Example 24 | I-5/II-3 | AB9 | 9.1 | 0.49 | 2.6 | 1.27 | 39 |
| Comparative example 7 | I-6 | | 9.4 | 0.40 | 2.6 | 1.04 | 39 |
| Comparative example 8 | | AB9 | 7.7 | 0.22 | 2.7 | 0.59 | 36 |
| Comparative example 9 | | DB199/AB9 | 8.8 | 0.34 | 2.6 | 0.88 | 37 |
| Comparative example 10 | II-1 | | 11.5 | 0.31 | 2.5 | 0.78 | 38 |
| Comparative example 11 | I-2 | | 8.4 | 0.33 | 2.3 | 0.76 | 37 |
| Comparative example 12 | | DB86 | 9.2 | 0.34 | 2.6 | 0.88 | 39 |
| Comparative example 13 | | DB199 | 8.4 | 0.39 | 1.8 | 0.70 | 42 |
| Comparative example 14 | | AB9/DB86 | 8.6 | 0.37 | 2.7 | 1.00 | 37 |
| Comparative example 15 | | DB199/AB9 | 7.8 | 0.56 | 2.4 | 1.34 | 38 |
| Comparative example 16 | | DB199/AB9 | 8.8 | 0.72 | 2.5 | 1.80 | 36 |
| Comparative example 17 | I-10 | RB72 | 9.4 | 0.68 | 2.4 | 1.63 | 38 |

TABLE 4

| | Density of image | | Resistance to clogging | Recovery of ejection after being left unused for a long period of time |
|---|---|---|---|---|
| | L paper | 4024 paper | | |
| Example 9 | ○ | ○ | ○ | ○ |
| Example 10 | ○ | ○ | ○ | ○ |
| Example 11 | ○ | ○ | ○ | Δ |
| Example 12 | ○ | ○ | ○ | ○ |
| Example 13 | ○ | ○ | ○ | ○ |
| Example 14 | ○ | ○ | ○ | ○ |
| Example 15 | ○ | ○ | ○ | ○ |
| Example 16 | ○ | ○ | Δ | Δ |
| Example 17 | ○ | ○ | Δ | ○ |
| Example 18 | ○ | ○ | ○ | ○ |
| Example 19 | ○ | ○ | ○ | ○ |
| Example 20 | ○ | ○ | ○ | ○ |
| Example 21 | ○ | Δ | ○ | ○ |
| Example 22 | ○ | ○ | ○ | Δ |
| Example 23 | ○ | ○ | ○ | ○ |
| Example 24 | ○ | ○ | ○ | ○ |
| Comparative example 7 | ○ | Δ | × | × |
| Comparative example 8 | ○ | ○ | ○ | ○ |
| Comparative example 9 | Δ | Δ | Δ | Δ |
| Comparative example 10 | ○ | ○ | ○ | ○ |
| Comparative example 11 | Δ | Δ | × | × |
| Comparative example 12 | ○ | Δ | Δ | Δ |
| Comparative example 13 | Δ | Δ | × | Δ |
| Comparative example 14 | ○ | ○ | Δ | Δ |
| Comparative example 15 | ○ | ○ | × | × |
| Comparative example 16 | ○ | ○ | ○ | ○ |
| Comparative example 17 | ○ | ○ | × | × |

TABLE 5

| | Water resistance | | Hue | |
|---|---|---|---|---|
| | L paper | 4024 paper | L paper | 4024 paper |
| Example 9 | ○ | ○ | ○ | ○ |
| Example 10 | ○ | Δ | ○ | ○ |
| Example 11 | ○ | ○ | ○ | ○ |
| Example 12 | ○ | ○ | ○ | ○ |
| Example 13 | ○ | ○ | ○ | ○ |
| Example 14 | ○ | ○ | ○ | Δ |
| Example 15 | ○ | ○ | ○ | ○ |
| Example 16 | ○ | Δ | ○ | ○ |
| Example 17 | ○ | ○ | ○ | ○ |
| Example 18 | ○ | ○ | ○ | ○ |
| Example 19 | ○ | ○ | ○ | ○ |
| Example 20 | ○ | ○ | ○ | Δ |
| Example 21 | ○ | Δ | ○ | ○ |
| Example 22 | ○ | ○ | ○ | ○ |
| Example 23 | ○ | ○ | ○ | Δ |
| Example 24 | ○ | Δ | ○ | ○ |
| Comparative example 7 | ○ | ○ | Δ | × |
| Comparative example 8 | × | × | ○ | ○ |
| Comparative example 9 | Δ | Δ | ○ | Δ |
| Comparative example 10 | Δ | Δ | Δ | Δ |
| Comparative example 11 | ○ | ○ | Δ | × |
| Comparative example 12 | Δ | Δ | Δ | Δ |
| Comparative example 13 | Δ | Δ | Δ | Δ |
| Comparative example 14 | × | × | ○ | ○ |
| Comparative example 15 | Δ | Δ | ○ | ○ |
| Comparative example 16 | × | × | ○ | ○ |
| Comparative example 17 | ○ | ○ | Δ | × |

TABLE 6

| | Kinds of colorants | | pH | Electrical conductivity at 20° C. σ (S/m) | Viscosity at 20° C. η (mPa · s) | σ × η | Surface tension at 20° C. γ (mN/m) |
|---|---|---|---|---|---|---|---|
| Example 25 | IV-2 | AR23 | 9.4 | 0.62 | 2.6 | 1.6 | 38 |
| Example 26 | IV-6 | V-3 | 8.9 | 0.62 | 2.7 | 1.7 | 40 |
| Example 27 | IV-5 | IV-3 | 8.8 | 0.90 | 1.9 | 1.7 | 41 |
| Example 28 | IV-1 | V-4 | 9.2 | 0.81 | 2.4 | 1.9 | 39 |
| Example 29 | IV-7 | V-1 | 9.4 | 0.69 | 2.3 | 1.6 | 38 |
| Example 30 | IV-8 | V-5 | 9.2 | 0.70 | 2.5 | 1.8 | 38 |
| Example 31 | IV-1 | V-1 | 9.2 | 0.75 | 2.4 | 1.8 | 37 |
| Example 32 | IV-6 | V-5 | 9.3 | 0.68 | 2.0 | 1.4 | 40 |
| Example 33 | IV-4 | V-2 | 9.5 | 0.84 | 1.8 | 1.5 | 40 |
| Example 34 | IV-9 | V-1 | 9.2 | 0.70 | 2.5 | 1.8 | 38 |
| Example 35 | IV-9 | V-4 | 9.8 | 0.87 | 2.8 | 2.4 | 37 |
| Example 36 | IV-3 | DR227 | 9.3 | 0.90 | 2.3 | 2.1 | 39 |
| Example 37 | IV-10 | V-2 | 9.3 | 0.62 | 2.7 | 1.7 | 37 |
| Example 38 | IV-3 | DR227 | 9.4 | 0.79 | 2.6 | 2.1 | 37 |
| Example 39 | IV-8 | AR23 | 9.1 | 0.80 | 2.9 | 2.3 | 35 |
| Example 40 | IV-6 | AR249 | 9.1 | 0.76 | 2.6 | 2.0 | 38 |
| Comparative example 18 | IV-6 | | 9.4 | 0.62 | 2.9 | 1.8 | 42 |
| Comparative example 19 | | AR23 | 8.5 | 0.40 | 2.4 | 1.0 | 38 |
| Comparative example 20 | | DR227/AR23 | 9.0 | 0.53 | 2.6 | 1.4 | 40 |
| Comparative example 21 | IV-2 | | 10.9 | 0.38 | 2.7 | 1.0 | 41 |
| Comparative example 22 | IV-7 | | 8.3 | 0.42 | 2.8 | 1.2 | 37 |
| Comparative example 23 | | AR23 | 8.9 | 0.32 | 2.7 | 0.9 | 38 |
| Comparative example 24 | | DR227 | 8.4 | 0.48 | 2.4 | 1.2 | 42 |
| Comparative example 25 | | DR227/AR23 | 9.9 | 0.41 | 2.6 | 1.1 | 36 |
| Comparative example 26 | | DR227/AR23 | 8.5 | 0.52 | 2.5 | 1.3 | 37 |
| Comparative example 27 | | DR227/AR23 | 9.0 | 0.44 | 2.4 | 1.1 | 39 |
| Comparative example 28 | IV-7 | RR180 | 9.4 | 0.65 | 2.3 | 1.5 | 41 |

TABLE 7

|  | Water resistance | | Hue | |
|---|---|---|---|---|
|  | L paper | 4024 paper | L paper | 4024 paper |
| Example 25 | ○ | Δ | ○ | ○ |
| Example 26 | ○ | ○ | ○ | Δ |
| Example 27 | ○ | ○ | ○ | ○ |
| Example 28 | ○ | ○ | ○ | Δ |
| Example 29 | ○ | ○ | ○ | ○ |
| Example 30 | ○ | ○ | ○ | ○ |
| Example 31 | ○ | ○ | ○ | Δ |
| Example 32 | ○ | ○ | ○ | ○ |
| Example 33 | ○ | Δ | ○ | ○ |
| Example 34 | ○ | ○ | ○ | Δ |
| Example 35 | ○ | Δ | ○ | ○ |
| Example 36 | ○ | ○ | ○ | ○ |
| Example 37 | ○ | ○ | ○ | Δ |
| Example 38 | ○ | Δ | ○ | Δ |
| Example 39 | ○ | ○ | ○ | ○ |
| Example 40 | ○ | ○ | ○ | ○ |
| Comparative example 18 | ○ | ○ | Δ | × |
| Comparative example 19 | × | × | ○ | ○ |
| Comparative example 20 | Δ | Δ | ○ | ○ |
| Comparative example 21 | Δ | × | Δ | × |
| Comparative example 22 | ○ | ○ | Δ | × |
| Comparative example 23 | × | × | ○ | ○ |
| Comparative example 24 | Δ | Δ | ○ | Δ |
| Comparative example 25 | Δ | × | ○ | Δ |
| Comparative example 26 | Δ | × | ○ | Δ |
| Comparative example 27 | Δ | × | ○ | ○ |
| Comparative example 28 | ○ | ○ | Δ | Δ |

TABLE 8

|  | Density of image | | Resistance to clogging | Recovery of ejection after being left unused for a long period of time |
|---|---|---|---|---|
|  | L paper | 4024 paper | | |
| Example 25 | ○ | ○ | ○ | ○ |
| Example 26 | ○ | ○ | ○ | ○ |
| Example 27 | ○ | ○ | ○ | ○ |
| Example 28 | ○ | ○ | ○ | Δ |
| Example 29 | ○ | ○ | Δ | Δ |
| Example 30 | ○ | ○ | ○ | ○ |
| Example 31 | ○ | ○ | ○ | Δ |
| Example 32 | ○ | ○ | ○ | ○ |
| Example 33 | ○ | ○ | ○ | Δ |
| Example 34 | ○ | ○ | ○ | Δ |
| Example 35 | ○ | ○ | ○ | ○ |
| Example 36 | ○ | ○ | Δ | Δ |
| Example 37 | ○ | ○ | ○ | Δ |
| Example 38 | ○ | ○ | ○ | ○ |
| Example 39 | ○ | ○ | Δ | ○ |
| Example 40 | ○ | ○ | ○ | ○ |
| Comparative example 18 | Δ | × | Δ | × |
| Comparative example 19 | ○ | Δ | Δ | ○ |
| Comparative example 20 | ○ | ○ | × | Δ |
| Comparative example 21 | Δ | Δ | ○ | ○ |
| Comparative example 22 | × | × | × | × |
| Comparative example 23 | ○ | Δ | ○ | ○ |
| Comparative example 24 | ○ | Δ | Δ | Δ |
| Comparative example 25 | ○ | ○ | Δ | Δ |
| Comparative example 26 | ○ | ○ | Δ | Δ |
| Comparative example 27 | ○ | ○ | Δ | Δ |
| Comparative example 28 | Δ | Δ | × | × |

TABLE 9

|  | Colorant-1 | Colorant-2 | pH | Electrical conductivity $S \cdot m^{-1}$ | Viscosity $mPa \cdot s$ | Electrical Conductivity × Viscosity | Surface tension $mNm^{-1}$ |
|---|---|---|---|---|---|---|---|
| Example 41 | VIII-1 | IX-9/IX-11 | 9.0 | 0.85 | 1.7 | 1.45 | 42 |
| Example 42 | VIII-2 | IX-9 | 8.9 | 0.80 | 1.8 | 1.44 | 40 |
| Example 43 | VIII-2 | IX-12/IX-18 | 9.3 | 1.69 | 1.8 | 3.04 | 40 |
| Example 44 | VIII-1 | IX-9 | 9.2 | 0.89 | 2.0 | 1.78 | 38 |
| Example 45 | VIII-1 | DY144 | 9.6 | 0.92 | 1.7 | 1.56 | 42 |
| Example 46 | VIII-2 | IX-21/DY144 | 9.0 | 0.86 | 1.8 | 1.55 | 40 |
| Example 47 | VIII-1 | IX-9/IX-21 | 9.4 | 0.96 | 1.8 | 1.73 | 42 |
| Example 48 | VIII-2 | IX-11 | 9.3 | 0.94 | 2.1 | 1.97 | 38 |
| Example 49 | VIII-1 | IX-9/IX-11/IX-18 | 9.3 | 0.98 | 1.7 | 1.67 | 40 |
| Example 50 | VIII-2 | IX-18 | 9.3 | 1.04 | 1.7 | 1.77 | 41 |
| Example 51 | VIII-2 | IX-11/IX-21/DY144 | 9.1 | 0.79 | 1.6 | 1.26 | 42 |
| Example 52 | VIII-1 | IX-12 | 9.3 | 0.81 | 1.6 | 1.30 | 41 |
| Example 53 | VIII-1 | IX-11/IX-21 | 9.5 | 0.91 | 1.8 | 1.64 | 42 |
| Example 54 | VIII-2 | IX-11/IX-12/IX-18/DY-144 | 9.9 | 1.40 | 1.9 | 2.66 | 42 |

TABLE 9-continued

|  | Colorant-1 | Colorant-2 | pH | Electrical conductivity S·m$^{-1}$ | Viscosity mPa·s | Electrical Conductivity × Viscosity | Surface tension mNm$^{-1}$ |
|---|---|---|---|---|---|---|---|
| Example 55 | VIII-1 | IX-21 | 8.8 | 0.65 | 1.9 | 1.24 | 40 |
| Comparative example 29 | VIII-1 | — | 9.4 | 0.83 | 1.7 | 1.41 | 42 |
| Comparative example 30 | VIII-2 | IX-9 | 8.7 | 0.83 | 1.9 | 1.58 | 40 |
| Comparative example 31 | VIII-2 | IX-12/IX-18 | 9.0 | 1.66 | 1.9 | 3.15 | 40 |
| Comparative example 32 | VIII-1 | AY65 | 9.0 | 0.92 | 1.7 | 1.56 | 42 |
| Comparative example 33 | VIII-1 | IX-9/IX-21 | 8.0 | 0.60 | 1.8 | 1.08 | 42 |
| Comparative example 34 | VIII-1 | IX-12 | 10.5 | 0.65 | 1.6 | 1.04 | 41 |

TABLE 10

|  | Water resistance | | Hue | | Bronzing | Density of image | |
|---|---|---|---|---|---|---|---|
|  | L paper | 4024 paper | L paper | 4024 paper |  | L paper | 4024 paper |
| Example 41 | ○ | ○ | ○ | ○ | ○ | ○ | Δ |
| Example 42 | ○ | Δ | ○ | ○ | ○ | ○ | ○ |
| Example 43 | ○ | ○ | ○ | ○ | ○ | ○ | ○ |
| Example 44 | ○ | ○ | ○ | ○ | ○ | ○ | Δ |
| Example 45 | ○ | ○ | ○ | ○ | ○ | ○ | ○ |
| Example 46 | ○ | ○ | ○ | ○ | ○ | ○ | ○ |
| Example 47 | ○ | ○ | ○ | ○ | ○ | ○ | ○ |
| Example 48 | ○ | ○ | ○ | ○ | ○ | ○ | ○ |
| Example 49 | ○ | Δ | ○ | ○ | ○ | ○ | ○ |
| Example 50 | ○ | ○ | ○ | ○ | ○ | ○ | ○ |
| Example 51 | ○ | Δ | ○ | ○ | ○ | ○ | ○ |
| Example 52 | ○ | ○ | ○ | ○ | ○ | ○ | ○ |
| Example 53 | ○ | ○ | ○ | ○ | ○ | ○ | ○ |
| Example 54 | ○ | ○ | ○ | ○ | ○ | ○ | ○ |
| Example 55 | ○ | Δ | ○ | ○ | ○ | ○ | ○ |
| Comparative example 29 | ○ | ○ | × | × | × | Δ | × |
| Comparative example 30 | Δ | × | ○ | ○ | ○ | ○ | ○ |
| Comparative example 31 | × | × | ○ | ○ | ○ | ○ | ○ |
| Comparative example 32 | ○ | Δ | ○ | ○ | Δ | ○ | Δ |
| Comparative example 33 | × | × | ○ | ○ | ○ | Δ | Δ |
| Comparative example 34 | Δ | Δ | × | × | × | ○ | ○ |

TABLE 11

|  | Continuous ejection | | | | Recovery of ejection |
|---|---|---|---|---|---|
|  | Resistance to clogging | Change in the density of image | Failure of heater | Reproduction of fine lines | after being left unused for a long period of time |
| Example 41 | ○ | ○ | ○ | ○ | ○ |
| Example 42 | ○ | ○ | ○ | ○ | ○ |
| Example 43 | Δ | ○ | ○ | ○ | Δ |
| Example 44 | Δ | ○ | ○ | ○ | ○ |
| Example 45 | ○ | ○ | ○ | ○ | Δ |
| Example 46 | ○ | ○ | ○ | ○ | ○ |
| Example 47 | ○ | ○ | ○ | ○ | Δ |
| Example 48 | Δ | ○ | ○ | ○ | Δ |
| Example 49 | ○ | ○ | ○ | ○ | ○ |
| Example 50 | ○ | ○ | ○ | ○ | Δ |
| Example 51 | ○ | ○ | ○ | ○ | ○ |
| Example 52 | Δ | ○ | ○ | ○ | Δ |
| Example 53 | ○ | ○ | ○ | ○ | ○ |
| Example 54 | ○ | ○ | ○ | ○ | ○ |
| Example 55 | Δ | ○ | ○ | ○ | ○ |
| Comparative example 29 | Δ | × | Δ | × | × |
| Comparative example 30 | Δ | ○ | ○ | ○ | ○ |
| Comparative example 31 | × | ○ | × | ○ | Δ |
| Comparative example 32 | Δ | × | ○ | Δ | Δ |
| Comparative example 33 | × | Δ | ○ | Δ | Δ |

TABLE 11-continued

|  | Continuous ejection | | | Recovery of ejection |
|---|---|---|---|---|
|  | Resistance to clogging | Change in the density of image | Failure of heater | Reproduction of fine lines | after being left unused for a long period of time |
| Comparative example 34 | ○ | Δ | × | Δ | Δ

As stated above, the present invention solves the problems of prior art and provides a color ink set for use in ink-jet recording, which ink set has the following advantages, i.e., superior water resistance, higher density of printed images, superior resistance to the clogging of nozzle, superior color formation in single-color ink and secondary color, broader range of color gamut together with excellent resistance to clogging, superior stability in ejection and ejecting direction, excellent recovery of ejection after being left unused for a long period of time, and no corrosive action to any member, such as recording heads, brought into contact with the ink. The present invention also provides a method for ink-jet recording which uses the color ink set.

What is claimed is:

1. A color ink set for ink-jet recording, comprising cyan ink, magenta ink, yellow ink and black ink, each single-color ink comprising water, a colorant and a water-soluble organic solvent, wherein said colorant in the single-color ink is specified as (a) to (c):

(a) cyan ink comprising at least one colorant selected from the group consisting of the colorants represented by the general formulas I and II and at least one colorant selected from the group consisting of C.I. Acid Blue 9, C.I. Direct Blue 199 and C.I. Direct Blue 86;

   General Formula I wherein Pc represents a phthalocyanine nucleus containing a metal, $R^1$, $R^2$ and $R^3$ are each independently selected from the group consisting of a hydrogen atom, an alkyl group, a substituted alkyl group, an alkenyl group, a substituted alkenyl group, an aralkyl group and a substituted aralkyl group, L represents a divalent organic linking group, and X represents a carbonyl group or a group represented by any one of the formulas (1) to (3) given below; in which formulas (1) to (3), Z represents $NR^4R^5$, $SR^6$ or $OR^6$, Y represents H, Cl, Z, $SR^7$ or $OR^7$, and E represents Cl or CN; $R^4$, $R^5$, $R^6$ and $R^7$ are each independently selected from the group consisting of a hydrogen atom, an alkyl group, a substituted alkyl group, an aryl group, a substituted aryl group, an aralkyl group and a substituted aralkyl group or $R^4$ and $R^5$ represent a group forming a 5 or 6 membered ring with a bonded nitrogen atom;

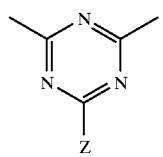 (1)

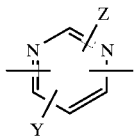 (2)

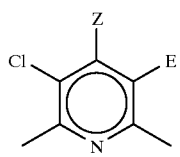 (3)

G represents an organic group bearing one or two substituents selected from the group consisting of $-COSM^2$ and $-COOM^2$, (t+q) is 3 to 4, and q is equal to or greater than 1; the colorant represented by the general formula I has at least one -COOM group and at least one $-SO_3M$ group such that the sum of the number of the -COSM and -COOM groups is equal to or greater than the number of the $-SO_3M$ group; $M^1$ and $M^2$ both represent a counter ion and are each a hydrogen atom or a base selected from the group consisting of an alkali metal, ammonium and an amine;

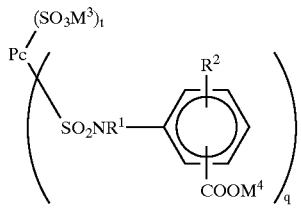   General Formula II wherein Pc represents a phthalocyanine nucleus containing a metal, $R^1$ is selected from the group consisting of a hydrogen atom, an alkyl group, a substituted alkyl group, an alkenyl group, a substituted alkenyl group, an aralkyl group and a substituted aralkyl group, $R^2$ is selected from the group consisting of a hydrogen atom, an alkyl group, an alkoxy group, a halogen atom, an amino group and a substituted amino group, (t+q) is 3 to 4, and q is equal to or greater than 1; $M^3$ and $M^4$ both represent a counter ion and are each a hydrogen atom or a base selected from the group consisting of an alkali metal, ammonium and an amine;

(b) magenta ink comprising a colorant represented by the general formula IV and at least one colorant selected from the group consisting of a colorant represented by the general formula V, C.I. Acid Red 23, C.I. Acid Red 249 and C.I. Direct Red 227;

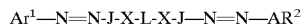   General Formula IV wherein the general formula IV, J represents the group given below; $Ar^1$ and $Ar^2$ are each independently selected from the group consisting of an aryl group and a substituted aryl group; at least one of $Ar^1$ and $Ar^2$ has at least one group selected from the group consisting of -$COSM^7$ and -$COOM^7$; L represents a divalent organic linking group; X represents a carbonyl group or a group represented by any one of the formulas (1) to (3) given below;

the general formula IV has at least one -COOM group and at least one —$SO_3M$ group such that the sum of the number of the -COSM and -COOM groups is at least equal to the number of —$SO_3M$ groups N. $M^5$, $M^6$ and $M^7$ each represent a counter ion and are each a base selected from the group consisting of each a hydrogen atom or an alkali metal, ammonium and an amine;

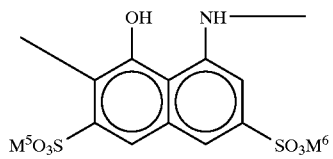

(1)

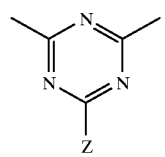

(2)

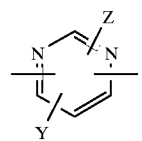

(3)

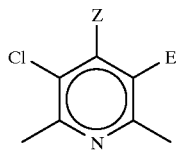

in the formulas (1) to (3), Z represents $NR^1R^2$, $SR^3$ or $OR^3$ Y represents H, Cl, Z, $SR^4$ or $OR^4$, and E represents Cl or CN; $R^1$, $R^2$, $R^3$ and $R^4$ are each independently selected from the group consisting of a hydrogen atom, an alkyl group, a substituted alkyl group, an alkenyl group, a substituted alkenyl group, an aralkyl group and a substituted aralkyl group or $R^1$ and $R^2$ represent a group forming a 5 or 6 membered ring with a bonded nitrogen atom;

General Formula V

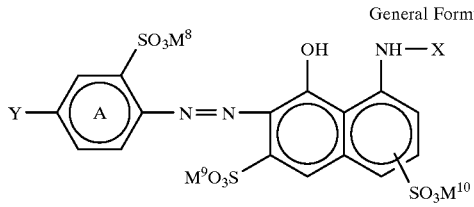

wherein the general formula V, Y is selected from the group consisting of a hydrogen atom, a methyl group, a methoxy group, an acetylamino group and a nitro group and may form another benzene ring together with a carbon atom present at the third position of the benzene ring A; X represents a group selected from the group consisting of anacetyl group, a benzoyl group, a p-toluenesulfonyl group and 4-chloro-6-hydroxy-1,3,5-triazine-2-il group; $M^8$, $M^9$ and $M^{10}$ each represent a counter ion and are each a hydrogen atom or a base selected from the group consisting of an alkali metal, ammonium and an amine;

(c) yellow ink comprising a colorant represented by the general formula VII and C.I. Direct Yellow 144 and/or C.I. Direct Yellow 86, or comprising C.I. Direct Yellow 144 and/or C.I. Direct Yellow 86;

General Formula VII

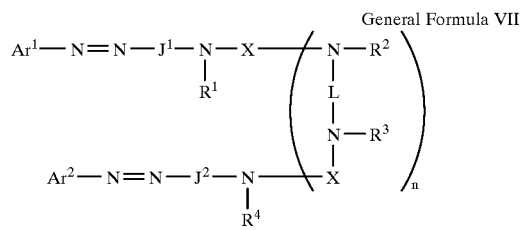

wherein the general formula VII, $Ar^1$ and $Ar^2$ are each independently selected from the group consisting of an aryl group and a substituted aryl group and at least one of $Ar^1$ and $Ar^2$ has at least one substituent selected from the group consisting of -$COSM^{11}$ and -$COOM^{11}$;

$J^1$ and $J^2$ each independently represent any one of the following formulas (1) to (3);

(1)

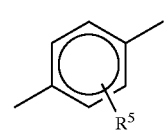

(2)

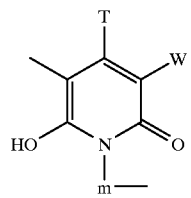

(3)

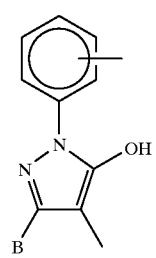

wherein the formulas (1) to (3), $R^5$ is selected from the group consisting of a hydrogen atom, an alkyl group, a substituted alkyl group, an alkoxy group, a halogen atom, —CN, ureido and —$NHCOR^6$; $R^6$ is selected from the group consisting of a hydrogen atom, an alkyl group, a substituted alkyl group, an aryl group, a substituted aryl group, an aralkyl group and a substituted aralkyl group;

T represents an alkyl group, W represents a group selected from the group consisting of a hydrogen atom, —CN, —CONR$^{10}$R$^{11}$, pyridinium and -COOM$^{12}$;

m represents an alkylene chain having 2 to 8 carbon atoms;

B represents a hydrogen atom, an alkyl group or -COOM$^{13}$; R$^1$, R$^2$, R$^3$, R$^4$, R$^{10}$ and R$^{11}$ are each independently selected from the group consisting of a hydrogen atom, an alkyl group and a substituted alkyl group;

L represents a divalent organic linking group;

n is 0 or 1, and X represents a carbonyl group or a group represented by any one of the following formulas (4) to (6);

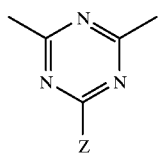
(4)

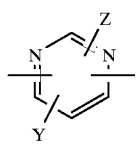
(5)

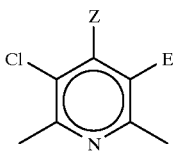
(6)

wherein the formulas (4) to (6), Z represents OR$^7$, SR$^7$ or NR$^8$R$^9$, Y represents H, Cl or CN, and E represents Cl or CN; R$^7$, R$^8$ and R$^9$ are each independently selected from the group consisting of a hydrogen atom, an alkyl group, a substituted alkyl group, an alkenyl group, a substituted alkenyl group, an aryl group, a substituted aryl group, an aralkyl group and a substituted aralkyl group or R$^8$ and R$^9$ represent a group forming a 5 or 6 membered ring with a bonded nitrogen atom;

the dye represented by the general formula VII has at least one -COOM such that the sum of the number of the -COSM and -COOM groups is 2 or greater if the dye has no —SO$_3$M group whereas the sum of the number of the -COSM and -COOM groups is equal to or greater than the number of the —SO$_3$M groups if the dye has a —SO$_3$M group; M$^{11}$, M$^{12}$ and M$^{13}$ each represent a counter ion and are each a hydrogen atom or a base selected from the group consisting of an alkali metal, ammonium and an amine.

2. A color ink set for ink-jet recording, comprising a set of single-color inks, namely, cyan ink, magenta ink, yellow ink and black ink, each single-color ink containing at least a colorant, a water-soluble organic solvent and water, wherein said colorant in the cyan ink is specified as (a) of claim 1, said colorant in the magenta ink is specified as (b) of claim 1, said colorant in the yellow ink is specified as (c) of claim 1, and said colorant in the black ink is specified as (d) described below:

(d) black ink comprising a mixture of colorants in the form of free acids, said mixture being composed of at least one colorant represented by the general formula VIII and at least one colorant selected from the group consisting of the colorant represented by the general formula IX and/or C.I. Direct Yellow 144;

General Formula VIII

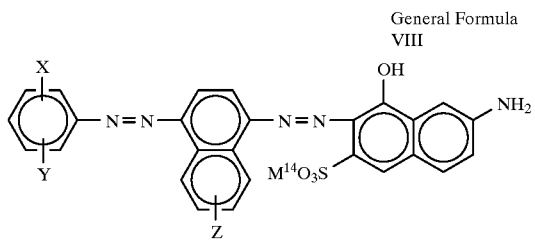

wherein X represents a hydrogen atom or -COOM$^{15}$, Y represents a hydrogen atom or a -COOM$^{16}$ group, and Z represents a hydrogen atom, -COOM$^{17}$ or —SO$_3$M$^{17}$, with the proviso that at least one of X, Y and Z represents -COOM; M$^{14}$, M$^{15}$, M$^{16}$ and M$^{17}$ all represent a counter ion and are each a hydrogen atom or an ion selected from the group consisting of an alkali metal ion, an ammonium ion and a substituted ammonium ion, General Formula IX

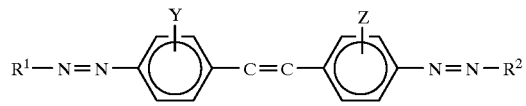

where R$^1$ and R$^2$ each independently represents a group represented by the formula (1) or (2) given below, and Y and Z each independently represents a hydrogen atom or —SO$_3$M$^{18}$; M$^{18}$ represents a counter ion and is a hydrogen atom or an ion selected from the group consisting of an alkali metal ion, an ammonium ion and a substituted ammonium ion;

(1)

[structure with A, E, G]

(2)

[structure with J, L, Q, W]

where A, E and G are each independently selected from the group consisting of a hydrogen atom, an alkyl group, —OH and -COOM$^{19}$; J, L, Q and W are each independently selected from the group consisting of a hydrogen atom, —OH, —NH$_2$ and —SO$_3$M$^{20}$; M$^{19}$ and M$^{20}$ each represents a counter ion and are each a hydrogen atom or an ion selected from the group consisting of an alkali metal ion, an ammonium ion and a substituted ammonium ion.

3. The color ink set for ink-jet recording according to claim 2, wherein at least one of M$^1$, M$^2$, M$^3$, M$^4$, M$^5$, M$^6$, M$^7$, M$^{11}$, M$^{12}$, M$^{13}$, M$^{14}$, M$^{15}$, M$^{16}$ and M$^{17}$ in said colorants represented by the general formulas I, II, IV, VII and VIII is an ammonium ion.

4. The color ink set for ink-jet recording according to claim 2, wherein the weight ratio of the colorant represented by the general formulas I and/or II to at least one colorant selected from the group consisting of C.I. Acid Blue 9, C.I. Direct Blue 199 and C.I. Direct Blue 86 is in the range of from 20:1 to 1:1.

5. The color ink set for ink-jet recording according to claim 2, wherein the weight ratio of said colorant represented by the general formula IV to at least one colorant selected from the group consisting of said colorant represented by the general formula V, C.I. Acid Red 23, C.I. Acid Red 249 and C.I. Direct Red 227 is in the range of from 20:1 to 1:1.

6. The color ink set for ink-jet recording according to claim 2, wherein the weight ratio of said colorant represented by the general formula VIII to the colorant selected from the group consisting of said colorant represented by the general formula IX and/or C.I. Direct Yellow 144 is in the range of from 20:1 to 1:1.

7. A cyan-color ink for ink-jet recording, comprising at least one colorant selected from the group consisting of the colorants represented by the general formulas I and II and at least one colorant selected from the group consisting of C.I. Acid Blue 9, C.I. Direct Blue 199 and C.I. Direct Blue 86:

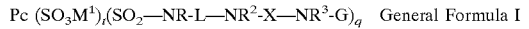

Pc $(SO_3M^1)_t(SO_2$—NR-L—NR$^2$-X—NR$^3$-G$)_q$   General Formula I wherein the general formula I, Pc represents a phthalocyanine nucleus containing a metal, $R^1$, $R^2$ and $R^3$ are each respectively and independently represents a hydrogen atom, an alkyl group, a substituted alkyl group, an alkenyl group, a substituted alkenyl group, an aralkyl group and a substituted aralkyl group, L represents a divalent organic linking group, and X represents a carbonyl group or a group represented by any one of the formulas (1) to (3) given below; in the formulas (1) to (3), Z represents $NR^4R^5$, $SR^6$ or $OR^6_1$, Y represents H, Cl, Z, $SR^7$ or $OR^7$, and E represents Cl or CN. $R^4$, $R^5$, $R^6$ and $R^7$ are each independently selected from the group consisting of a hydrogen atom, an alkyl group, a substituted alkyl group, an aryl group, a substituted aryl group, an aralkyl group and a substituted aralkyl group or $R^4$ and $R^5$ represent a group forming a 5 or 6 membered ring with a bonded nitrogen atom;

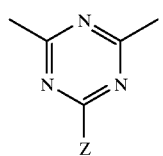

(1)

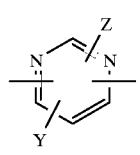

(2)

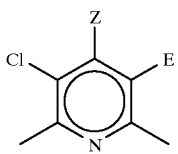

(3)

G represents an organic group substituted by one or two groups selected from the groups consisting of -COSM$^2$ and -COOM$^2$, (t+q) is 3 to4, and q is equal to or greater than 1; the colorant represented by the general formula I has at least one -COOM group and at least one —SO$_3$M group such that the sum of the number of the -COSM and -COOM groups is equal to or greater than the number of the —SO$_3$M groups; $M^1$ and $M^2$ each represent a counter ion and are each a hydrogen atom or a base selected from the group consisting of an alkali metal, ammonium and an amine;

General Formula II

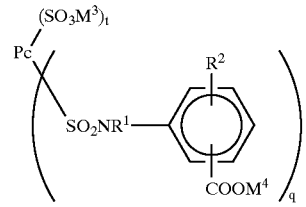

wherein Pc represents a phthalocyanine nucleus containing a metal, $R^1$ is selected from the group consisting of a hydrogen atom, an alkyl group, a substituted alkyl group, an alkenyl group, a substituted alkenyl group, an aralkyl group and a substituted aralkyl group, $R^2$ is selected from the group consisting of a hydrogen atom, an alkyl group, an alkoxy group, a halogen atom, an amino group and a substituted amino group, (t+q) is 3 to 4, and q is equal to or greater than 1; $M^3$ and $M^4$ each represents a counter ion and is each a hydrogen atom or a base selected from the group consisting of an alkali metal, ammonium and an amine.

8. The ink for ink-jet recording according to claim 7, wherein at least one of $M^1$, $M^2$, $M^3$ and $M^4$ in said colorants represented by the general formula I or II is an ammonium ion.

9. The ink for ink-jet recording according to claim 7, wherein the weight ratio of said colorant represented by the general formulas I and/or II to at least one colorant selected from the group consisting of C.I. Acid Blue 9, C.I. Direct Blue 199 and C.I. Direct Blue 86 is in the range of from 95:5 to 70:30.

10. A magenta-color ink for ink-jet recording, comprising a colorant represented by the general formula IV and at least one colorant selected from the group consisting of a colorant represented by the general formula V, C.I. Acid Red 23, C.I. Acid Red 249 and C.I. Direct Red 227:

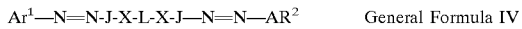

Ar$^1$—N=N-J-X-L-X-J—N=N—AR$^2$   General Formula IV wherein the general formula IV, J represents the group given below; Ar$^1$ and Ar$^2$are each independently selected from the group consisting of an aryl group and a substituted aryl group; at least one of Ar$^1$ and Ar$^2$ has at least one group selected from the group consisting of -COSM$^7$ and -COOM$^7$; L represents a divalent organic linking group; X represents a carbonyl group or a group represented by any one of the formulas (1) to (3) given below;

the general formula IV has at least one -COOM group and at least one —SO$_3$M group such that the sum of the number of the -COSM and -COOM groups is at least equal to the number of the SO$_3$M groups; $M^5$, $M^6$ and $M^7$ each represents a counter ion and is each a hydrogen atom or a base selected from the group consisting of an alkali metal, ammonium and an amine;

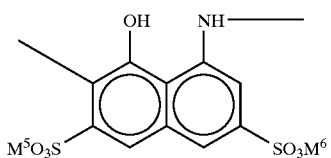

(1)

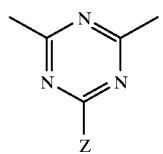

(2)

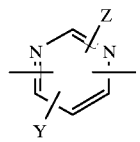

(3)

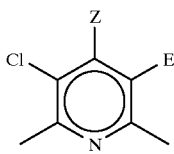

wherein the formulas (1) to (3), Z represents $NR^1R^2$, $SR^3$ or $OR^3$, Y represents H, Cl, Z, $SR^4$ or $OR^4$, and E represents Cl or CN; $R^1$, $R^2$, $R^3$ and $R^4$ are each independently selected from the group consisting of a hydrogen atom, an alkyl group, a substituted alkyl group, an alkenyl group, a substituted alkenyl group, an aralkyl group and a substituted aralkyl group or $R^1$ and $R^2$ represent a group forming a 5 or 6 membered ring with a bonded nitrogen atom;

General Formula V

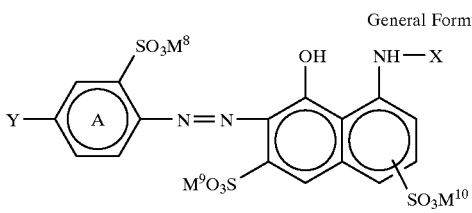

wherein the general formula V, Y is selected from the group consisting of a hydrogen atom, a methyl group, a methoxy group, an acetylamino group and a nitro group and may form benzene ring together with a carbon atom present at a third position of the benzene ring A; X represents a group selected from the group consisting of an acetyl group, a benzoyl group, a p-toluenesulfonyl group and 4-chloro-6-hydroxy-1,3,5-triazine-2-il group; $M^8$, $M^9$ and $M^{10}$ each represents a counter ion and is each a hydrogen atom or a base selected from the group consisting of an alkali metal, ammonium and an amine.

11. The magenta-color ink for ink-jet recording according to claim 10, wherein at least one of $M^5$, $M^6$ and $M^7$ in said colorants represented by the general formula IV or V is an ammonium ion.

12. The magenta-color ink for ink-jet recording according to claim 10, wherein the weight ratio of said colorant represented by the general formula IV to at least one colorant selected from the group consisting of said colorant represented by the general formula V, C.I. Acid Red 23, C.I. Acid Red 249 and C.I. Direct Red 227 is in the range of from 95:5 to 70:30.

13. A black ink for ink-jet recording, comprising a mixture of colorants in the form of free acids, said mixture being composed of at least one colorant represented by the general formula VIII and at least one colorant selected from the group consisting of the colorant represented by the general formula IX and/or C.I. Direct Yellow 144, wherein the weight ratio of the colorant represented by the general formulas VIII to the colorant selected from the group consisting of the colorant represented by the general formula IX and/or C.I. Direct Yellow 144 is in the range of from 95:5 to 60:40;

General Formula VIII

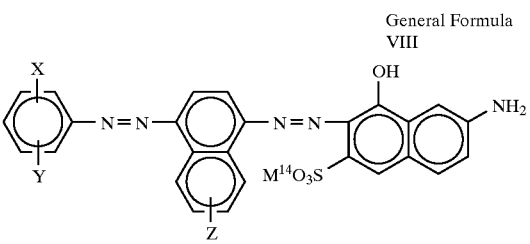

wherein X represents a hydrogen atom or $-COOM^{15}$, Y represents a hydrogen atom or $-COOM^{16}$, and Z represents a hydrogen atom, $-COOM^{17}$ or $-SO_3M^{17}$, with the proviso that at least one of X, Y and Z represents -COOM. $M^{14}$, $M^{15}$, $M^{16}$ and $M^{17}$ each represents a counter ion and is each a hydrogen atom or an ion selected from the group consisting of an alkali metal ion, an ammonium ion and a substituted ammonium ion;

General Formula IX

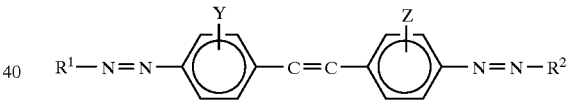

wherein $R^1$ and $R^2$ each independently represents a group represented by the formula (1) or (2) given below, and Y and Z each independently represents a hydrogen atom or $-SO_3M^{18}$; $M^{18}$ represents a counter ion and is a hydrogen atom or an ion selected from the group consisting of an alkali metal ion, an ammonium ion and a substituted ammonium ion;

(1)

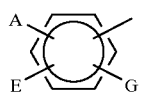

(2)

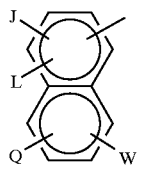

wherein A, E and G are each independently selected from the group consisting of a hydrogen atom, an alkyl group, $-OH$ and $-COOM^{19}$; J, L, Q and W are each independently selected from the group consisting of a hydrogen atom, —OH, —NH$_2$ and —SO$_3$M$^{20}$; M$^{19}$ and M$^{20}$ each represent a counter ion and are each a hydrogen atom or an ion selected from the group consisting of an alkali metal ion, an ammonium ion and a substituted ammonium ion.

14. The black ink for ink-jet recording according to claim 13, wherein at least one of M$^{14}$, M$^{15}$, M$^{16}$ and M$^{17}$ which are counter ions of said colorants is an ammonium ion.

15. The color ink set for ink-jet recording according to claim 2, wherein the content of the colorant in each single-color ink is in the range of from 0.1 to 10% by weight based on the total weight of the single-color ink.

16. The color ink set for ink-jet recording according to claim 2, wherein the pH of said each single-color ink is in the range of from 6.0 to 12.0.

17. The color ink set for ink-jet recording according to claim 2, wherein the ink set comprises a nitrogen-containing compound having a carboxylic and/or sulfonic acid structure whose pKa is in the range of from 6.0 to 10.0 at 20° C. and a hydroxide of an alkali metal or ammonium hydroxide.

18. The color ink set for ink-jet recording according to claim 2, wherein the product (σ×η) of the electrical conductivity σ (S/m) and the viscosity η (mPa·s) at 20° C. is in the range of from 0.4 to 4.0.

19. The color ink set for ink-jet recording according to claim 2, wherein the ink prepared has a surface tension γ in the range of from 20 to 50 mN/m and a viscosity η in the range of from 1.5 to 5.0 mPa·s at 20° C.

20. The color ink set for ink-jet recording according to claim 2, wherein the water-soluble organic solvent is at least one substance selected from the group consisting of polyhydric alcohol, polyglycol, polyalkylene glycol and glycol ether.

21. The color ink set for ink-jet recording according to claim 2, wherein the ink set comprises a surfactant.

22. The color ink set for ink-jet recording according to claim 2, wherein the ink set comprises a water-soluble organic compound which is solid at room temperature and 50% by weight or more of which evaporates at 100 to 350° C.

23. The color ink set for ink-jet recording according to claim 22, wherein the content of said water-soluble organic compound in the ink for use in ink-jet recording is in the range of 0.1 to 15% by weight.

24. The color ink set for ink-jet recording according to claim 22, wherein said water-soluble organic compound which is solid at room temperature and 50% by weight or more of which evaporates at 100 to 350° C. is at least one substance selected from the group consisting of urea, thiourea, derivatives thereof and betaine.

25. The color ink set for ink-jet recording according to claim 2, wherein the total content of the colorants in the ink for use in ink-jet recording is in the range of from 0.3 to 10% by weight.

26. A method for ink-jet recording, comprising allowing ink droplets ejected from an orifice to penetrate into a recording medium, wherein said ink droplets comprise the color ink set as claimed in claim 2.

27. The method for ink-jet recording according to claim 26, wherein said ink droplets are formed by providing thermal energy from a heating means to the ink for use in ink-jet recording.

28. The method for ink-jet recording according to claim 27, wherein the thermal energy is provided to the ink by applying a plurality of energy pulses to said heating means.

29. The method for ink-jet recording according to claim 27, wherein the periphery of said heating means is made from a polyimide resin.

30. The method for ink-jet recording according to claim 26, said method including a pre-ejection stage and a recording stage, wherein the ink droplets ejected from an orifice in accordance with a recording signal are allowed to penetrate into a recording medium in the recording stage.

* * * * *